(12) United States Patent
Song

(10) Patent No.: US 12,276,828 B2
(45) Date of Patent: Apr. 15, 2025

(54) PANEL ASSEMBLY FOR A HOME APPLIANCE AND HOME APPLIANCE THEREWITH

(71) Applicant: LG Electronics Inc., Seoul (KR)

(72) Inventor: Seongmin Song, Seoul (KR)

(73) Assignee: LG Electronics Inc., Seoul (KR)

( * ) Notice: Subject to any disclaimer, the term of this patent is extended or adjusted under 35 U.S.C. 154(b) by 168 days.

(21) Appl. No.: 17/863,956

(22) Filed: Jul. 13, 2022

(65) Prior Publication Data
US 2023/0015832 A1    Jan. 19, 2023

(30) Foreign Application Priority Data

Jul. 13, 2021  (KR) .................. 10-2021-0091826
Jul. 13, 2021  (KR) .................. 10-2021-0091828

(51) Int. Cl.
*F21V 8/00* (2006.01)
*F25D 27/00* (2006.01)

(52) U.S. Cl.
CPC .......... *G02B 6/0095* (2013.01); *F25D 27/00* (2013.01); *G02B 6/0088* (2013.01)

(58) Field of Classification Search
CPC ...... G02B 6/0095; G02B 6/0088; F25D 27/00
See application file for complete search history.

(56) References Cited

U.S. PATENT DOCUMENTS

| | | | |
|---|---|---|---|
| 8,789,900 B2 | 7/2014 | Laible et al. | |
| 2013/0235302 A1* | 9/2013 | Jeon | G02B 6/0088 349/64 |
| 2018/0164030 A1* | 6/2018 | Lee | F25D 27/00 |

FOREIGN PATENT DOCUMENTS

| | | |
|---|---|---|
| CN | 103250018 | 3/2016 |
| WO | WO2012076411 | 6/2012 |
| WO | WO 2021/112409 | 6/2021 |

OTHER PUBLICATIONS

Extended European Search Report in European Appln. No. 22184613.2, mailed on Nov. 28, 2022, 8 pages.

* cited by examiner

*Primary Examiner* — Mary Ellen Bowman
(74) *Attorney, Agent, or Firm* — Fish & Richardson P.C.

(57) ABSTRACT

A refrigerator includes a cabinet having a storage chamber therein, and a door for opening and closing the cabinet, the door includes a door body and a panel assembly coupled to a front face of the door body, the panel assembly includes a front plate forming an outer appearance of a front face of the panel assembly, a light guide plate disposed to be spaced apart from a rear face of the front plate, a lighting device including a light source for irradiating light to the light guide plate and a substrate where the light source is disposed, wherein the lighting device is disposed to be spaced apart from one surface of the light guide plate, and a bracket having a receiving space for accommodating the lighting device therein, and the bracket includes a support for supporting the light guide plate or for determining the position of the light source.

20 Claims, 48 Drawing Sheets

FIG. 25

| | | SHIELDING PORTION VERTICAL DIMENSION | | | |
|---|---|---|---|---|---|
| | | 0mm | 5mm | 8mm | 9mm |
| O B S E R V A T I O N  A N G L E | 80° | NG | NG | OK | OK |
| | 85° | NG | NG | OK | OK |
| | 40° | NG | NG | OK | OK |
| | 0° | NG | OK | OK | OK |

PANEL ASSEMBLY FOR A HOME APPLIANCE AND HOME APPLIANCE THEREWITH

CROSS-REFERENCE TO RELATED APPLICATION

This application claims priority to and the benefit of Korean Patent Application No. 10-2021-0091828 and 10-2021-0091826, filed on 2021 Jul. 13, the disclosure of which is incorporated herein by reference in its entirety.

BACKGROUND

Field

The present disclosure relates to a panel assembly for a home appliance, in particular for a door of a home appliance and to a home appliance including the same, e.g. a refrigerator, a dish washer, a laundry machine such as a clothing manager or a washing and/or drying machine, or a cooking device, e.g. an oven.

Description of Related Art

In general, a refrigerator is a home appliance for storing food at low temperature in an internal storage space that is shielded by a refrigerator door, and is configured to store the stored food in an optimal state by cooling the inside of the storage space using cold air generated through heat exchange with a refrigerant circulating through the refrigeration cycle.

Such a refrigerator is gradually being enlarged and multi-functional according to a trend of changes in dietary life and high-quality products, and a refrigerator equipped with various structures and convenience devices in consideration of user convenience is being developed.

In order to harmonize with an environment in which the refrigerator is disposed or with surrounding furniture or home appliances, structures for varying an outer appearance of a door front of the refrigerator are developed, and this trend is the same throughout the home appliance.

U.S. Pat. No. 8,789,900 discloses a structure in which a deco panel forming an outer appearance is installed on a door front of a refrigerator, and here, the outer appearance of the door front is formed according to a user's preference by detachably configuring the deco panel.

However, the refrigerator having this structure has a problem in that, when a user wants to change the outer appearance, the entire deco panel needs to be removed and replaced, and it is not possible to use the deco panel before replacement any longer.

To solve such problem, a refrigerator capable of changing the outer appearance of the front face (or front surface) of the refrigerator door, that is, the front face of the refrigerator without disassembling the refrigerator door, is being developed.

Representatively, Chinese Patent No. 103250018 discloses a refrigerator in which a reflective layer and a transparent panel are disposed on a door front and colored light emitting members are mounted on both ends of the reflective layer to cause the transparent panel to emit light with set color.

However, in the refrigerator having such a structure, there is a problem in that maintaining of a stable mounted state of the light emitting member is not able to be ensured due to a using characteristic of the door of being repeatedly opened and closed.

Further, there is a problem that an entirety of the transparent panel is not able to emit light with even brightness because the light emitting members are placed on the left and right side ends. In particular, light is not transmitted to the bent side ends for the arrangement of the light emitting members, which may cause the side ends to appear dark.

Further, there is a problem in that the outer appearance is not good because the light emitting member is exposed depending on a user's location.

Further, the light is not transmitted to the both side ends where the light emitting members are arranged, so that there is a problem that both side ends of the front face of the door do not emit light brightly.

Further, when the light emitting member is turned off, internal components are exposed because of the transparent panel and the outer appearance is not good in the OFF state of the light emitting member.

Further, when a service of the light emitting member is required, the entire door must be disassembled. In some cases, it is difficult or impossible to reassemble the door after the disassembly.

Further, heat generated from the light emitting member is not effectively dissipated, which may cause excessive deformation of the light guide plate. In addition, a temperature of the front face of the refrigerator door rises, which may cause the user to feel discomfort when approaching the refrigerator to open the door. In addition, there is a problem of affecting a temperature of the storage space in the refrigerator or increasing power consumption due to the increase in the temperature inside the door.

Further, a relatively bright hot-spot area may be defined at a point where a light source constituting the light emitting member is disposed, and an area between neighboring light sources may be relatively dark. Exposure of such a hot-spot area deteriorates aesthetics of the outer appearance of the product.

Further, assembly and disassembly of components including the light emitting member are complicated and cumbersome, and maintenance of the components is inconvenient.

The same or similar problems arise for other home appliances.

SUMMARY

An object of the present disclosure is to provide a panel assembly for a home appliance, in particular for a door of a home appliance, and a home appliance including the same, wherein an outer appearance can be varied depending on a user's preference without replacing a door panel.

An object of the present disclosure is to provide a panel assembly for a home appliance, in particular for a door of a home appliance, and a home appliance including the same, that may have outer appearances of different colors, e.g. in OFF state and ON state of a lighting device, without disassembling and assembling a door.

An object of the present disclosure is to provide a panel assembly for a home appliance, in particular for a door of a home appliance, and a home appliance including the same, with an improved outer appearance of a front surface thereof by preventing a hot-spot area generated by a lighting device from being exposed through the front surface.

An object of the present disclosure is to provide a panel assembly for a home appliance, in particular for a door of a home appliance, and a home appliance including the same, that allow an entirety of a front surface of a door to emit light evenly.

An object of the present disclosure is to provide a panel assembly for a home appliance, in particular for a door of a home appliance, and a home appliance including the same, wherein a light source of a lighting device may be easily and stably aligned with a center line of a light guide plate.

An object of the present disclosure is to provide a panel assembly for a home appliance, in particular for a door of a home appliance, and a home appliance including the same, wherein movements of a lighting device and a light guide plate are restricted.

One or more of these objects are solved by the features of the independent claims.

According to one aspect, a panel assembly for a door of a home appliance, in particular of a refrigerator, includes: a front plate forming a front face (or front surface) of the panel assembly and/or of the door, a light guide plate disposed to be spaced apart from a rear face (or rear surface) of the front plate, a lighting device including a light source for irradiating light to the light guide plate and a substrate on which the light source is disposed, wherein the lighting device is spaced apart from the light guide plate, and a bracket having a receiving space for accommodating the lighting device therein, the bracket including a support for supporting the light guide plate and/or for determining a position, in particular a horizontal position, of the light source.

According to one aspect, a panel assembly for a door of a home appliance, in particular of a refrigerator, includes: a front plate forming an outer appearance of a front surface of the panel assembly, a light guide plate disposed to be spaced apart from a rear surface of the front plate, a lighting device including a light source for irradiating light to the light guide plate and a substrate where the light source is disposed, wherein the lighting device is disposed to be spaced apart from one surface of the light guide plate, and a bracket having a receiving space for accommodating the lighting device therein, and the bracket includes a support for supporting the light guide plate or for determining the position of the light source.

According to a further aspect, a home appliance, in particular a refrigerator, includes: a cabinet having a space, e.g. a storage chamber, therein and a door for opening and closing the cabinet, the door includes a door body and a panel assembly (also denoted as door panel) coupled to a front surface of the door body, the panel assembly includes a front plate forming an outer appearance of a front surface of the door assembly, a light guide plate disposed to be spaced apart from a rear surface of the front plate, a lighting device including a light source for irradiating light to the light guide plate and a substrate where the light source is disposed, wherein the lighting device is disposed to be spaced apart from one surface of the light guide plate, and a bracket having a receiving space for accommodating the lighting device therein, and the bracket includes a support for supporting the light guide plate or for determining the position of the light source.

According to a further aspect, a home appliance, in particular a refrigerator, includes: a cabinet having a space, e.g. a storage chamber, therein and a door for opening and closing the cabinet and/or the space, wherein the door includes a door body and a panel assembly (also denoted as door panel) coupled to a front surface (or front face) of the door body. The panel assembly includes: a front plate forming a front face (or front surface) of the panel assembly and/or of the door, a light guide plate disposed to be spaced apart from a rear face (or rear surface) of the front plate, a lighting device including a light source for irradiating light to the light guide plate and a substrate on which the light source is disposed, wherein the lighting device is spaced apart from the light guide plate, and a bracket having a receiving space for accommodating the lighting device therein, the bracket including a support for supporting the light guide plate and/or for determining a position, i.e. a horizontal and/or vertical position, of the light source.

The terms "door panel" and "panel assembly" may be synonymously used.

The panel assembly, the home appliance and/or the refrigerator according to any one of these aspects may include one or more of the following features:

Directional indications, such as front, rear, upper/top, lower/bottom, etc. are to be understood with respect to an operational orientation of the home appliance in a state where the panel assembly is mounted on or at its door.

The home appliance may be any home appliance including a door for opening and closing a space formed in the home appliance. The home appliance may be a refrigerator, a dish washer, a laundry machine such as a clothing manager or a washing and/or drying machine, or a cooking device, e.g. an oven.

The panel assembly, in particular the front plate, may form a front surface of the door, i.e. may form an outer appearance thereof.

The bracket may be configured to align the light source of the lighting device with a center line of the light guide plate. The bracket may support and/or be in contact with the light guide plate. The bracket may support and/or be in contact with the lighting device, e.g. the light source.

The light guide plate may be configured to transmit light emitted from the lighting device towards the front plate. The front plate may be configured to transmit light from the light guide plate towards an outside of the panel assembly and/or the door and/or the home appliance. The door body may be untransparent or non-transmissive. The door body may be filled with insulating material, in case that the home appliance is a refrigerator.

A light transmission path may be formed from the lighting device through the light guide plate and the front plate to an outside of the door. The light source may be a LED. The lighting device may include a plurality of light sources on the substrate.

The support may support and/or be in contact with the light guide plate, in particular a bottom surface or lower surface thereof. The support may support and/or be in contact with a top surface or upper surface of the substrate of the lighting device for determining the position, e.g. a vertical position, of the lighting device.

The bracket may include a front face. The front face may also be called front part. The bracket may include a bottom face (the bottom face may also be called bottom part) and the front face may be extending upward from one side of the bottom face. The front face of the bracket may extend in vertical direction and/or in parallel to the front plate and/or in parallel to the light guide plate. That is, a front surface of the bracket, e.g. a front surface of the front part of the bracket, may extend in vertical direction and/or in parallel to the front plate and/or in parallel to the light guide plate. The front face of the bracket may be in contact with the front plate and/or with the light guide plate. A portion of the front face of the bracket may be disposed between the front plate and the light guide plate. The support may extend rearwardly, i.e. towards the door body, from the front face. The front face may extend in the vertical plane and/or the support may extend in a horizontal plane. The support may protrude from the front face at a right angle.

The front face may include a first front face (or first front part) and a second front face (or second front part) extending upward from the first front face. The second front face may support and/or be in contact with a front surface of the light guide plate. The support may divide the front face into the first front face and the second front face.

The support may include a first support and/or a second support. The second support may protrude rearwardly of the first support. That is, the second support may extend further towards the door body than the first support. The second support may be in contact with a side surface or lateral surface of the light source. The second support may support and/or be in contact with the light guide plate, e.g. a lower surface or bottom surface of the light guide plate. the first support may support and/or be in contact with a front surface of the light source, e.g. for determining a horizontal or front-rear position thereof.

The second support may include a plurality of second supports spaced apart from each other. The light source may be disposed between the second supports adjacent to each other.

The second supports may be in contact with side surfaces of the light sources and/or with a bottom surface of the light guide plate. Each light source may be, e.g. laterally, in contact with one or two adjacent second supports.

The front face may include a receiving groove defined therein for defining the receiving space. The receiving groove may be formed on a rear surface of the front face. A front end of the substrate may be accommodated in the receiving groove.

The front end of the substrate may be in contact with a rear surface of the front face defining the receiving groove.

The receiving groove may be located between the support and the bottom face.

A top surface or upper surface of the light source may be located lower than a top surface or upper surface of the support. A bottom surface or lower surface of the support may be in contact with a top surface or upper surface of the substrate. The light source may have a smaller vertical width than the support. In other words, the support may have a larger vertical width than the light source. The light guide plate may be spaced apart from the light source, in particular from the upper surface of the light source.

The lighting device may further include a light supporter for supporting the substrate from below. A lower surface of the light supporter may be supported by the bracket, i.e. by the bottom face of the bracket. A bracket rib protruding upward so as to support a bottom surface of the light supporter may be disposed on the bottom face of the bracket.

The refrigerator may further include a back cover coupled to the bracket. The back cover may form a rear surface of the panel assembly. The back cover may include a cover bent portion disposed between the bottom surface of the light supporter and the bracket rib. The back cover may support a rear surface of the light supporter.

The bracket may be a lower bracket forming a bottom surface or lower portion of the door panel. The bracket may be an upper bracket forming a top surface or upper portion of the door panel.

The bracket may include a front face (or front part) extending in parallel to a front surface of the door and/or to the light guide plate and/or to the front plate. The front face may include a first front face (or first front part) and a second front face (or second front part), both extending vertically and/or in parallel to a front surface of the door and/or to the light guide plate and/or to the front plate. The second front face may extend from the first front face, i.e. the first and second front faces may be connected to each other. A step may be formed between the first and second front faces. The support may be disposed between the first and second front face, e.g. extending from a boundary between the first and second front faces. The support may extend in horizontal direction. The bracket may include a bottom face, a first front face extending upward from one side of the bottom face, and a second front face extending upward from the first front face and supporting a front face of the light guide plate.

The second front face may extend along an arrangement direction of the light sources and/or may be disposed between the front plate and the light guide plate.

An upper end of the second front face may be located higher than a lower end of the light guide plate. That is, the second front face may cover a lower portion of the front surface of the light guide plate. An upper end and/or a lower end of the second front face may be located higher than the light source, i.e. the upper surface of the light source.

The second front face may support the rear surface of the front plate.

The refrigerator may further include a support member disposed between the front plate and the light guide plate, e.g. such that the front plate and the light guide plate are spaced apart from each other. The bracket, i.e. the front face of the bracket, in particular the second front face, may support and/or be in contact with a lower end of the support member.

The bracket may further include a spacing portion disposed between the light source and the second front face such that the light source and the second front face are spaced apart from each other, and in contact with one surface of the light source.

The spacing portion may support a top surface of the substrate and a bottom surface of the light guide plate.

A home appliance according to one embodiment of the present disclosure includes a cabinet having a storage section therein, and a door for opening and closing the cabinet, the door includes a door body and a door panel coupled to a front face of the door body, the door panel includes a front plate forming an outer appearance of a front face of the door panel, a light guide plate disposed to be spaced apart from a rear face of the front plate, a lighting device including a light source for irradiating light to the light guide plate and a substrate where the light source is disposed, wherein the lighting device is disposed to be spaced apart from one surface of the light guide plate, and a bracket having a receiving space for accommodating the lighting device therein, the bracket includes a bottom face, a front face extending upward from one side of the bottom face, and a support extending rearwardly from the front face, and the support supports a bottom face of the light guide plate and a top face of the substrate.

The front face includes a first front face and a second front face extending upward from the first front face, and the second front face supports a front face of the light guide plate.

Following effects may be expected according to the proposed embodiments:

According to the present embodiment, the shielding portion formed to shield the light source and the light guide plate portion installed in the lighting device may be disposed to prevent the hot-spot from appearing on the front face of the door while the lighting device is turned on, to improve a quality of the outer appearance of the face of the door, and to prevent glare of the user.

Further, according to the present embodiment, the shielding portion may be disposed between the front plate and the light guide plate, so that the front face of the front plate is not shielded by the shielding portion. Therefore, the entirety of the front face of the door may be formed only with the front face of the front plate, so that the outer appearance of the door front face is improved.

Further, according to the present embodiment, the shielding portion may be formed to extend upward by a length set based on the light source upper end. In this regard, the set length may be determined in consideration of the irradiation angle of the light source and the distance the light source is spaced apart from the shielding portion. Therefore, while minimizing an overall area of the shielding portion, the hot-spot may be prevented from occurring in an entire range of the viewing angle for viewing the lower end of the front plate from the front.

Further, according to the present embodiment, the lighting device may be mounted on the lower bracket by being inserted into the opened face of the lower bracket while the bottom face thereof is supported by the light supporter. In addition, one side face of the light source may be disposed to be in contact with the spacing portion of the lower bracket, so that the light source and the shielding portion may be mounted while being spaced apart from each other by a set distance. With such structure, there is an advantage in that an assembly error may be reduced and the mounted position of the light source may be maintained under external influences such as repeated opening and closing of the door. Therefore, the hot-spot may be effectively prevented from occurring by the movement of the light source due to the repeated opening/closing of the door.

Further, according to the present embodiment, the shielding portion may be formed integrally with the lower bracket. In detail, the shielding portion may be formed to extend upwardly from the lower bracket bottom face, and may be disposed between the front plate and the lighting device. Therefore, there may be no need for a separate component to prevent the hot-spot from appearing on the door front face, and assembly workability and productivity of the panel assembly may be improved.

Further, according to the present embodiment, because the color of the door front face may be variously selected and changed without replacing the panel assembly, the user's convenience is improved, and a cost and a work for replacing the panel assembly are not needed.

Further, according to the present embodiment, the entirety of the door front face may emit light evenly.

Further, according to the present embodiment, there is an advantage that the light source of the lighting device may be aligned with the center line of the light guide plate without the user's separate work or the separate structure during the assembly process of the panel assembly.

Further, according to the present embodiment, the light irradiated from the light source may be prevented from leaking directly to the front plate without being irradiated to the light guide plate, so that the occurrence of the lighting spot on the front plate may be prevented.

BRIEF DESCRIPTION OF DRAWINGS

FIG. 25 is a view showing a light emitting state based on a vertical level of a shielding portion when viewing a door panel from the front.

FIG. 33 is a front view showing a front outer appearance of a refrigerator with a lighting device turned on.

FIG. 34 is a cross-sectional view of an upper cap decoration in a refrigerator door, and FIG. 35 is a cross-sectional view of a lower cap decoration in a refrigerator door.

FIG. 38 is a front view showing a front outer appearance of a refrigerator with a lighting device of the refrigerator turned on.

DETAILED DESCRIPTIONS

Hereinafter, detailed embodiments will be described in detail with reference to the accompanying drawings. However, the present disclosure is not limited to the embodiments in which the idea of the present disclosure is proposed, and other degenerate idea or other embodiments included in the scope of the present disclosure may be easily proposed by addition, changes, deletions, etc. of other elements.

Prior to a description, directions are defined. In an embodiment of the present disclosure, a direction toward a door is defined as a front direction with respect to a cabinet shown in FIG. 1, a direction toward the cabinet with respect to the door is defined as a rear direction, a direction toward a bottom on which a refrigerator is installed is defined as a downward direction, and a direction away from the bottom is defined as an upward direction.

Figure 1:
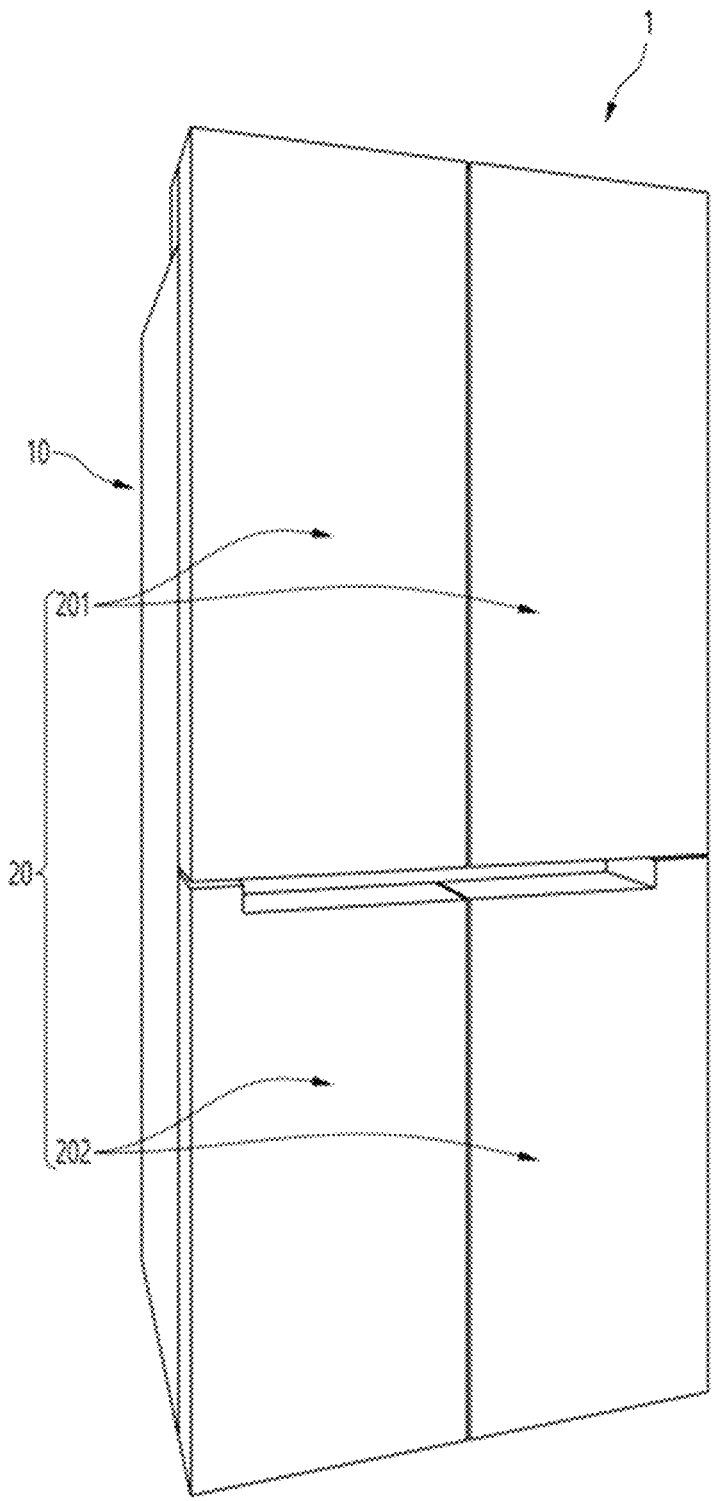
FIG. 1 is a perspective view of a refrigerator according to an embodiment of the present disclosure.

FIG. 1 is a perspective view of a refrigerator according to an embodiment of the present disclosure.

Referring to FIG. 1, an outer appearance of a refrigerator 1 according to the embodiment of the present disclosure may be formed by a cabinet 10 forming a storage space or a storage section, and a door 20 for opening and closing the storage space of the cabinet 10.

For example, the cabinet 10 may form the storage space partitioned in a vertical direction, and a refrigerating chamber may be formed at an upper portion, and a freezing chamber may be formed at a lower portion. The refrigerating chamber may be referred to as an upper storage space, and the freezing chamber may be referred to as a lower storage space.

The door 20 may be configured to open and close each of the refrigerating chamber and the freezing chamber. For example, the door may be pivotably mounted on the cabinet, and each of the refrigerating chamber and the freezing chamber may be opened and closed by the pivoting of the door. In one example, the door may have a structure opened and closed by retraction and extension.

The door may include a refrigerating chamber door 201 for opening and closing the refrigerating chamber, and a freezing chamber door 202 for opening and closing the freezing chamber. The refrigerating chamber door 201 may be referred to as an upper door, and the freezing chamber door 202 may be referred to as a lower door.

The refrigerating chamber door 201 may include a pair of a left refrigerating chamber door and a right refrigerating chamber door that are arranged side by side. The left refrigerating chamber door and the right refrigerating chamber door may open and close the refrigerating chamber while being independently pivoted. The left refrigerating chamber door and the right refrigerating chamber door may be disposed adjacent to each other and may have the same size.

Further, the freezing chamber door 202 may include a pair of a left freezing chamber door and a right freezing chamber door that are arranged side by side. The left freezing chamber door and the right freezing chamber door may open and close the freezing chamber while being independently pivoted. The left freezing chamber door and the right freezing chamber door may be disposed adjacent to each other and may have the same size.

In one example, although a refrigerator having a structure in which the refrigerating chamber is disposed at the upper portion and the freezing chamber is disposed at the lower portion is described as an example in the embodiment, the present disclosure may be applied to all types of refrigerators equipped with a door without being limited to a type of a refrigerator.

In one example, the door 20 may form a front appearance of the refrigerator 1 in the closed state and may form the out appearance of the refrigerator 1 viewed from the front in the state in which the refrigerator 1 is installed.

The door 20 may have a structure in which a front face selectively emits light and may be configured to emit light with set color or brightness. Thus, a user may change the color or the brightness of the front face of the door 20 without separating or disassembling the door 20 and may change the overall outer appearance of the refrigerator 1.

Hereinafter, the structure of the door 20 will be described in detail with reference to drawings.

Figure 2:
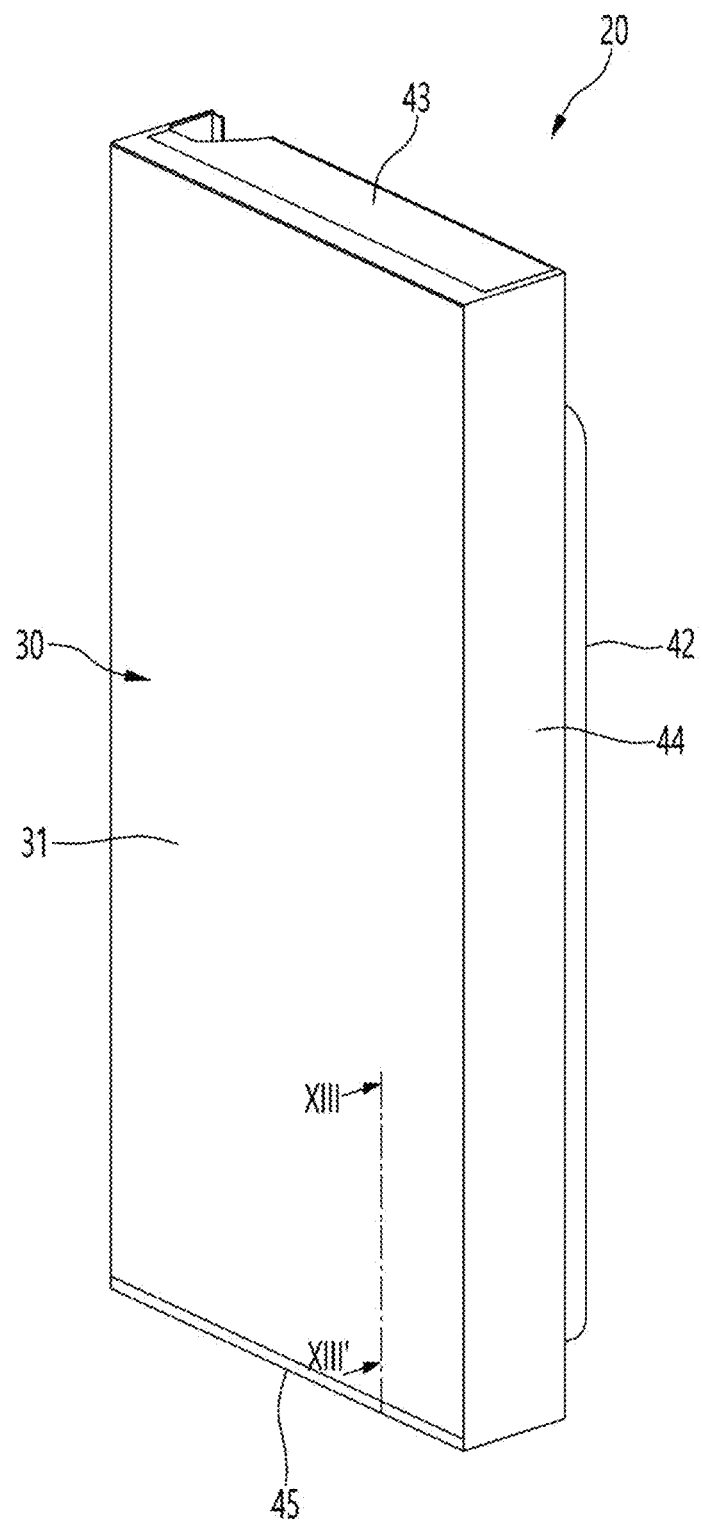
FIG. 2 is a perspective view of a refrigerator door according to an embodiment present disclosure.
Figure 3:
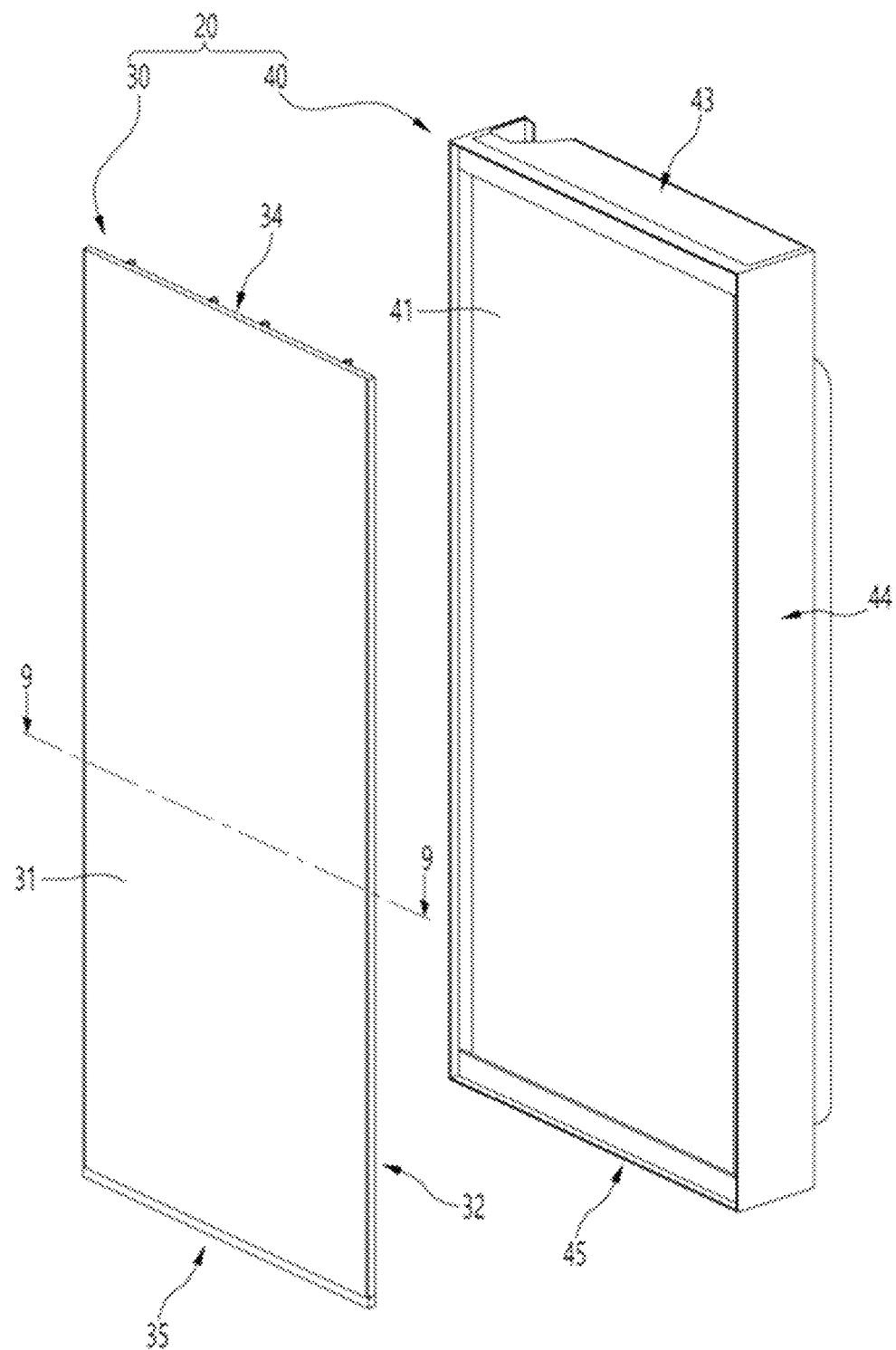
FIG. 3 is an exploded perspective view of the refrigerator door.

FIG. 2 is a perspective view of a refrigerator door according to an embodiment present disclosure. FIG. 3 is an exploded perspective view of the refrigerator door.

Referring to FIGS. 2 and 3, the door 20 may include a door body 40 forming the overall shape of the door 20, and a panel assembly 30 forming a front outer appearance of the door 20. That is, the door 20 may be constructed such that the panel assembly 30 is mounted on a front face of the door body 40.

The door body 40 may include a body plate 41 forming a front face and a door liner 42 forming a rear face. The body plate 41 may be made of a metal material and may be formed in a plate shape having a size corresponding to that of the panel assembly 30. The door liner 42 may be made of a plastic material and may form a bottom face shape of the door 20.

The door body 40 may further include side decorations 44 forming right and left side faces of the door body 21. The side decorations 44 may connect right and left side ends of the body plate 41 to right and left side ends of the door liner 42.

The door body 40 may further include an upper cap decoration 43 and a lower cap decoration 45 that respectively form top and bottom faces of the door body 40. The upper cap decoration 43 may be connected to an upper end of the side decoration 44, an upper end of the body plate 41, and an upper end of the door liner 42. The lower cap decoration 45 may be connected to a lower end of the side decoration 44, a lower end of the body plate 41, and a lower end of the door liner 42.

An outer appearance of the door body 40 may be formed by the body plate 41, the door liner 42, the side decorations 44, the upper cap decoration 43, and the lower cap decoration 45.

An insulator may be filled in an internal space of the door body 40, which is formed by coupling the body plate 41, the door liner 42, the side decorations 44, the upper cap decoration 43, and the lower cap decoration 45 to each other, and may provide an insulation structure to prevent heat from being transferred through the door 20. The insulator may be formed as time elapses after a foaming liquid is filled, as one example. The door body 40 may have an inlet for filling the foaming liquid.

In one example, a panel receiving space 410 that is opened forward may be defined in the front face of the door body 40. That is, front ends of the side decorations 44, the upper cap decoration 43, and the lower cap decoration 45 may protrude more forward than a front face of the body plate 41, and thus the panel receiving space 410 with an open front face may be formed in front of the body plate 41. The panel receiving space 410 may be defined with a size corresponding to the size of the panel assembly 30 and the panel assembly 30 may be inserted into the panel receiving space 410. A perimeter of the panel assembly 30 may be supported by a peripheral face of the panel receiving space 410, that is, protruding portions of the side decoration 44, the upper cap decoration 43, and the lower cap decoration 45.

The panel assembly 30 may be formed in a plate shape and may be formed with a size corresponding to that of a front face of the door body 40. Thus, when the panel assembly 30 is mounted on the front face of the door body 40, the panel assembly 30 may shield the front face of the door body 40 and may form a front outer appearance of the door 20. Because the panel assembly 30 may form the front outer appearance of the door 20, the panel assembly 30 may be referred to as a door panel, and because the panel assembly 30 may form the front outer appearance of the refrigerator 1, the panel assembly 30 may also be referred to as an exterior panel.

In the state in which the panel assembly 30 is mounted on the door body 40, a rear face of the panel assembly 30 may be fixed in contact with the body plate 41. To fixedly mount the panel assembly 30, a lower end of the panel assembly 30 may be caught and restrained with a lower end of the lower cap decoration 45, and an upper end of the panel assembly 30 may be coupled to an upper end of a front face of the upper cap decoration 43 to firmly couple the panel assembly 30 to the door body 40. The panel assembly 30 may be detachably mounted from the door body 40 for services and maintenance.

A front face of the panel assembly 30 may be exposed forward in the state in which the panel assembly 30 is mounted on the door body 40, and the panel assembly 30 may substantially form the front outer appearance of the door 20. The panel assembly 30 may be configured to emit light from an entirety of the front face thereof and may be configured to emit light with various colors.

To this end, a lighting device 36 may be disposed inside the panel assembly 30. An electrical wire 381 may be connected to the lighting device 36 in order to supply and control power. The electrical wire 381 may be exposed outside the rear face of the panel assembly 30, and a connector 382 may be disposed at an end of the wire 381.

Although not illustrated in detail, a structure connected to the connector 382 of the electrical wire 381 to supply power to the lighting device 36 may be disposed on a front face of the door body 40.

Hereinafter, the structure of the panel assembly 30 will be described in more detail with reference to drawings.

Figure 4:
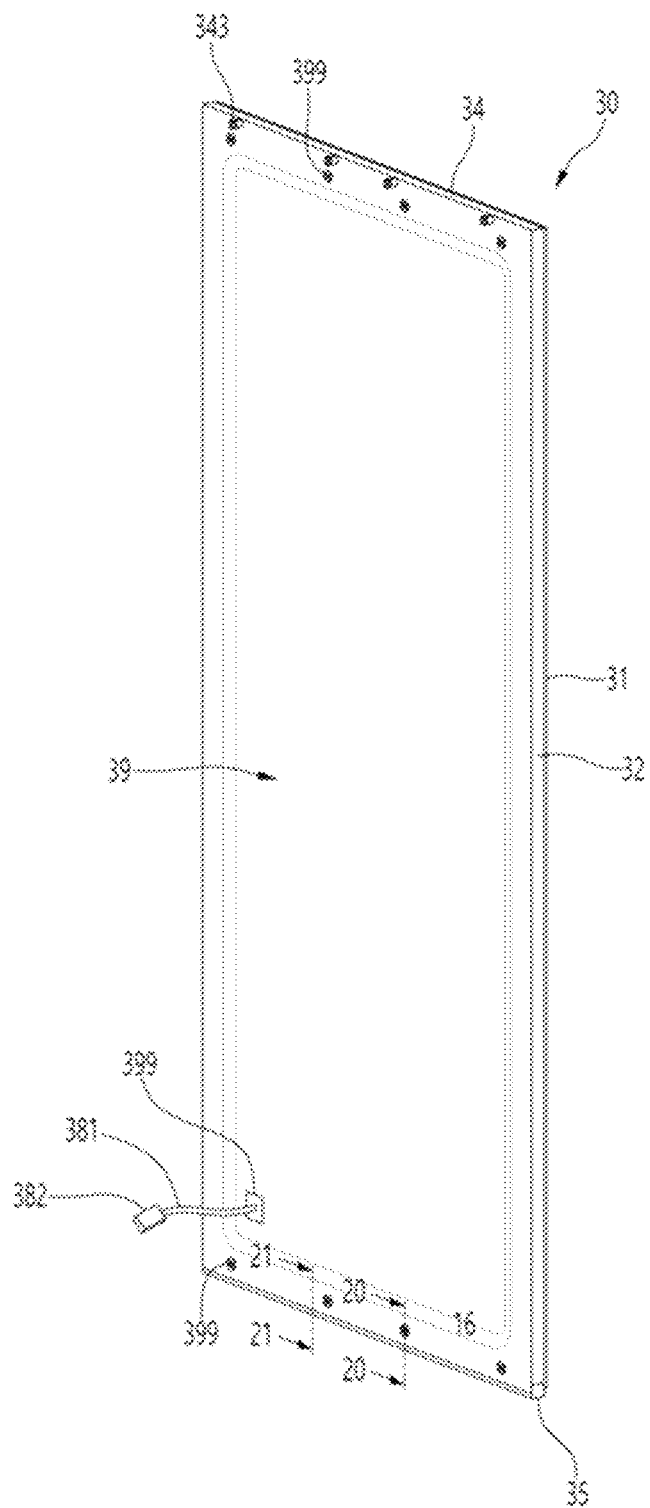
FIG. 4 is a rear perspective view of a panel assembly according to an embodiment of the present disclosure.
Figure 5:
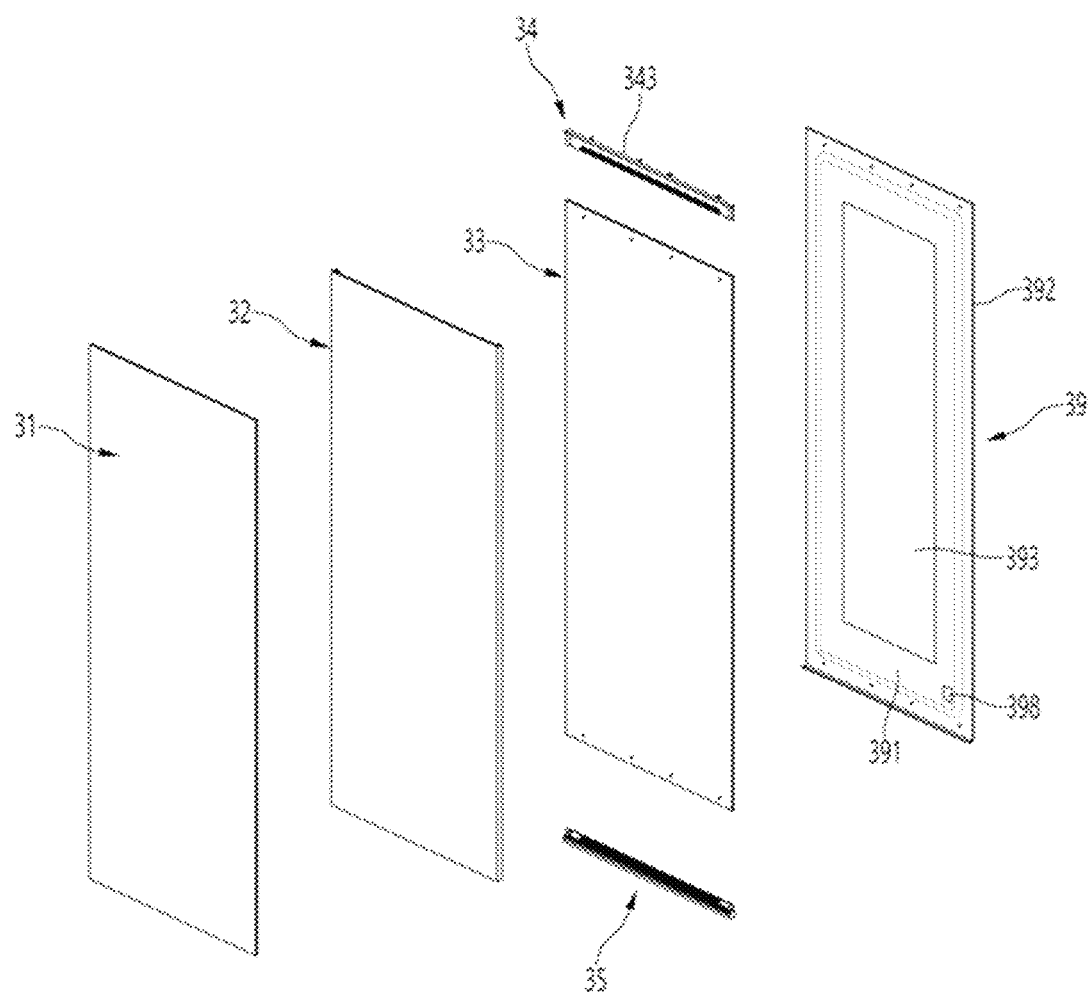
FIG. 5 is an exploded perspective view of the panel assembly viewed from the front.
Figure 6:
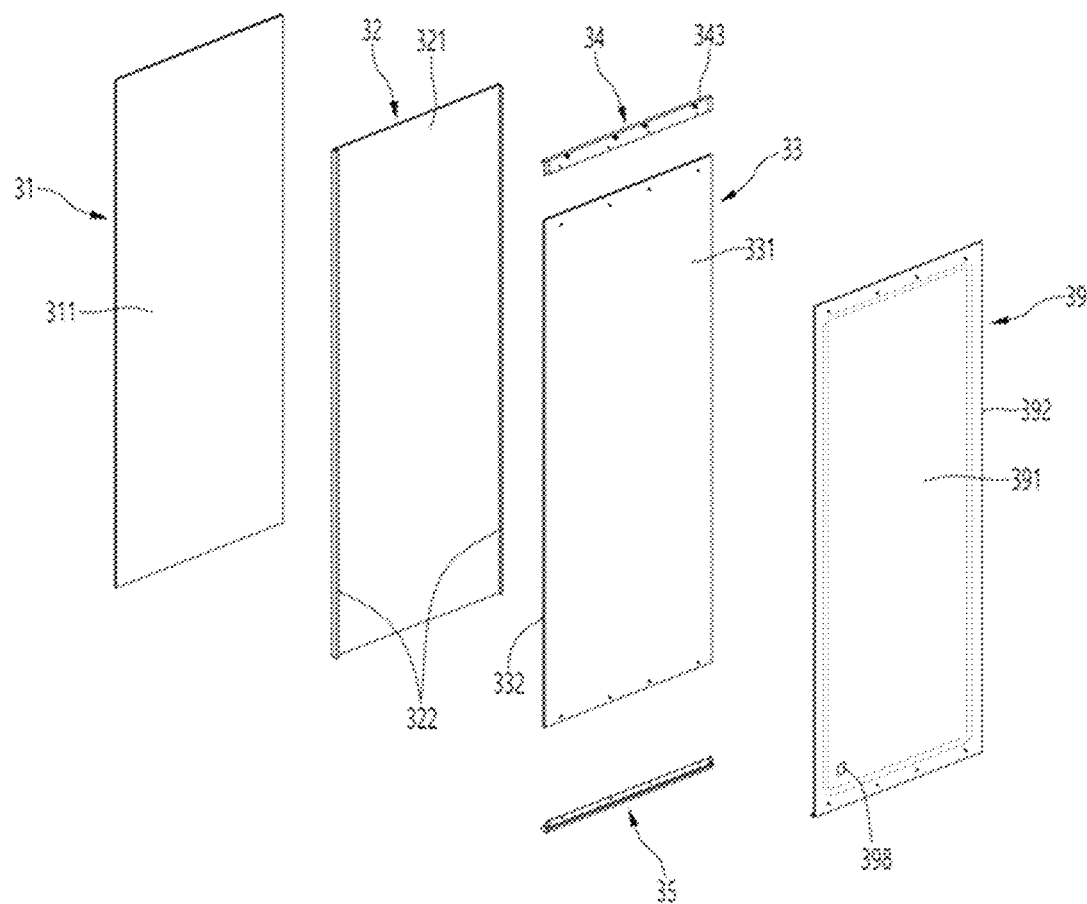
FIG. 6 is an exploded perspective view of the panel assembly viewed from the rear.

FIG. 4 is a rear perspective view of a panel assembly according to an embodiment of the present disclosure. FIG. 5 is an exploded perspective view of the panel assembly viewed from the front. FIG. 6 is an exploded perspective view of the panel assembly viewed from the rear.

As shown in the drawings, the panel assembly 30 may include a front plate 31 forming a front outer appearance, the lighting device 36 for emitting light to cause the front plate 31 to emit light, and a light guide plate 33 for guiding light emitted from the lighting device 36.

In addition, the panel assembly 30 may additionally include a support member 32 on which the light guide plate 33 and the front plate 31 are mounted.

The panel assembly 30 may include an upper bracket 34 forming a top face of the panel assembly 30 and a lower bracket 35 forming a bottom face of the panel assembly 30. The lighting device 36 may be mounted on the lower bracket 35. The panel assembly 30 may further include a back cover 39 forming a rear face.

In more detail, the front plate 31 may be formed in a rectangular plate shape and may be made of a material that transmits light therethrough. In one example, the front plate 31 may be made of a glass material such as blue glass, white glass, and vapor deposition glass or may be made of other materials for transmitting light therethrough, such as ABS, PMMA, or PC. The front plate 31 may be referred to as a transparent plate or an out plate.

The front plate 31 may be formed to be transparent to allow light reflected by the light guide plate 33 to be transmitted. In this case, the transparency may be defined as an amount to which the light reflected by the light guide plate may be transmitted and irradiated to the outside.

The front panel 31 may be formed to have color and may be formed to represent different colors depending on an operation or ON and OFF states of the lighting device 36. For example, a specific design or pattern may be printed on the front plate 31 to have specific color. A film with a specific design or pattern printed thereon may be attached to the front plate 31, face treatment such as imprinting, etching, and glass printing may be performed on the front plate 21, or a coating or deposition layer having specific color and texture may be formed to form an outer appearance of the front plate 31.

The front plate 31 may be configured to transmit light emitted from the lighting device 36 but components behind the front plate 31 may not be seen therethrough. That is, in the state in which the lighting device 36 is turned off, components inside the panel assembly 30 may be prevented from being seen to the outside through the front plate 31 due to the color of the front plate 31.

In this regard, in an OFF state, the front plate 31 may be formed to have a color having brightness equal to or greater than 0 other than black. That is, in a state in which the refrigerator 1 is installed, the front face of the refrigerator 1 may be viewed in a color other than black, and the color of the front face of the refrigerator may be changed according to an operation of the lighting device 36.

The front plate 31 may be formed to have a size corresponding to a size of a front face of the panel assembly 30, which is exposed to the outside. In detail, an upper end and right and left side ends of the front plate 31 except for a lower end may be formed to have the same sizes as those of the panel assembly 30. The lower end of the front plate 31 may be positioned somewhat higher than the lower end of the panel assembly 30, that is, the lower end of the lower bracket 35, but the exposed portion of the lower bracket 35 may be shielded by the lower cap decoration 45 in the state in which the panel assembly 30 is mounted. Thus, the entirety of the front face of the front plate 31 which is exposed to the outside in the state in which the panel assembly 30 is mounted may be formed by the front plate 31.

In one example, the front plate 31 may be formed to be larger than the light guide plate 33. A rear face of the front plate 31 may be coupled to a front face of the support member 32. Thus, in the state in which the front plate 31 is mounted on the support member 32, a separate component is not present at the perimeter of the front plate 31, and the front plate 31 may form the front appearance of the panel assembly 30.

Because the support member 32 may transmit light, the support member 32 may be referred to as a transmissive plate, and because the support member 32 may form a structure including the side faces of the panel assembly 340, the support member 32 may be referred to as a frame.

The light guide plate 33 may be spaced apart from and positioned at the rear of the front plate 31 and may be configured to forwardly guide light emitted from the lighting device 36 disposed beneath the light guide plate 33.

For example, the light guide plate 33 may be made of a transparent polymer material such as acryl. The light guide plate 33 may have a light diffuser added thereto for diffusing light incident on the light guide plate 33 or a pattern for diffusing light may be further formed on the light guide plate 33. Thus, light may be transferred to the front plate 31 by the light guide plate 33, and in this case, a pattern of the light guide plate 33 may be set to cause the entire front face of the panel 31 to emit light with uniform brightness.

The light guide plate 33 may be entirely formed in a rectangular plate shape and may be formed with a somewhat smaller size than the front plate 31. That is, a width in a left and right direction of the light guide plate 33 may be smaller than a width in a left and right direction of the front plate 31, and a vertical length of the light guide plate 33 may be smaller than a vertical length of the front plate 31.

The light guide plate 33 may be supported by the back cover 39 from the rear and may be fixed in a state of maintaining a predetermined spacing from the front panel 31 by the support member 32.

In one example, the support member 32 may be disposed between the front plate 31 and the light guide plate 33. The support member 32 may be used to fixedly mount the light guide plate 33 and the front plate 31, and in particular, may maintain the light guide plate 33 at a predetermined spacing from the front plate 31.

However, in one embodiment of the present disclosure, the light guide plate 33 and the front plate 31 are described as being fixedly mounted to the support member 32, but the present disclosure is not limited thereto.

Therefore, in the state in which the support member 32 is not disposed between the light guide plate 33 and the front plate 31, the light guide plate 33 and the front plate 31 may be fixedly mounted by other components constituting the panel assembly 31.

The front face of the support member 32 may support the front plate 31 and opposite side faces of the support member 32 may restrain both ends of the light guide plate 33. The front face of the support member 32 may have a size greater than or equal to the size of the light guide plate 33. In the state in which the light guide plate 33 is mounted, the front face of the member 32 and the light guide plate 33 may be maintained in face-contact with each other.

In detail, the support member 32 may include a front portion 321 in a shape of a plate on which the front plate 31 is mounted, and side portions 322 that are formed at right and left side ends of the front portion 321 and on which the light guide plate 33 is mounted.

The front portion 321 may be formed in the shape of the plate corresponding to the front plate 31, and a front face of the light guide plate 33 may be in close contact with a rear face of the front portion 321. The side portions 322 may extend rearward from right and left side ends of the front portion 321 and may be formed to restrain right and left side ends of the light guide plate 33.

In one example, the support member 32 may be made of a material for transmitting light therethrough and may be entirely formed by injection or extrusion as a single component. For example, the support member 32 may be made of a material such as ABC, PC, or acryl, and may transmit light reflected by the light guide plate 33 therethrough to make the light pass through the front plate 31.

An entirety of the support member 32 may be made of a transparent or translucent material, and the support member 32 itself may be formed to have a color. Accordingly, a color, a texture, or a shape of the front face of the panel assembly 30 may be determined by the support member 32 when viewing the panel assembly 30 from the front. The support member 32 may have corrosion or a pattern formed on the front face thereof through which light is transmitted, and such corrosion or pattern may appear when viewing the panel assembly 30 from the front.

The upper bracket 34 may be disposed at an upper end of the panel assembly 30. The upper bracket 34 may form a top face of the panel assembly 30. The upper bracket 34 may be injection-molded with a plastic material, and may form a structure coupled to the support member 32 and a structure coupled to the back cover 39.

The upper bracket 34 may be coupled to the upper end of the support member 32 and may extend from a left end of the upper end of the support member 32 to a right end thereof. The upper bracket 34 may be exposed through the top face of the panel assembly 30 in the state of being mounted.

In one embodiment of the present disclosure, the description has been made that the upper bracket 34 and the upper end of the support member 32 are coupled to each other, but the present disclosure is not limited thereto.

In a state in which the support member 32 is not disposed, the upper bracket 34 may be coupled to other components constituting the panel assembly 30.

The back cover 39 may be coupled to the rear face of the upper bracket 34. The back cover 39 may be screw-fastened to the upper bracket 34. The rear face of the light guide plate 33 may be supported by the front face of the upper bracket

34. That is, when the back cover 39 is coupled, the upper bracket 34 may support the light guide plate 33 from the rear.

The lower bracket 35 may be disposed at the lower end of the panel assembly 30. The lower bracket 35 may form a bottom face of the panel assembly 30. The lower bracket 35 may be injection-molded with a plastic material and may form a structure coupled to the support member 32 and a structure coupled to the back cover 39.

The lower bracket 35 may be coupled to the lower end of the member 32 and may extend from a left end of the lower end of the member 32 to a right end thereof. The lower bracket 35 may be exposed through a bottom face of the panel assembly 30 in the state of being mounted.

In one embodiment of the present disclosure, the description has been made that the lower bracket 35 and the lower end of the support member 32 are coupled to each other, but the present disclosure is not limited thereto.

In a state in which the support member 32 is not disposed, the lower bracket 35 may be coupled to other components constituting the panel assembly 30.

The back cover 39 may be coupled to the rear face of the lower bracket 35. The back cover 39 may be screw-fastened to the lower bracket 35. The rear face of the light guide plate 33 may be supported by the front face of the lower bracket 35. That is, when the back cover 39 is coupled, the lower bracket 35 may support the light guide plate 33 from the rear.

Thus, during a process in which the panel assembly 30 is assembled, right and left side ends of the light guide plate 33 may be fixed by the member 32, and the upper and lower ends of the light guide plate 33 may be supported by the upper bracket 34 and the lower bracket 35 from the rear.

The lighting device 36 may be mounted on the lower bracket 35. The lighting device 36 may be configured to emit light for determining the color and brightness of the front face of the panel assembly and to emit light toward the light guide plate 33. The lighting device 36 may be disposed inside the lower bracket 35 and may be assembled and mounted with the lower bracket 35 in the state of being mounted on the lower bracket 35.

The back cover 39 may form a rear face of the panel assembly 30 and may be coupled to the upper bracket 34 and the lower bracket 35. The back cover 39 may be made of a metal material such as stainless or aluminum. The back cover 39 may be formed with a size corresponding to the size of the panel assembly 30 and may form an entire shape of the rear face of the panel assembly 30.

The rear face of the light guide plate 33 may be supported by a cover protrusion 391 protruding on the center of the back cover 39, from the rear. Thus, the light guide plate 33 may have a stable support structure as a whole and may maintain a table mounting state in the state in which the back cover 39 is mounted thereon. The upper bracket 34 and the lower bracket 35 may be arranged at positions corresponding to an upper end and a lower end of the back cover 39.

Right and left side ends of a cover perimeter 392, which form a perimeter of the back cover 39, may be in contact with the side portions 322 of the support member 32, and upper and lower ends of the cover perimeter 392 may be in contact with the upper bracket 34 and the lower bracket 35, respectively.

Multiple screws 399 may be fastened along the upper and lower ends of the cover perimeter 392 and may be fastened to the upper bracket 34 and the lower bracket 35 through the back cover 39 to fixedly mount the back cover 39.

In one example, the structures of the light guide plate 33, the support member 32, the back cover 39, the upper bracket 34, and the lower bracket 35 will be described below in more detail with reference to the drawings.

Figure 7:
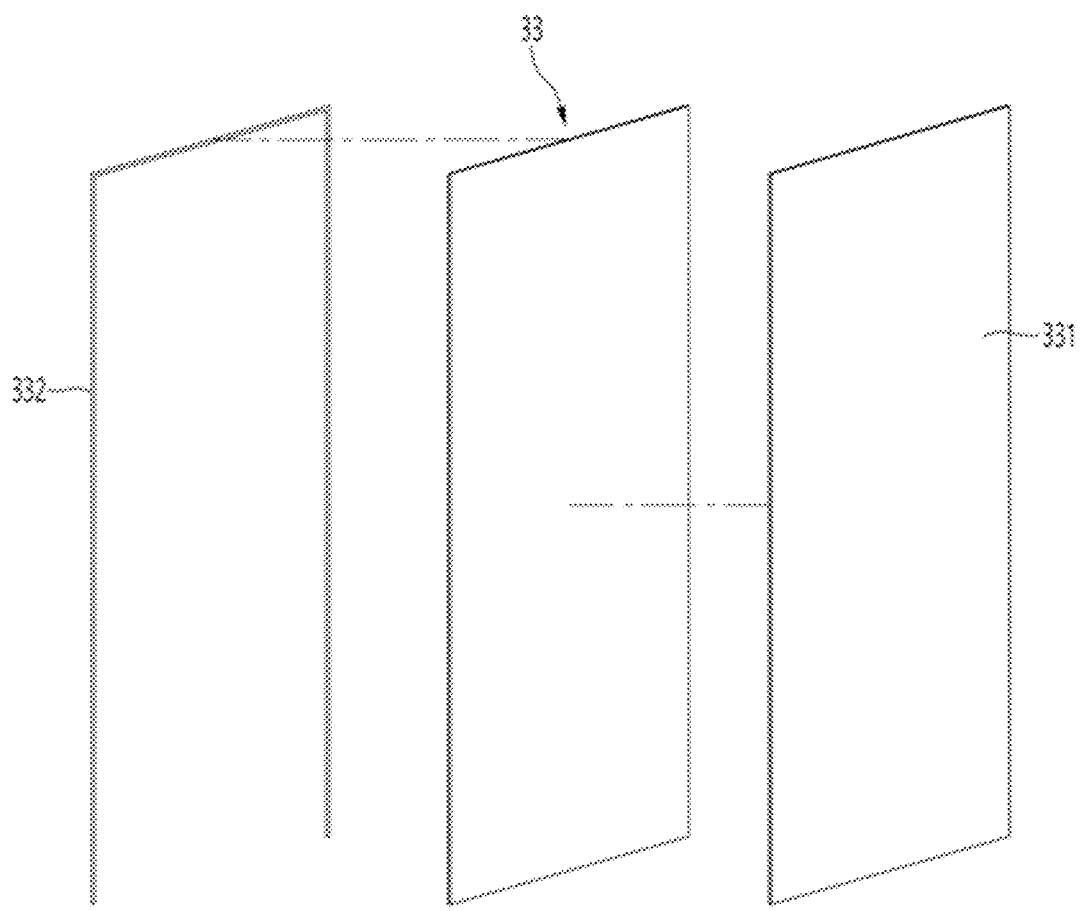
FIG. 7 is an exploded perspective view showing a coupled structure of a light guide plate, a reflective layer, and a reflective member, which are components of a panel assembly.

FIG. 7 is an exploded perspective view showing a coupled structure of a light guide plate, a reflective layer, and a reflective member, which are components of a panel assembly.

As shown in the drawing, the light guide plate 33 may be formed in a rectangular plate shape. The light guide plate 33 may be formed with a size corresponding to or somewhat smaller than the sizes of the front plate 31 and the front portion 321 of the support member 32.

The light guide plate 33 may be formed with a thickness to be inserted into a side portion of the support member 32, and may be formed such that, in the state in which the light guide plate 33 is mounted on the member 32, a front face of the light guide plate 33 is completely in contact with a rear face of the front portion 321 of the support member 32, and thus a gap is not generated therebetween.

In one example, the light guide plate 33 may be formed to reflect light of the lighting device 36, emitted from below, along the light guide plate 33 and to uniformly transfer the light forward, that is, to an entire face of the front plate 31.

To this end, a pattern for reflecting light emitted along the light guide plate 33 forward may be formed on the light guide plate 33.

A pattern formed on the light guide plate 33 will be described later with reference to the drawings.

A reflective layer 331 may be disposed on the rear face of the light guide plate 33. The reflective layer 331 may be formed to have the same size as the light guide plate 33 and may be formed in a shape of a sheet. The reflective layer 331 may be in close contact with the rear face of the light guide plate 33, and as necessary, may also be adhered to the rear face of the light guide plate 33.

The reflective layer 331 may be coated or patterned to cause a front face thereof to reflect light, and the front face of the reflective layer 331 may be in contact with the rear face of the light guide plate 33. Thus, light moved along the reflective layer 331 may be reflected by the front face of the reflective layer 331 to be directed forward and may be reflected to the front plate 31.

The reflective layer 331 may be slidably inserted into the support member 32 in the state of being in contact with the light guide plate 33 and may be maintained in the state of being in contact with the reflective layer 331. To this end, the reflective layer 331 may be configured to be maintained in the state of being in contact with the light guide plate 33 by static electricity or friction force.

In one example, a reflective member 332 may be further disposed along an outer perimeter of the light guide plate 33. The reflective member 332 may be made of the same material as that of the reflective layer 331 and may direct light leaking through a perimeter face of the light guide plate 33 again into the light guide plate 33 to further increase the reflection efficiency of the light guide plate 33.

Light leaking to the outside through a perimeter of the light guide plate 33 may be blocked by the reflective member 332, and thus light may also be prevented from leaking to the outside through the side portion 322 of the support member 32 made of a transparent or translucent material, which is adjacent to an end of the light guide plate 33.

The reflective member 332 may be adhered to a perimeter of an outer face of the light guide plate 33 by a tape or an adhesive, and a face on which a pattern for reflecting light into the light guide plate 33 is formed may be adhered to a perimeter face of the light guide plate 33.

The reflective member 332 may be disposed on a portion of the entire perimeter face of the light guide plate 33. In detail, the reflective member 332 may be disposed along a top face and right and left side faces of the perimeter of the light guide plate 33 except for a bottom face of the perimeter of the light guide plate 33, which faces the lighting device 36. The light guide plate 33 may be mounted on the support member 32 in the state in which the reflective layer 331 and the reflective member 332 are in contact with each other.

Figure 8:
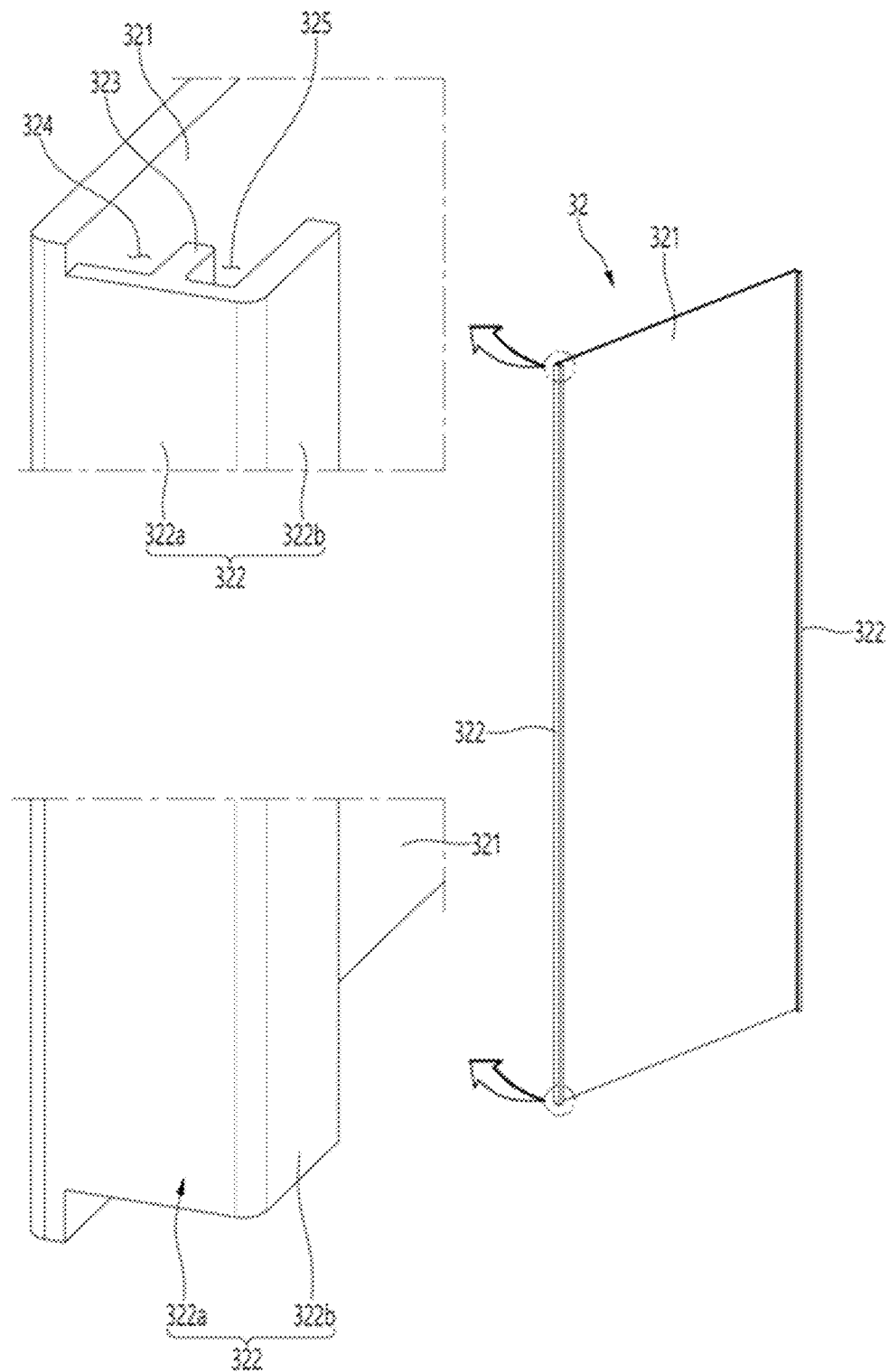
FIG. 8 is a rear perspective view of a support member, which is a component of a panel assembly.
Figure 9:
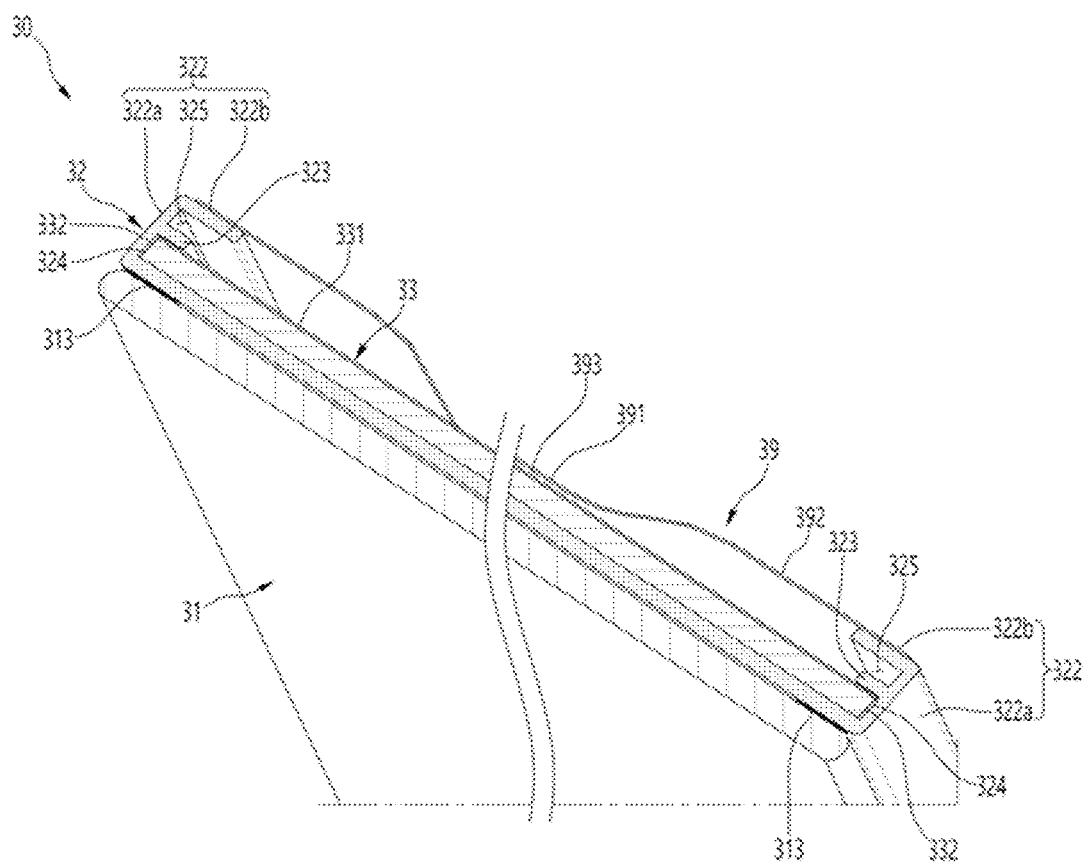
FIG. 9 is a perspective view of FIG. 3 cut along a line 9-9.

FIG. 8 is a rear perspective view of a support member, which is a component of a panel assembly. FIG. 9 is a perspective view of FIG. 3 cut along a line 9-9.

As shown in the drawings, an entirety of the support member 32 may be formed by injection molding of a resin material and may be made of a transparent material, and thus light reflected forward through the light guide plate 33 may be transmitted and directed toward the front plate 31.

The support member 32 may include the front portion 321 formed in a shape of a plate, and the side portions 322 that protrude rearward from the right and left side ends of the front portion 321. The front portion 321 may be disposed between the front plate 31 and the light guide plate 33, the front face thereof may support the front plate 31, and the rear face thereof may support the light guide plate 33.

The front portion 321 may be formed in a shape of a plate having a size corresponding to that of the front plate 31, and a sealant 313 may be applied on the perimeter of the front face of the front portion 321 to adhere the front plate 31 to the support member 32. In this regard, the sealant 313 may be made of a transparent or light-transmissive material, and the entire area of the front plate 31, which contains an area on which the sealant 313 is applied, may emit light.

For example, the sealant 313 may be applied on upper, lower, and left and right side edges of the front face of the front portion 321 to have a predetermined width.

In the state in which the light guide plate 33 is mounted, the rear face of the front portion 321 may be maintained in the state of being completely in contact with the front face of the light guide plate. Thus, the light guide plate 33 may always maintain a predetermined spacing from the front plate 31 and may direct light of an entirety of the light guide plate 33 toward the panel 31 without being interfered.

In one example, the side portions 322 may be formed along the right and left side ends of the light guide plate 33. The side portion 322 may be stepped with upper and lower ends of the light guide plate 33 and may be formed to match with side ends of the upper bracket 34 and the lower bracket 35.

The side portion 322 may include a first face 322a extending rearward from each of the right and left side ends of the front portion 321 and a second face 322b bent at an end of the first face 322a.

The first face 322a may extend perpendicularly to the front portion 321 from each of the right and left side ends of the front portion 321 and may form a side face of the panel assembly 30. That is, an extended length of the first face 322a may correspond to a width of the side face of the panel assembly 30. An internal space of the panel assembly 30 may be defined by the first face 322a and may define a space for mounting at least the light guide plate 33, the upper bracket 34, and the lower bracket 35 therein. Upper end and lower end of the first face 322a may be formed to be stepped with respect to the upper end and the lower end of the front portion 321, respectively.

The second face 322b may be bent inwardly from an extended end of the first face 322a. That is, a pair of second faces 322b respectively formed on a pair of first faces 322a may extend in a direction facing each other.

The second faces 322b may respectively extend perpendicularly to the first faces 322a, and may be formed to constrain both ends of each of the upper bracket 34 and the lower bracket 35. The second face 322b may extend from an upper end to a lower end of the first face 322a, and may support each of the left and right side ends of the back cover 39.

In one example, a side rib 323 may be further formed on an inner face of the first face 322a. The side rib 323 may be formed between the front portion 321 and the second face 322b, and may extend perpendicularly to the first face 322a. The side rib 323 may extend from the upper end to the lower end of the first face 322a. The side rib 323 may be formed to have a width in the left and right direction smaller than that of the second face 322b.

The side rib 323 may partition a space defined by the side portion 322 in a front and rear direction to define a space into which the light guide plate 33, the upper bracket 34, and the lower bracket 35 are inserted in a sliding manner.

In detail, the side rib 323 may be positioned between the front portion 321 and the second face 322b, and may be formed in parallel with the front portion 321 and the second face 322b. The side rib 323 may partition the space between the front portion 321 and the second face 322b to define a light guide plate-inserted space 324 into which the light guide plate 33 is inserted, and a bracket-inserted space 325 into which the upper bracket 34 and lower bracket 35 are inserted.

The light guide plate-inserted space 324 may be defined between the front portion 321 and the second rib 323. A length in the front and rear direction of the light guide plate-inserted space 324 may correspond to the thickness of the light guide plate 33. Thus, the light guide plate 33 may be inserted into the light guide plate-inserted space 324 by being slidably moved in the vertical direction, and the right and left side ends of the light guide plate 33 may be restrained at both side ends of the support member 32. In this regard, the front face of the light guide plate 33 may be in contact with the rear face of the front portion 321.

In the state in which the light guide plate 33 is inserted into the light guide plate-inserted space 324, the lower end of the light guide plate 33 may be positioned at a location for facing the lighting device 36. In particular, the light guide plate 33 may be disposed on the same extension line as the light source 362 of the lighting device 36, and in the state in which the light guide plate 33 is fixedly inserted into the light guide plate-inserted space 324, movement in the front and rear direction of the light guide plate 33 may be restrained.

That is, even when the door 20 is repeatedly opened and closed, the light guide plate 33 may be in contact with the front portion 321, may be maintained at a predetermined spacing from the front plate 31, and may not deviate from a position at which the light guide plate 33 is originally installed. The state in which the light guide plate 33 is disposed on the same extension line as the light source 362 included in the lighting device 36 may be maintained, and thus it may be possible to ensure that light emitted from the light source 362 is directed toward an end of the light guide plate 33.

The bracket-inserted space 325 may be defined between the second rib 323 and the second face 322b. A length in the front and rear direction of the bracket-inserted space 325 may correspond to a thickness of an upper bracket front portion 341 and a lower bracket front face 351 (also called front part 351). Thus, the upper bracket 34 and the lower bracket 35 may be inserted into the bracket-inserted space 325 from above and below and may be fixedly mounted on the upper and lower ends of the support member 32, respectively.

In this regard, the upper bracket 34 and the lower bracket 35 may be inserted into the bracket-inserted space 325, and simultaneously, may be accommodated on stepped portions of the upper and lower ends of the side portion 322 and be firmly coupled to the support member 32. In the state in which the upper bracket 34 and the lower bracket 35 are coupled to the support member 32, the upper and lower ends of the panel assembly 30 may be formed.

Figure 10:
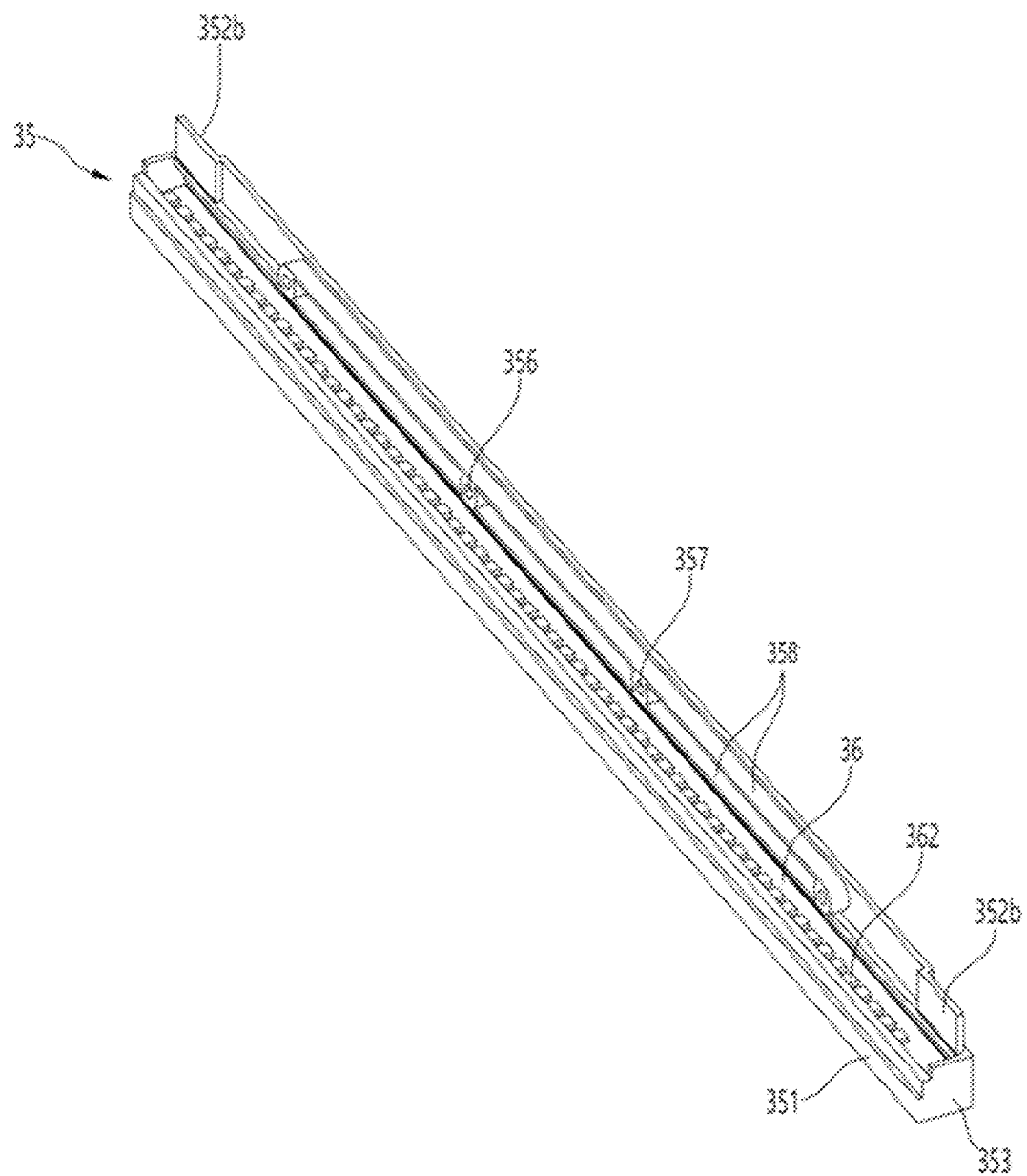
FIG. 10 is a perspective view in which a lower bracket, a lighting device, and a light supporter, which are components of the panel assembly, are coupled to each other.
Figure 11:
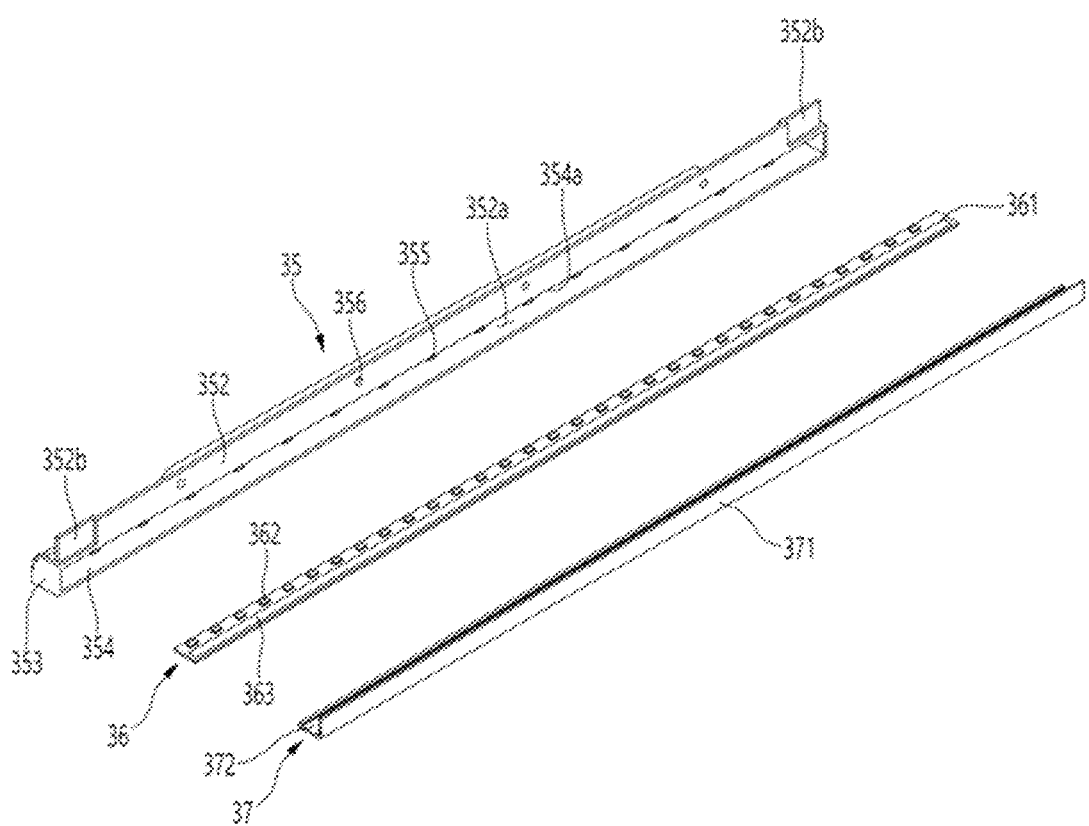
FIG. 11 is an exploded perspective view of a coupled structure of a lower bracket, a lighting device, and a light supporter viewed from the rear.
Figure 12:
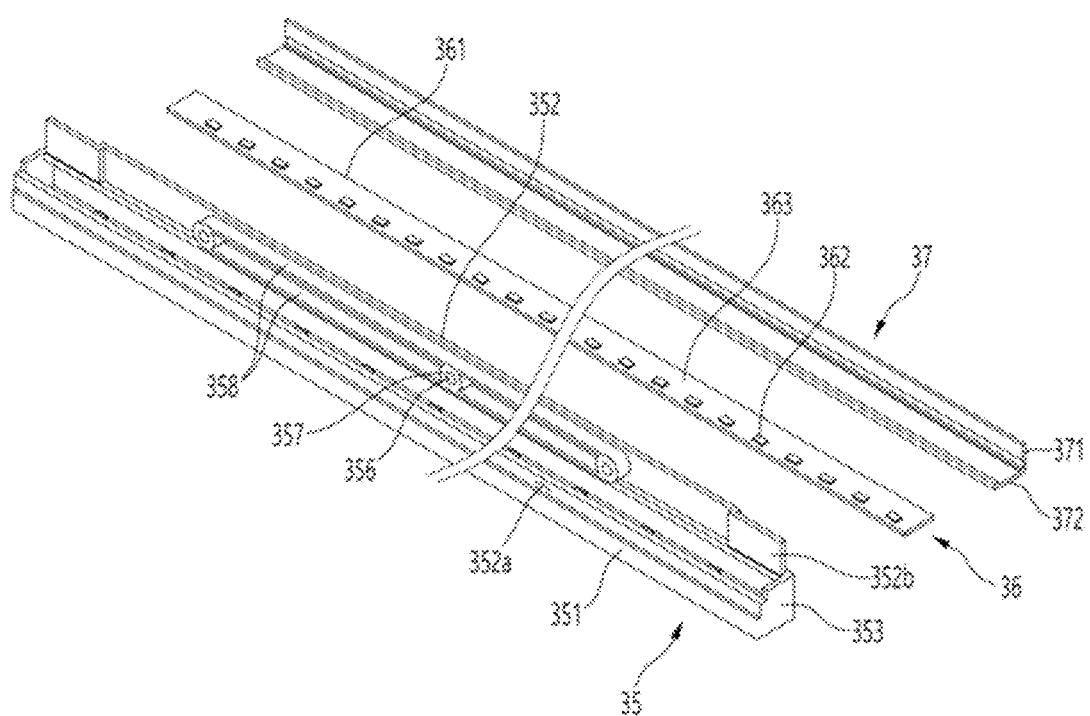
FIG. 12 is an exploded perspective view of a coupled structure of a lower bracket, a lighting device, and a light supporter viewed from the front.
Figure 13:
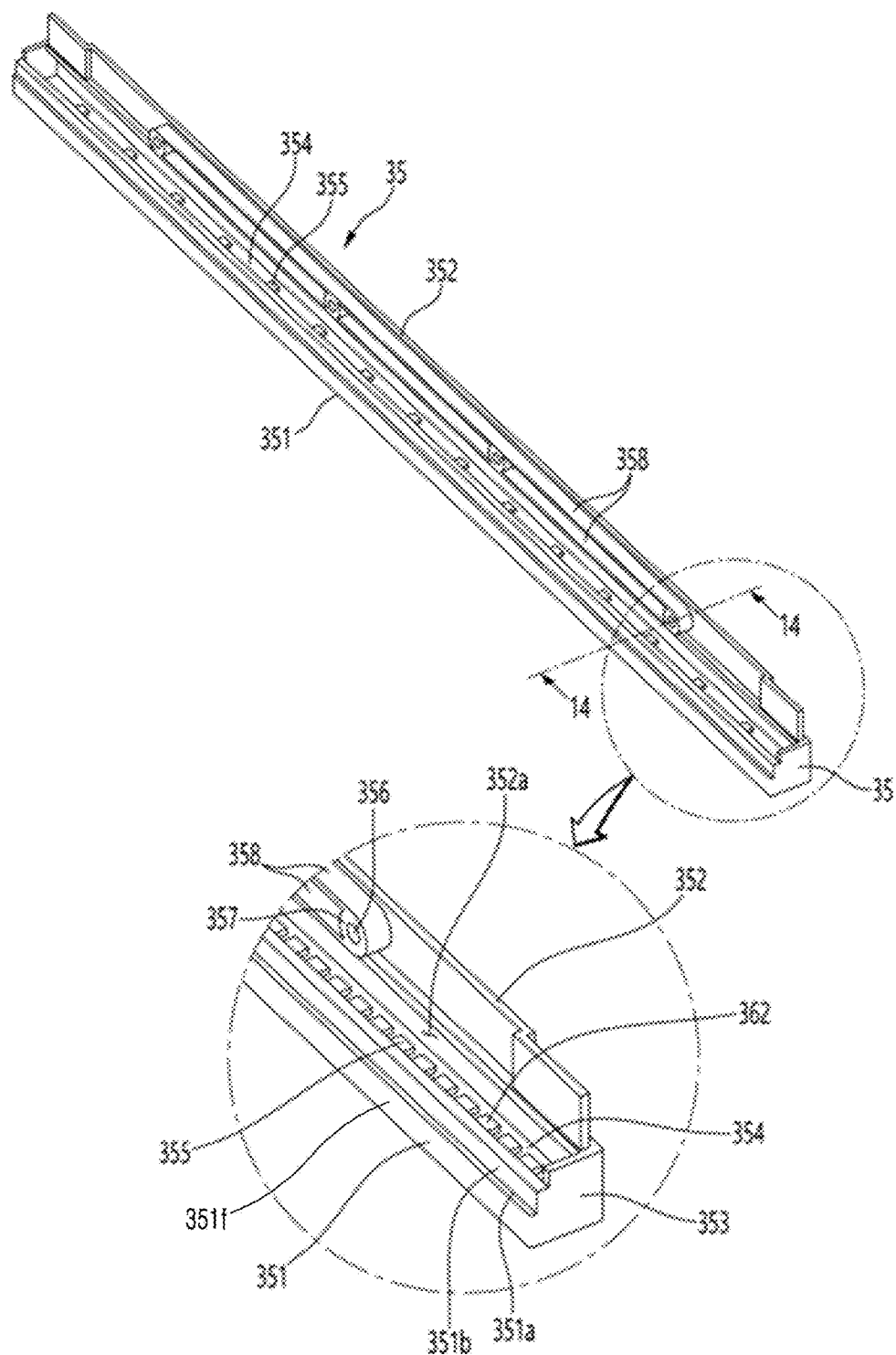
FIG. 13 is a front perspective view of a lower bracket.
Figure 14:
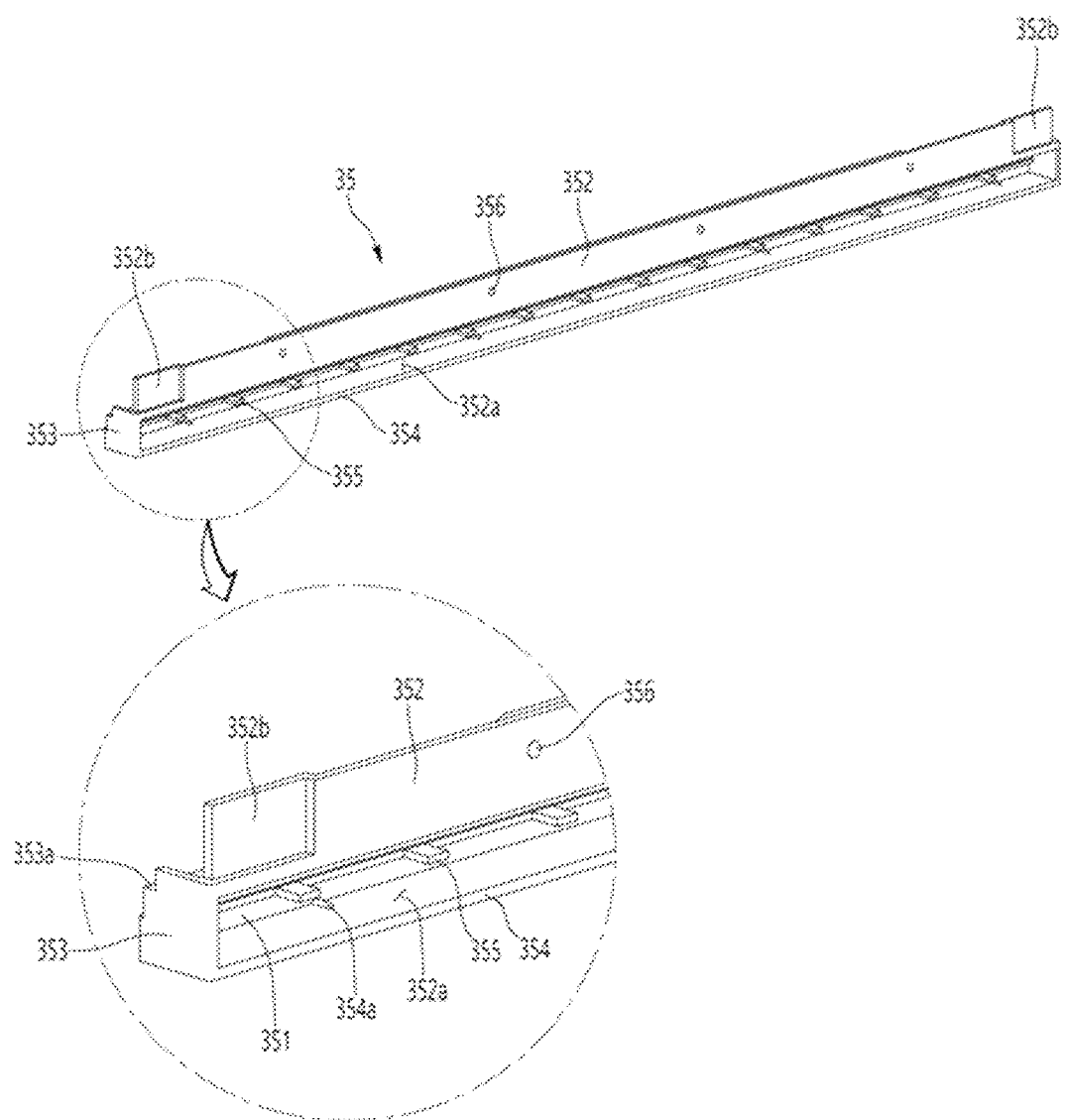
FIG. 14 is a rear perspective view of a lower bracket.

FIG. 10 is a perspective view in which a lower bracket, a lighting device, and a light supporter, which are components of the panel assembly, are coupled to each other. FIG. 11 is an exploded perspective view of a coupled structure of a lower bracket, a lighting device, and a light supporter viewed from the rear. FIG. 12 is an exploded perspective view of a coupled structure of a lower bracket, a lighting device, and a light supporter viewed from the front. FIG. 13 is a front perspective view of a lower bracket. FIG. 14 is a rear perspective view of a lower bracket.

Figure 15:
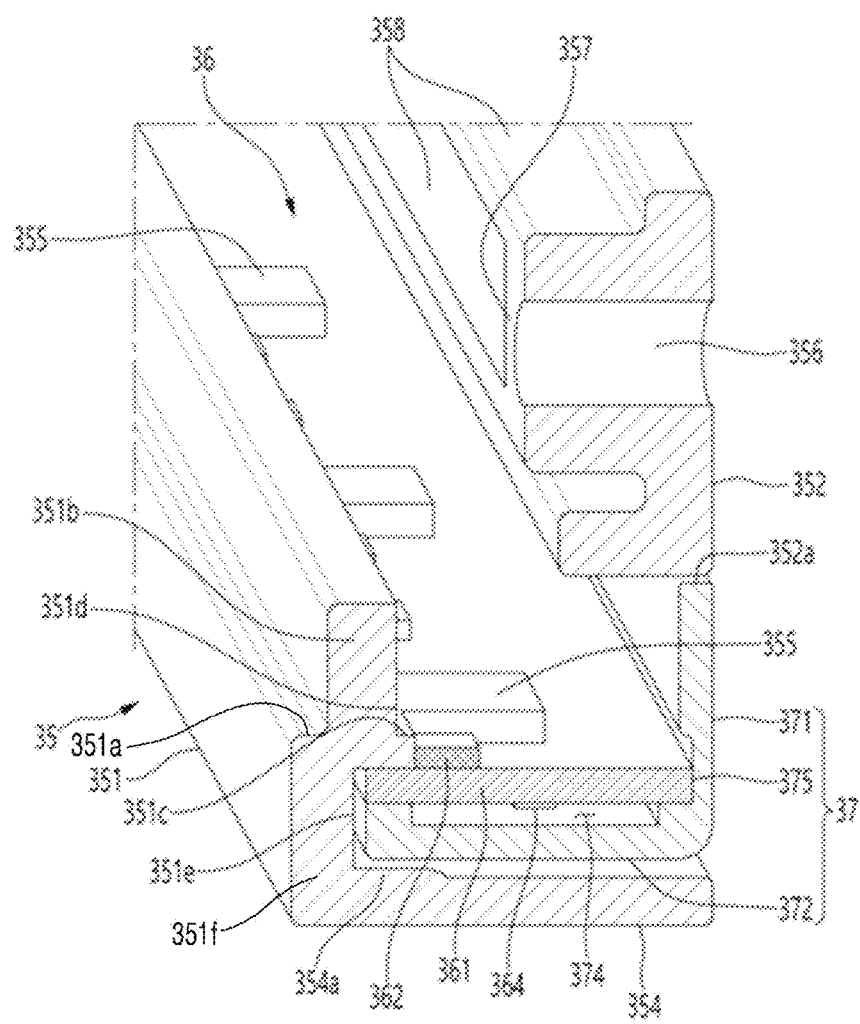
FIG. 15 is a perspective view of FIG. 13 cut along a line 14-14.
Figure 16:
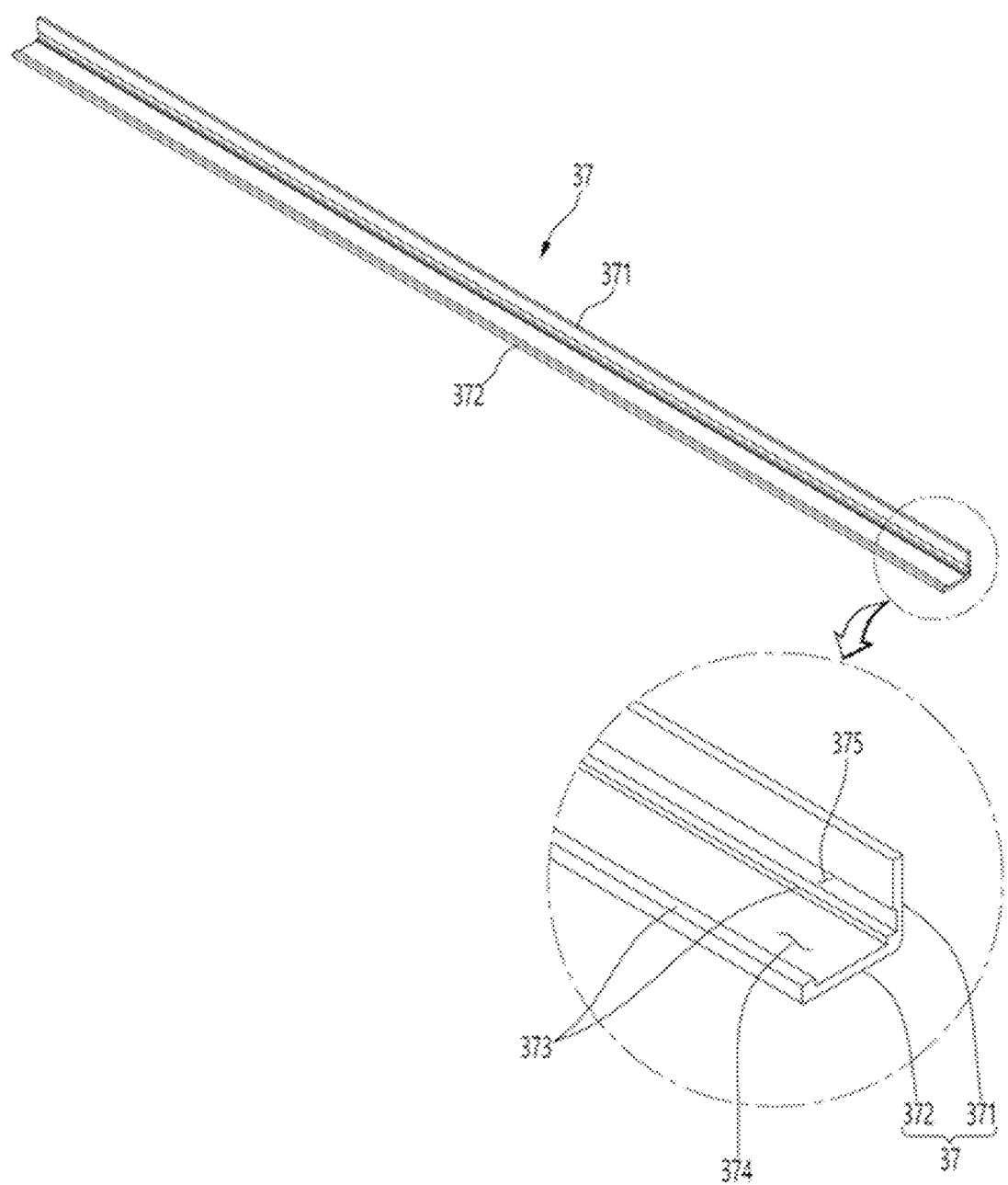
FIG. 16 is a perspective view of a light supporter.

FIG. 15 is a perspective view of FIG. 13 cut along a line 14-14. FIG. 16 is a perspective view of a light supporter.

As shown in the drawing, the lower bracket 35 may have a length corresponding to the length in the left and right direction of the panel assembly 30. The lower bracket 35 may roughly include a lower bracket front face 351 (also called front part 351), a lower bracket rear face 352 (also called rear part 352), a lower bracket side face 353 (also called side part 353) and a lower bracket bottom face 354 (also called bottom part 354).

The lower bracket front face 351 may form the shape of the front face of the lower bracket 35 and may support the front plate 31. A portion of the lower bracket front face 351 may protrude downwardly of the front plate 31, and may be inserted into the lower end of the door body 40, that is, the lower cap decoration 45, so that the lower bracket 35 is fixed.

The lower bracket front face 351 may extend upwardly from a front side of the lower bracket bottom face 354.

The lower bracket front face 351 may include a first lower bracket front face 351*f* (also called first front part 351*f*) extending upward from the front side of the lower bracket bottom face 354 and a second lower bracket front face 351*b* (also called second front part 351*b*) extending upward from an upper end of the first lower bracket front face 351*f*.

The first lower bracket front face 351*f* and the second lower bracket front face 351*b* may be referred to as a first front face 351*f* (also called first front part 351*f*) and a second front face 351*b* (also called second front part 351*b*), respectively.

The second lower bracket front face 351*b* may be located rearwardly of the first lower bracket front face 351*f*.

The second lower bracket front face 351*b* may support the front plate 31 from the rear.

The lower bracket front face 351 may include a first stepped portion 351*a*, which is a bracket stepped portion. The first stepped portion 351*a* may support a lower end of the front plate 31.

The first stepped portion 351*a* may be formed to be stepped rearwardly from a front face of the lower bracket front face 351.

For example, a front face of the second lower bracket front face 351*b* may be located rearwardly of a front face of the first lower bracket front face 351*f*, and a first stepped portion 351*a* may be positioned in a space between the front face of the second lower bracket front face 351*b* and the front face of the first lower bracket front face 351*f*.

The second lower bracket front face 351*b* may extend upwardly from a rear end of the first stepped portion 351*a*.

Therefore, lower ends of the first stepped portion 351*a* and the second lower bracket front face 351*b* may be positioned on an upper end of the first lower bracket front face 351*f*, and the first stepped portion 351*a* may be positioned forwardly of the second lower bracket front face 351*b*.

In a state in which the front plate 31 is mounted, the sealant 313 may be applied to the second lower bracket front face 351*b*, and the front plate 31 may be firmly fixed to the second lower bracket front face 351*b*.

An upper end of the second lower bracket front face 351*b* may be coupled to the lower end of the support member 32, thus the front face of the second lower bracket front face 351*b* and the front portion 321 of the support member 32 may be located on the same plane.

The second lower bracket front face 351*b* may prevent exposure of the lighting device 36 or a lighting spot (also referred to as a light concentration or a hot-spot) that may be generated by the lighting device 36 while supporting the front plate 31.

In one example, the lower bracket side face 353 may form the side face of the lower bracket 35, and may protrude upwardly of the lower bracket front face 351. The lower bracket side face 353 may protrude upwardly of the second lower bracket front face 351*b*, so that a stepped portion of a lower end of the side face of the support member 32 may be engaged with the lower bracket front face 351 and the lower bracket side face 353.

The lower bracket rear face 352 may be formed at a rear end of the lower bracket side face 353. The lower bracket rear face 352 may form a rear face of the lower bracket 35, and allow the lower bracket 35 to be fixedly mounted to the support member 32. The lower bracket rear face 352 may be formed parallel to the front plate 31 and the light guide plate 33, and may extend in the vertical direction. The lower bracket rear face 352 may protrude upwardly of the lower bracket front face 351 and the lower bracket side face 353.

Lower side portions 352*b* that are formed to be stepped forward may be formed at left and right side ends of the lower bracket rear face 352. The lower side portions 352*b* may be formed to be stepped with respect to the lower bracket rear face 352, and may be positioned forwardly of the lower bracket rear face 352.

The lower side portion 352*b* may be formed with a thickness corresponding to the width of the bracket-inserted space 325 and may be slidably inserted into the second space 325 in an upward direction.

A plurality of lower bracket boss 357 may be formed on the front face of the lower bracket rear face 352. The lower bracket boss 357, which is for the fastening of the screw 399, may have a lower bracket screw hole 356 to which the screw 399 is fastened at a center thereof. The lower bracket screw hole 356 may be defined to extend through the lower bracket rear face 352 and may be defined at a position corresponding to the cover screw hole 397. Thus, when the back cover 39 is mounted, the screw 399 may be fastened to sequentially extend through the cover screw hole 397 and the lower bracket screw hole 356.

The lower bracket boss 357 may protrude forward and may protrude to a position at which the lower bracket boss 357 is in contact with the rear face of the light guide plate 33. Thus, when the lower bracket 35 is mounted, a protruding end of the lower bracket boss 357 may support the light guide plate 33 from the rear. That is, when the panel assembly 30 is assembled, the lower bracket 35 may support the upper end of the light guide plate 33 from the rear.

In one example, a support rib 358 for connecting the multiple lower bracket bosses 357 to each other may be formed on the front face of the lower bracket rear face 352. One pair of support ribs 358 may be arranged in the vertical direction, and the multiple lower bracket bosses 357 may be positioned between one pair of support ribs 358.

In detail, an upper support rib 358 of one pair of support ribs 358 may extend to connect upper ends of the multiple lower bracket bosses 357 to each other, and a lower support rib 358 of one pair of support ribs 358 may extend to connect lower ends of the multiple lower bracket bosses 357 to each other.

The support rib 358 may protrude with the same height as a protruding height of the lower bracket boss 357. Thus, when the panel assembly 30 is assembled, the support rib 358 may support the light guide plate 33 from the rear together with the lower bracket boss 357.

Thus, the lower bracket 35 may be fixedly coupled to the upper end of the support member 32 and fixed, and may be in the state of being fixed to the back cover 39 by the screw 399, thereby restraining a downward movement of the light guide plate 33 and forming the shape of a bottom face of the panel assembly 30.

In one example, a bracket opening 352a may be defined in the lower bracket rear face 352. The bracket opening 352a may extend from a left side end to a right side end of the lower bracket rear face 352 and may be formed at a position facing the lower bracket front face 351.

The bracket opening 352a may be positioned below the support rib 358. The bracket opening 352a may be defined to be opened in a rear face of a space in which the lighting device 36 is mounted. The lower end of the bracket opening 352a may be positioned at the lower bracket bottom face 354. Thus, the lighting device 36 may enter and exit through the bracket opening 352a and the light supporter 37 for supporting the lighting device 36 may also enter and exit together. The bracket opening 352a may be shielded by the back cover 39.

The lower bracket bottom face 354 may form a bottom face of the lower bracket 35 and may be connected to a lower end of the lower bracket front fac 351, a lower end of the lower bracket side face 353, and a lower end of the lower bracket rear face 352. The lower bracket bottom face 354 may form a bottom face of a space in which the lighting device 36 is mounted.

A bracket rib 354a for supporting the lighting device 36 or the light supporter 37 from below or supporting the back cover 39 may be formed on the lower bracket bottom face 354. The bracket rib 354a may extend rearward from the lower bracket front face 351 and may protrude upward from the lower bracket bottom face 354a. alternatively, the bracket rib 354a may protrude from the lower bracket bottom face 354a at a position spaced apart from the lower bracket front face 351.

Depending on a protruding height of the bracket rib 354a, the bracket rib 354a may support the light supporter 37 or support the back cover located beneath the light supporter 37. Hereinafter, a description will be made with an example in which the bracket rib 354a supports the back cover 39 located beneath the light supporter 37.

In one example, the lower bracket front face 351 may include a support on which the light guide plate is supported. The support may extend from the lower bracket front face 351 towards the lower bracket rear face 351.

The support may extend horizontally at a position spaced downwardly apart from the top face of the lower bracket front face 351.

The support may include a first support 351c extending from the lower bracket front face 351 and a second support 355 extending from the first support 351c towards the lower bracket rear face 352.

In one example, a plurality of second supports 355 may be arranged to be spaced apart from each other at a predetermined spacing along the lower bracket front face 351.

Because the lower bracket front face 351 and the lower bracket rear face 352 are spaced apart from each other, the light guide plate 33 may be seated on the support via the space between the lower bracket front face 351 and the lower bracket rear face 352.

The first support 351c may be formed continuously in the left and right direction of the lower bracket front face 351. That is, a length in the left and right direction of the first support 351c may be greater than a sum of lengths in the left and right direction or widths of the plurality of second supports 355.

The length in the front and rear direction of the second support 355 may be greater than a length in the front and rear direction of the first support 351c.

Because the plurality of second supports 355 are arranged to be spaced apart from each other, the light irradiated from the light source 362 may be incident on the light guide plate 33 without interfering with the plurality of second supports 355.

The support may extend to constrain the lighting device 36 from above. The support and the lower bracket bottom face 354 may constrain the lighting device 36 from moving in the vertical direction by constraining the lighting device 36 from above and below.

The first support 351c may protrude rearward at a vertical level corresponding to that of the first stepped portion 351a of the bracket stepped portion.

In a state in which the light guide plate 33 is seated on the first support 351c, the front face of the light guide plate 33 may be in contact with the rear face 351d of the second lower bracket front face 351b. When the front face of the light guide plate 33 is in contact with the rear face 351d of the second lower bracket front face 351b, the forward movement of the light guide plate 33 is restricted, so that the rear face 351d of the second lower bracket front face 351b may be referred to as a stopper face.

In one example, the lighting device 36 may be accommodated inside the lower bracket 35.

The lower bracket 35 may include a receiving groove 351e or a receiving portion for receiving a portion of the lighting device 36 therein.

The receiving groove 351e may be defined at least by the lower bracket front face 351, the lower bracket bottom face 372, and the first support 351c. In one example, a portion of the receiving groove 351e may be positioned between the second lower bracket front face 351b and the first lower bracket front face 351f. Alternatively, it may be described that the first lower bracket front face 351f includes the receiving groove 351e.

The lighting device 36 may include a substrate 361 and the light source 362. The substrate 361 may be formed in a plate shape to be accommodated within the lower bracket 35 and may extend from one end to the other end of the lower bracket 35. Multiple light sources 362 may be consecutively arranged at a predetermined spacing on the substrate 361.

The light source 362 may be disposed to emit light toward the bottom face of the light guide plate 33. The substrate 361 may provide a space in which the light sources 362 are consecutively arranged from a left side end to the other side end of the light guide plate 33. The left side end and the right side end of the substrate 361 may be in contact with the lower bracket side faces 353 within the lower bracket 35, so that a movement thereof in the left and right direction may be restrained.

The light source 362 may be disposed at a forwardly biased position based on a center of the substrate 361. In this regard, the light source 362 may be positioned below the lower end of the light guide plate 33 in a vertical direction, that is, may be positioned to face the lower end of the light guide plate 33.

A circuit 363 of the substrate 361 may be concentrated at a position biased to the rear based on the center of the substrate 361. The circuit 363, which is for an operation of the lighting device 36, may be disposed at the rearwardly biased position such that the light source 362 is disposed at a position to face the light guide plate 33.

In one example, the light source 362 may be formed as an LED. The light source 362 may be formed as an RGB LED for emitting light with various colors under control of the controller 13. That is, the light source 362 may emit light with the various colors under the control of the controller 13, and thus the front plate 31 may emit light with color set by the controller 13. Based on the color of the front plate 31, color of the front outer appearance of the refrigerator 1 may be determined.

In one example, the light source 362 may be formed as an LED for emitting light with a specific color other than the RGB LED and may be formed as a combination of multiple LEDs for emitting light with different colors. For example, the multiple light sources 362 may be formed as red, green, and blue LEDs and may sequentially and repeatedly arranged in order. Under the control of the controller 13, operations of the light sources 362 may be combined to cause the front plate 31 to emit light with a desired color.

The light sources 362 may be mounted at a predetermined spacing on the substrate 361 and an appropriate number of light sources 362 may be arranged to cause the front plate 31 to emit light with set brightness. For example, the light sources 362 may be arranged at a spacing in a range from 6.3 mm to 7.0 mm, so that brightness of the front plate 31 may reach a target brightness, and an entire face of the front plate 31 may emit light with uniform brightness equal to or greater than 80%. The spacing between the light sources 362 may be smaller than a width in the left and right direction of the support 355, and thus the support 355 may be disposed between the light sources 362.

Elements 364 protruding downward may be further disposed on the bottom face of the substrate 361.

In one example, the light supporter 37 may be disposed within the lower bracket 35. The light supporter 37 may support the lighting device 36 within the lower bracket 35. The light supporter 37 may dissipate heat generated by the lighting device 36 by conduction.

The light supporter 37 may be made of a metal material. In one example, the light supporter 37 may be made of an aluminum material with high heat conductivity. The light supporter 37 may be molded by extrusion of the metal material to have the same cross-sectional structure in a longitudinal direction, and may be formed with a size to enter and exit through the bracket opening 352a.

The light supporter 37 may include a first supporting portion 372 for supporting the lighting device 36 and a second supporting portion 371 in contact with the back cover 39.

The first supporting portion 372 may be accommodated in the receiving groove 351e during an assembly process of the first supporting portion 372.

In this regard, the bottom face of the first supporting portion 372 may be disposed parallel to the lower bracket bottom face 354 and may have a width corresponding to that of the lower bracket bottom face 354. A front end of the first supporting portion 372 may extend to a position corresponding to a front end of the substrate 361, and may be positioned in contact with or proximate to the lower bracket front face 351.

The first supporting portion 372 may be supported from below by the bracket rib 354a.

Substrate supports 373 for supporting the front end and a rear end of the substrate 361 may be formed at the front end and a rear end of the first supporting portion 372. The substrate support 373 may be formed along the front and rear ends of the first supporting portion 372, and may protrude upward. Therefore, the first supporting portion 372 may have a structure supported directly along the substrate 361, and heat generated during the operation of the lighting device 36 may be conducted to the light supporter 37 via the substrate support 373.

A supporter recessed portion 374 may be defined in the first supporting portion 372. The supporter recessed portion 374 may be recessed between one pair of substrate supports 373 and may provide a space in which the elements of the bottom face of the substrate 361 are accommodated when the substrate 361 is supported by the first supporting portion 372.

The second supporting portion 371 may extend upward from the rear end of the first supporting portion 372. The second supporting portion 371 may extend perpendicularly to the first supporting portion 372 and the lower bracket bottom face 354. The second supporting portion 371 may shield the at least a portion of the bracket opening 352a while the light supporter 37 is mounted on the lower bracket 35. Preferably, the second supporting portion 371 may be formed to have corresponding size and shape to shield the bracket opening 352a.

A substrate receiving groove 375 may be defined at the lower end of the second supporting portion 371. The substrate receiving groove 375 may be defined along the longitudinal direction of the second supporting portion 371 and may be recessed to accommodate the rear end of the substrate 361 therein. In the state in which the substrate 361 is mounted on the right supporter 37, the rear end of the substrate 361 may be in close contact with an inner face of the substrate receiving groove 375.

The second supporting portion 371 may extend upwardly, and may be exposed to the outside through the bracket opening 352a. The rear face of the second supporting portion 371 may be formed in a shape of a flat plate, and may be in surface contact with the back cover 39 when the back cover 39 is mounted. Accordingly, the heat of the lighting device 36 conducted to the light supporter 37 may be transferred to the back cover 39 and may be dissipated via the back cover 39.

In one example, the lighting device 36 and the light supporter 37 may enter and exit through the bracket opening 352a with the lower bracket 35 mounted. Therefore, when only the back cover 39 shielding the bracket opening 352a is removed, the lighting device 36 and the light supporter 37 may be easily assembled and disassembled.

In one example, with the lighting device 36 turned on, the hot-spot may appear at a position adjacent to the light source 362 when viewing the panel assembly 30 from the front. Such a hot-spot may deteriorate a quality of the outer appearance of the front face of the door 20 and may dazzle the user.

In order to prevent such a hot-spot from appearing at a front portion of the door 20, the panel assembly 30 includes a shielding portion 351b formed in front of the light source 362 to shield a portion of the light irradiated from the light source 362.

The shielding portion according to one embodiment of the present disclosure will be further described in detail below.

Figure 17:
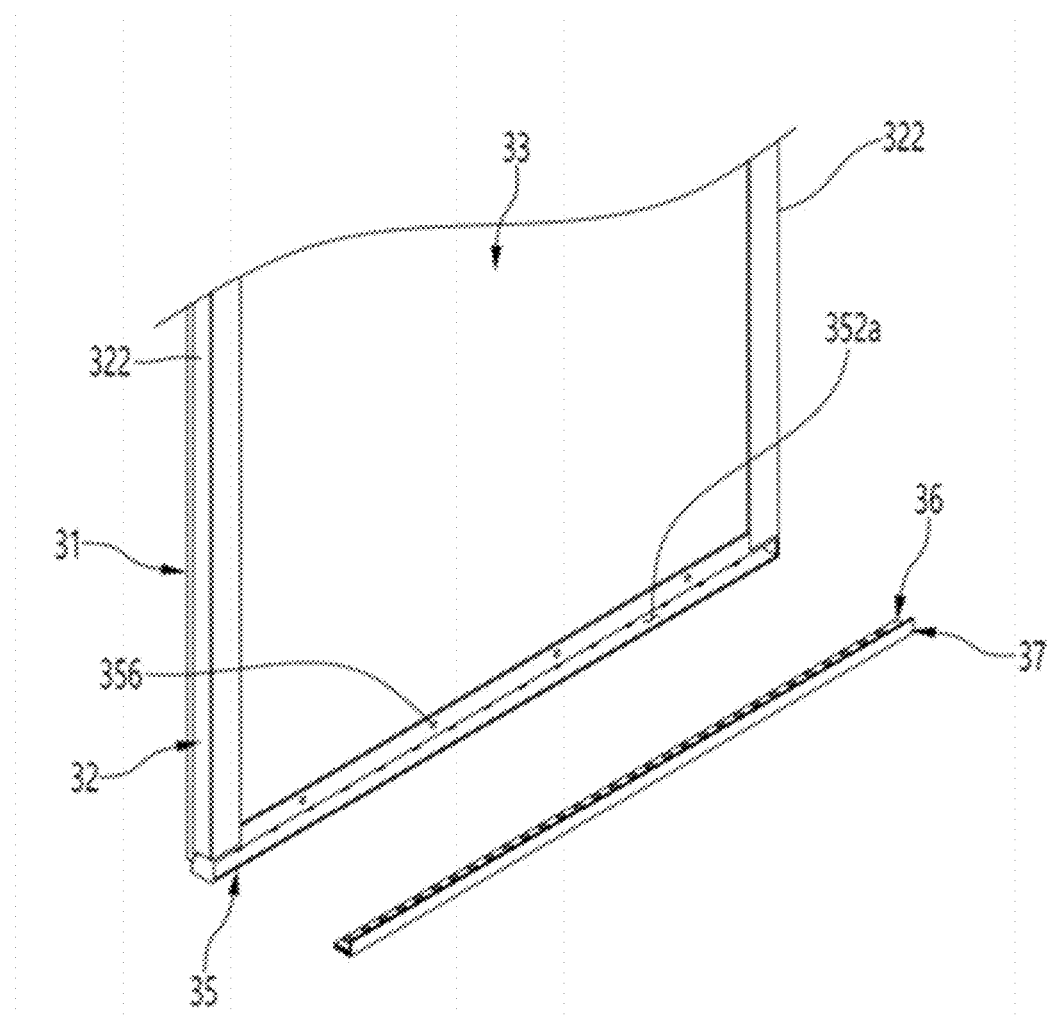
FIG. 17 is a view showing a state in which a light supporter is coupled to a lower bracket while a lighting device is seated on the light supporter.
Figure 18:
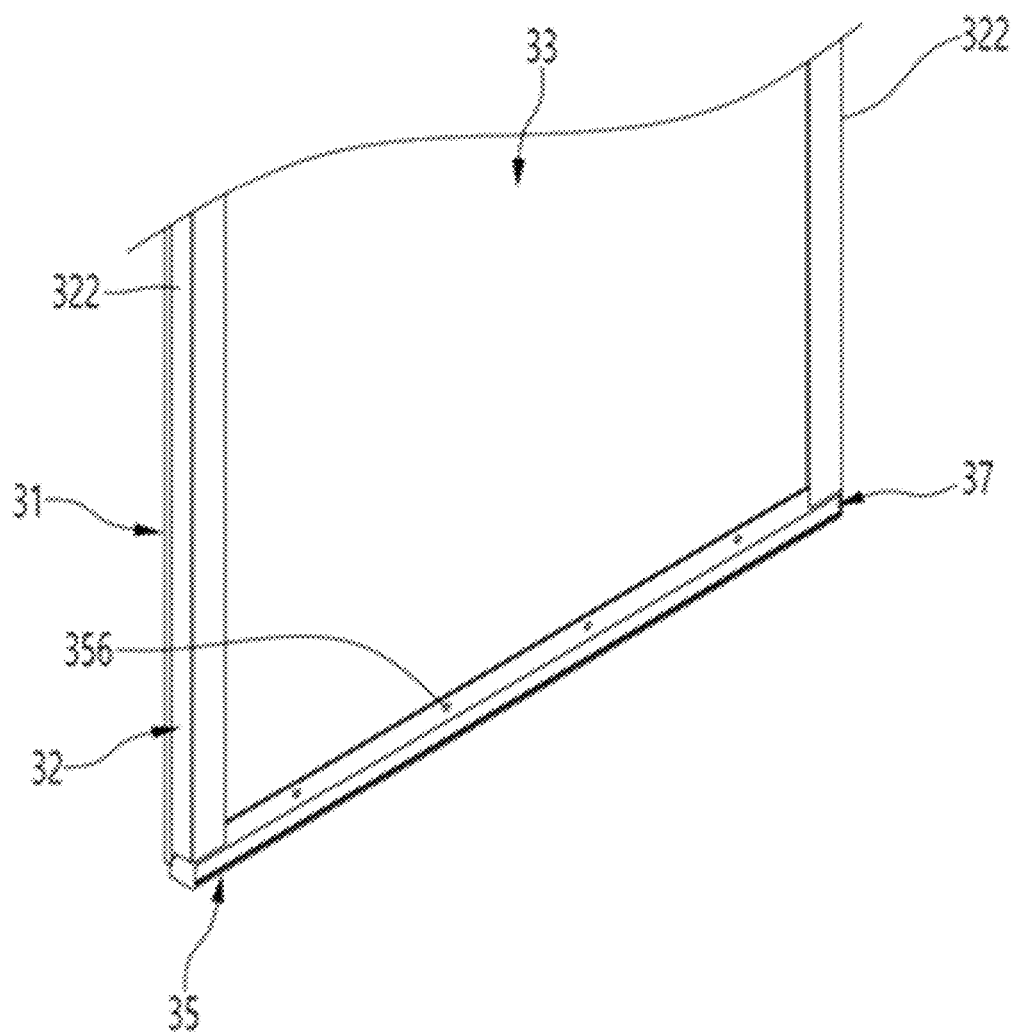
FIG. 18 is a view showing a state in which a back cover is coupled while a lighting device and a light supporter accommodated in a lower bracket.
Figure 19:
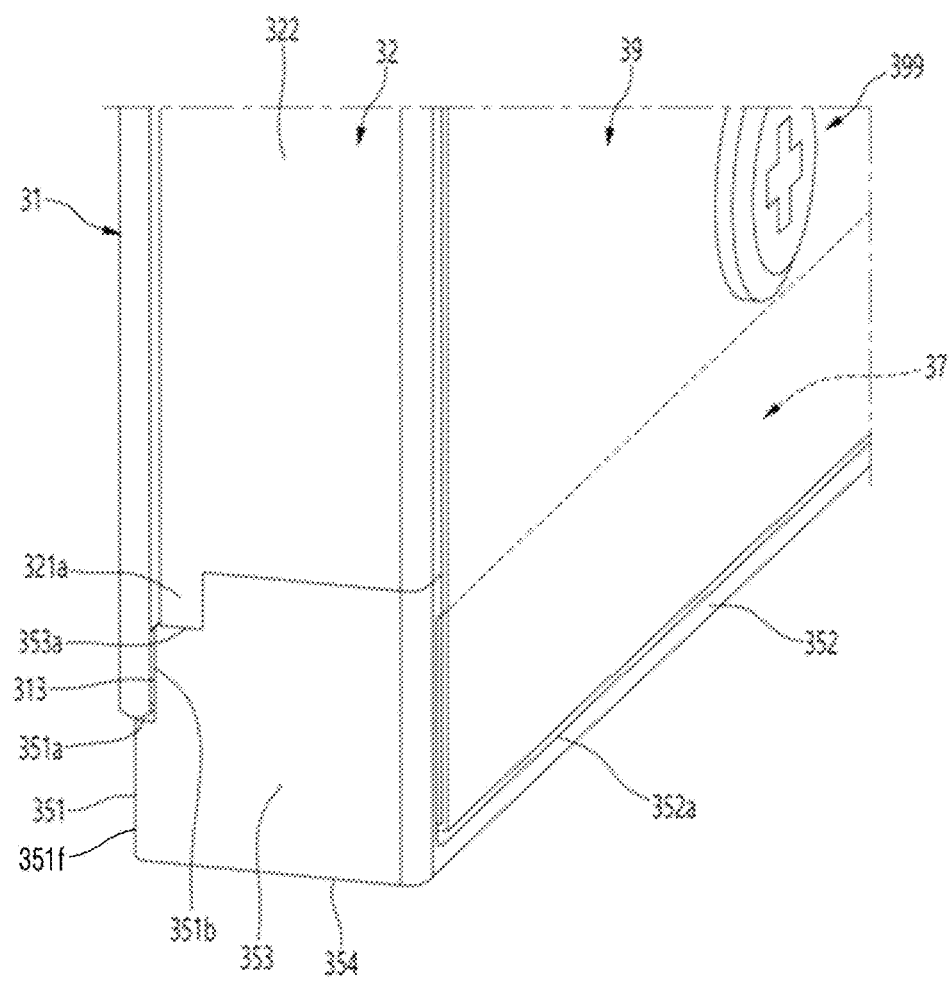
FIG. 19 is a view showing a state in which assembly of a panel assembly is completed.

FIG. 17 is a view showing a state in which a light supporter is coupled to a lower bracket while a lighting device is seated on the light supporter, FIG. 18 is a view showing a state in which a back cover is coupled while a lighting device and a light supporter accommodated in a lower bracket. FIG. 19 is a view showing a state in which assembly of a panel assembly is completed.

Figure 20:
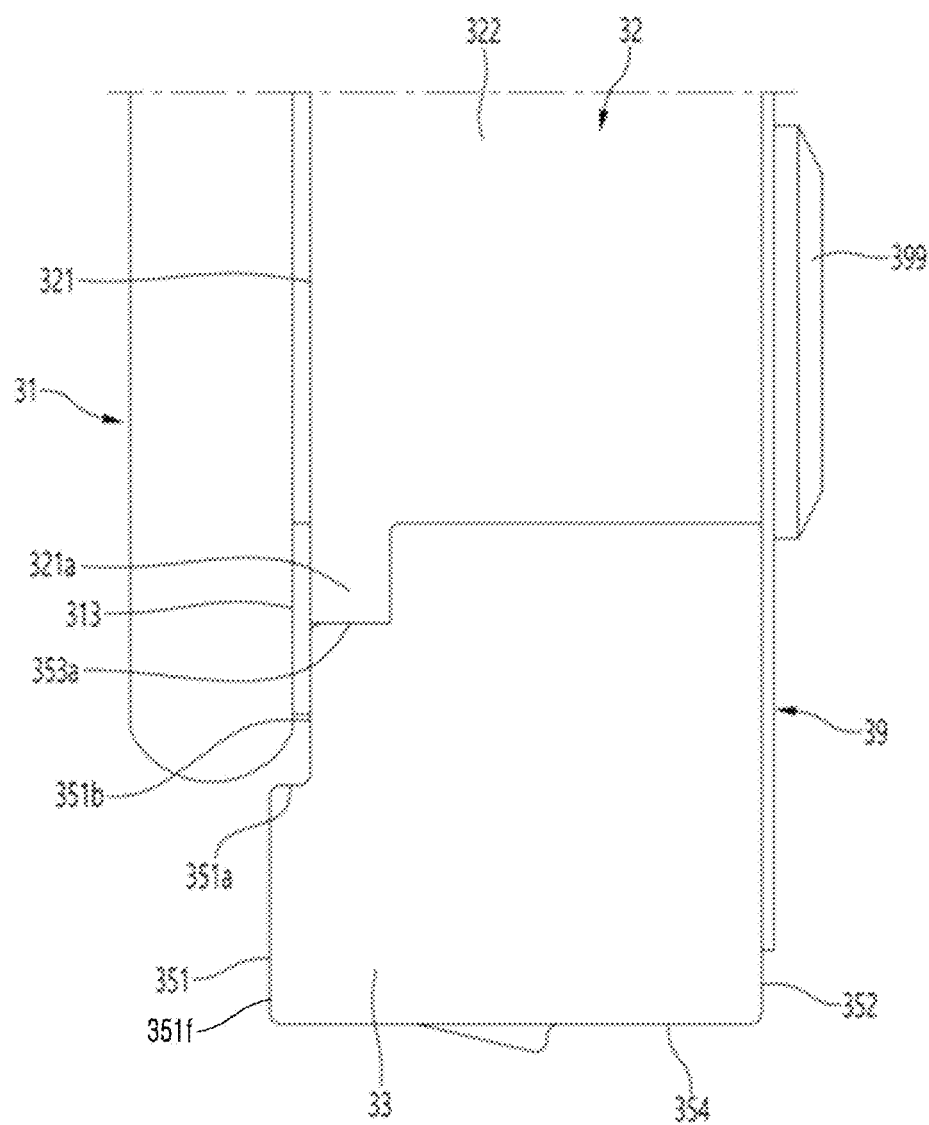
FIG. 20 is a partial side view showing a structure of a lower end of a side face of a panel assembly.

FIG. 20 is a partial side view showing a structure of a lower end of a side face of a panel assembly.

Figure 21:
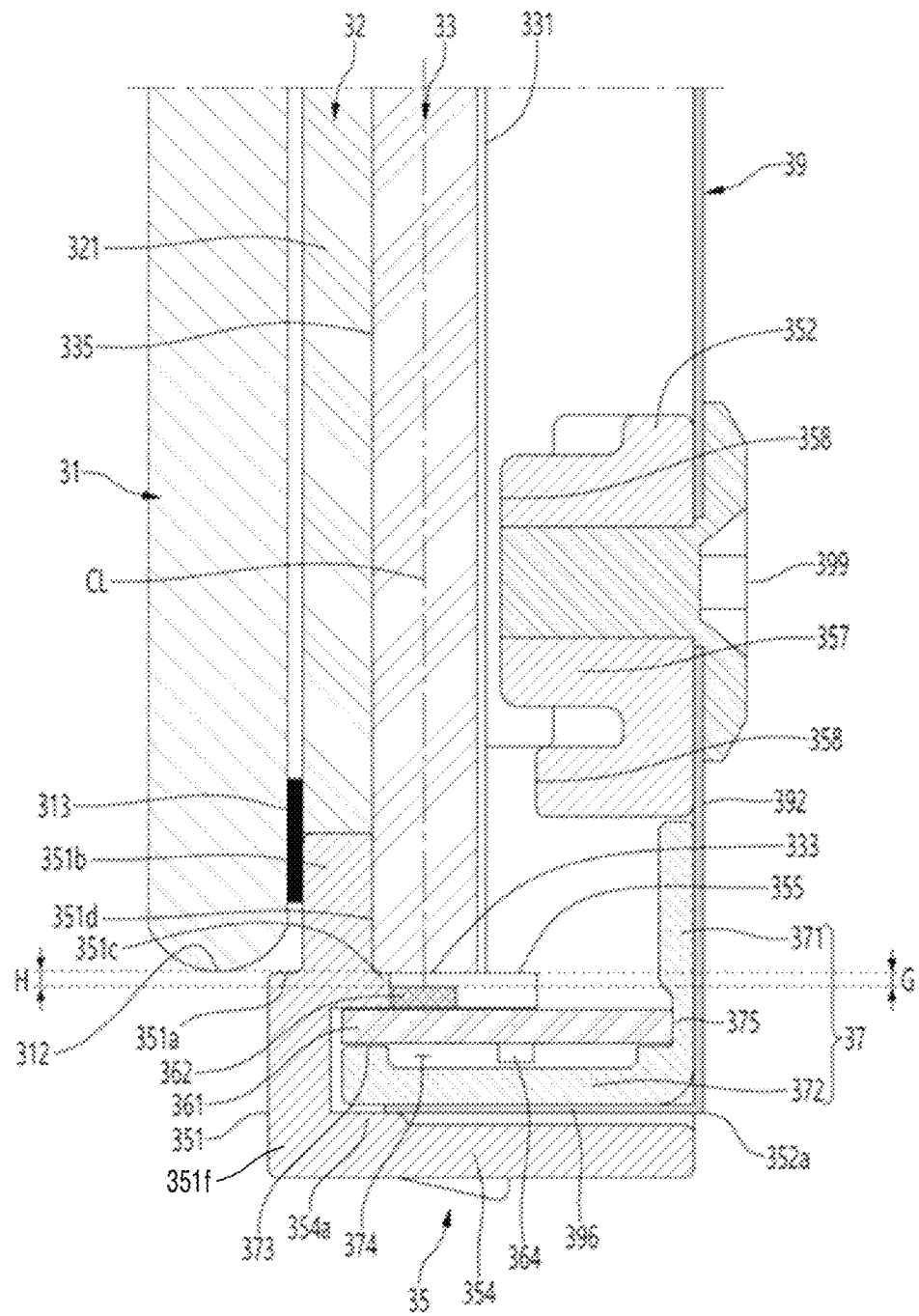
FIG. 21 is a perspective view of FIG. 4 cut along a line 20-20.
Figure 22:
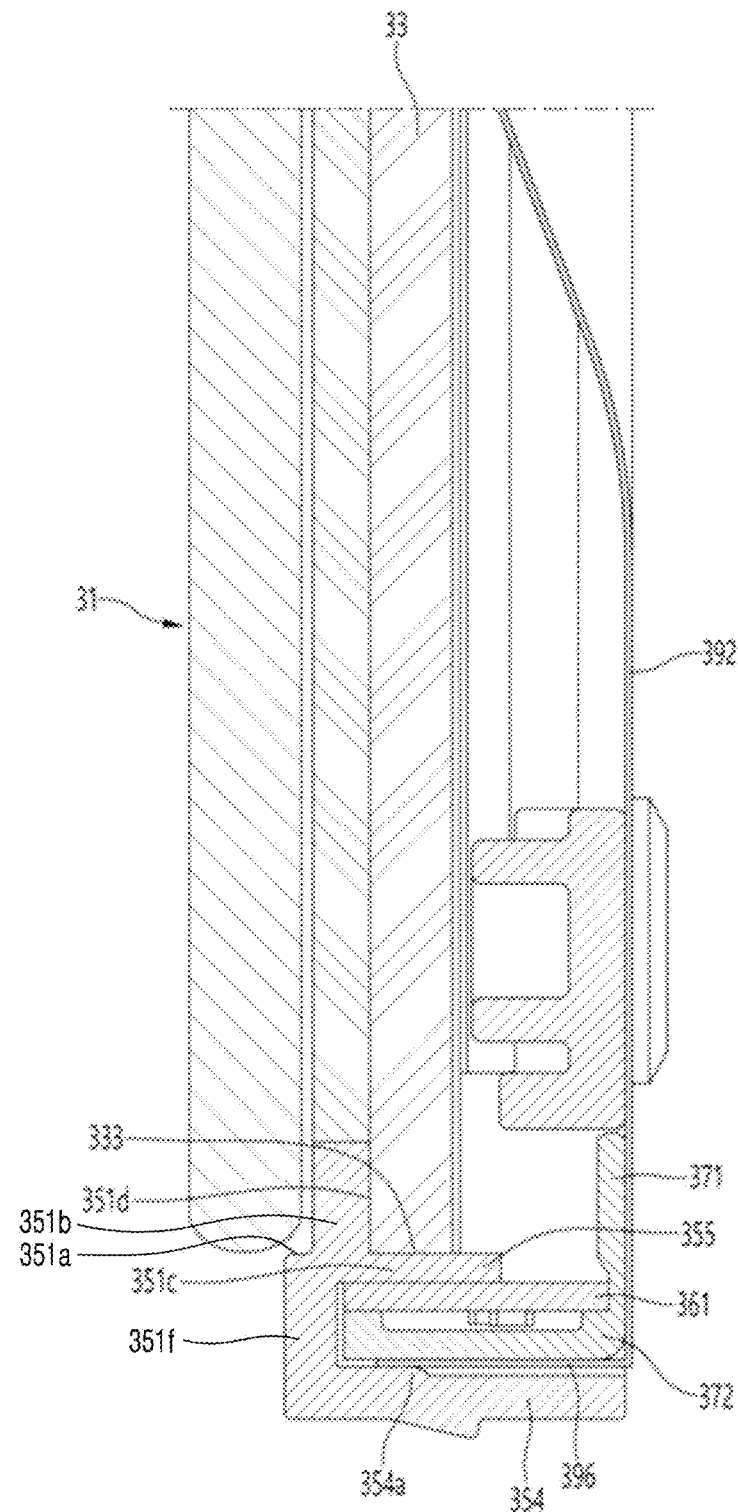
FIG. 22 is a perspective view of FIG. 4 cut along a line 21-21.

FIG. 21 is a perspective view of FIG. 4 cut along a line 20-20. FIG. 22 is a perspective view of FIG. 4 cut along a line 21-21.

Hereinafter, an assembly process of the lighting device and a coupled state of the lower end of the panel assembly 30 in addition to an interior of the lower bracket 35 in the state in which the panel assembly 30 is assembled will be described in more detail with reference to the drawings.

As shown in the drawing, the lighting device 36 may be seated on the light supporter 37.

With the lighting device 36 seated on the light supporter 37, the light supporter 37 may be inserted into the lower bracket 35 through the bracket opening 352a.

In this regard, with the top face of the lighting device 36 positioned in the space between the support and the lower bracket bottom face 354, the light supporter 37 may be inserted into the space in the lower bracket 354.

A gap between the bottom face of the support and the lower bracket bottom face 354 is greater than a sum of vertical dimensions of the substrate 361 and the first supporting portion 372.

Further, a vertical length between the bracket rib 354a and a top face of the receiving groove 351e (for example, the bottom face of the second lower bracket front face) may be greater than the sum of the vertical dimensions of the substrate 361 and the first supporting portion 372.

In the assembly process, while the first supporting portion 372 is seated on the top face of the lower bracket bottom face 354, the lighting device 36 and the first supporting portion 372 may be accommodated in the receiving groove 351e. In this case, when the first supporting portion 372 comes into contact with the bracket rib 354a while the first supporting portion 372 is inserted into the receiving groove 351e, the first supporting portion 372 may be raised by the bracket rib 354.

Accordingly, the substrate 361 and the first supporting portion 372 may be accommodated in the receiving groove 351e without interfering with the support.

In the process of assembling the light supporter 37, the light source 362 may be positioned between two adjacent second supports 355, and may come into contact with the first support 351c.

When the light source 372 comes into contact with the first support 351c, the insertion of the lighting device 36 may be restricted and the position of the lighting device 36 may be determined. Alternatively, in the process of assembling the light supporter 37, the substrate 361 may come into contact with the face defining the receiving groove 351e. In this case, the insertion of the lighting device 36 may be restricted and the position of the lighting device 36 may be determined.

Alternatively, in the process of assembling the light supporter 37, the first supporting portion 372 may come into contact with the face defining the receiving groove 351e. In this case, the insertion of the lighting device 36 may also be restricted and the position of the lighting device 36 may also be determined. Alternatively, in the process of assembling the light supporter 37, the first supporting portion 372 and the substrate 361 may come into contact with the face defining the receiving groove 351e. In this case, the insertion of the lighting device 36 may also be restricted and the position of the lighting device 36 may also be determined.

That is, in the case of the present embodiment, the insertion of the lighting device 36 is restricted while the lighting device 36 is accommodated in the lower bracket 35, so that the lighting device 36 stops moving at the insertion restricted position.

With the lighting device 36 and the lower bracket 35 accommodated in the receiving groove 351e, the top face of the substrate 361 may be spaced apart from the bottom face of the support.

After the lighting device 36 and the lower bracket 35 are accommodated in the receiving groove 351e, the back cover 39 may be coupled to the lower bracket 35.

The back cover 39 may be coupled to the lower bracket 35 by the fastening of the screw 399. In this regard, a cover bent portion 396 at a lower end of the back cover 39 may be inserted into the bracket opening 352a.

As an example, the cover bent portion 396 may be inserted between the bottom face of the light supporter 37 and the lower bracket bottom face 354.

A difference between a vertical length between the bracket rib 354a and the top face of the receiving groove 351e and the sum of the vertical dimensions of the substrate 361 and the first supporting portion 372 may correspond to a thickness of the cover bent portion 396.

In the process of inserting the cover bent portion 396 between the bottom face of the light supporter 37 and the lower bracket bottom face 354, after the cover bent portion 396 comes into contact with the bracket rib 354a, the cover bent portion 396 may be seated on the bracket rib 354a.

In the process of seating the cover bent portion 396 on the bracket rib 354a, the cover bent portion 396 may raise the light supporter 37, so that the top face of the substrate 361 comes into contact with the bottom face of the support. The cover bent portion 396 is positioned between the first supporting portion 327 and the bracket rib 354a, and supports the first supporting portion 327 while being seated on the bracket rib 354a.

As another example, in the case in which the bracket rib 354a directly supports the light supporter 37, when the light supporter 37 is seated on the bracket rib 354a, the top face of the substrate 361 may come into contact with the bottom face of the support.

In the state in which the back cover 39 is mounted, the cover bent portion 396 may be in surface contact with the bottom face of the first supporting portion 372, and a lower end of the cover perimeter 392 of the back cover 39 may be in surface contact with an entirety of the rear face of the second supporting portion 371. In this state, the back cover 39 is fastened to the rear face bracket 35 by the screw 399, and the back cover 39 presses the second supporting portion 371 in the forward direction (toward the lower bracket front face) while the back cover 39 is fastened to the rear face bracket 35 by the screw 399.

Therefore, according to the present embodiment, in the process of accommodating the lighting device 36 inside the lower bracket 35 and assembling the back cover 39 to the lower bracket 35, the position of the lighting device 36 in the lower bracket 35 may be determined without the user's separate work or a separate structure, and the movement of the lighting device 36 may be restricted.

Further, in the process of accommodating the light guide plate 33 inside the lower bracket 35 and coupling the back cover, the position of the light guide plate 33 may be determined and the movement of the light guide plate 33 may be restricted. Accordingly, the positions of the light guide plate 33 and the lighting device 36 may be determined without the user's separate work or the separate structure.

That is, the front end of the substrate 361 may come into contact with the lower bracket front face 351 and the rear end thereof may come into contact with the substrate receiving groove 375 of the second supporting portion 371, so that the movement in the front and rear direction of the substrate 361 may be restricted.

Because the bottom face of the substrate 361 is in contact with the substrate support 373 of the first supporting portion 372 and the top face of the substrate 361 is in contact with the bottom face of the support protruding rearwards, the movement in the vertical direction of the substrate 361 may be restricted.

As described above, a portion of the light guide plate 33 may be seated on the first support 351*c*, and the remaining portion of the light guide plate 33 may be seated on the second support 355. While the light guide plate 33 is seated on the second support 355, the rear end of the second support 355 may extend further toward the lower bracket rear face 371 than the rear face of the light guide plate 33.

Therefore, the second support 355 may limit the upward movement of the entirety of the top face of the substrate 361.

Left and right side faces of the substrate 361 may be in contact with the lower bracket side faces 353 inside the lower bracket 35, so that the movement in the left and right direction of the substrate 361 may be constrained.

As such, the lighting device 36 may not move in any direction as the movement is restricted in all directions such as the front and rear direction, the vertical direction, and the left and right direction when the panel assembly 30 is assembled, and may maintain an initial mounted position thereof.

According to the present embodiment, the center line CL of the light guide plate 33 and the light source 362 may be aligned with each other by simply assembling the light guide plate 33 and the lighting device 36.

The center line CL of the light guide plate 33 may mean a line that bisects the thickness of the light guide plate 33.

The light source of the lighting device 36 may also maintain the set position, and may irradiate light from the lower end of the light guide plate 33 toward the light guide plate 33. The light source 362 always irradiates the light at a certain position, thereby ensuring that the front plate 31 emits light with a constant brightness.

When the light source 362 and the center line CL of the light guide plate 33 are not aligned with each other or relative positions thereof are changed, problems such as overall non-uniformity of the luminance of the door or the occurrence of the lighting spot may occur. However, the relative positions of the light source 362 and the center line CL of the light guide plate 33 may be prevented from being changed, so that the alignment of the light source 362 and the center line CL of the light guide plate 33 may be maintained.

In addition, the lower end of the light guide plate 33 may be supported by the support. The front face 335 of the light guide plate 33 may be in contact with the rear face 351 of the second lower bracket front face 351*b* in a state supported by the support, and the light guide plate 33 may maintain the state of being in contact with the support by a weight thereof within the panel assembly 30 while being inserted into the side portion 322 of the support member 32 in the sliding manner.

The top face of the support may be formed higher than the top face of the light source 362, and thus, may not come into contact with the light source 362 during the opening and closing operation of the door 20 of the light guide plate 33 and expansion and contraction of the light guide plate 33. That is, a set gap G may be maintained between the lower end of the light guide plate 33 and the light source 362. In this regard, the set gap G may be designed in consideration of an angle of light irradiated from the light source 362, and may be formed to be 0.4 mm as one example.

As such, as the lighting device 36 maintains the fixed state and the distance between the light guide plate 33 and the light source 362 also maintains the set distance, the light irradiated from the light source 362 may be incident on the light guide plate 33 at a designed angle. Therefore, the light irradiated from the light source 362 may be effectively irradiated toward the light guide plate 33, and the light reflected through the light guide plate 33 may make the front plate 31 to emit light with the set brightness.

In one example, referring to FIG. 21, because the light source 362 exists below the light guide plate 33, the bottom face 333 of the light guide plate 33 serves as a light incident face. Because the front plate 31 is positioned in front of the light guide plate 33, the front face 335 of the light guide plate 33 serves as a light emitting face.

In this regard, because the light incident face of the light guide plate 33 and the light source 362 are spaced apart from each other, most of the light generated from the light source 362 may be irradiated to the light incident face, but a portion of the light may pass through the gap G between the light incident face and the light source 362.

When the light that has passed through the gap G between the light incident face and the light source 362 is directly irradiated to the front plate 31, the lighting spot (also referred to as the light concentration or the hot-spot) may occur on the front plate 31.

In order to solve such problem, in the present embodiment, the top face of the light source 362 may be positioned lower than the bottom face 312 (or the lower end) of the front plate 31. Therefore, the vertical level difference H may exist between the top face of the light source 362 and the bottom face 312 of the front plate 31. The vertical level difference H may be smaller than the thickness of the front plate 31. In this case, a size increase of the panel assembly may be minimized while preventing the generation of the lighting spot on the front plate 31.

Further, the bottom face 333 of the light guide plate 33 may be positioned at the same vertical level as or positioned lower than the bottom face of the bottom face 312 of the front plate 31. Alternatively, the top face (a supporting face) of the support 355 may be positioned at the same vertical level as or lower than the bottom face of the bottom face 312 (an opposite face of the supporting face) of the front plate 31.

The substrate 361 may be positioned lower than the bottom face 312 of the front plate 31 and the light incident face of the light guide plate 33.

In another aspect, based on a first direction (the vertical direction) in which light from the light source 362 is irradiated to the light incident face, a distance from the geometric center of the front plate 31 to the light source 362 may be greater than a distance from a geometric center of the front plate 31 to a face (for example, the bottom face 312 of the front plate 31) adjacent to the light source 362 among peripheral faces of the front plate 31.

The top face of the support may be positioned lower than the bottom face 312 of the front plate 31. The light source 362 may be positioned lower than the top face of the support.

As an example, the vertical level difference H between the top face of the light source 362 and the bottom face 312 of the front plate 31 may be equal to or greater than a size of the gap G between the light incident face and the light source 362. At least a portion of the space between the light incident face and the light source 362 may be positioned lower than the bottom face of the front plate 31.

In the case of the present embodiment, the lighting spot may be prevented from occurring on the front plate 31 primarily by the arrangement of the light source 362, the light guide plate 33, and the front plate 31.

Further, in the present embodiment, additionally, the lower bracket front face 351 may physically block the light that has passed through the gap G between the light incident face and the light source 362 from being irradiated to the front plate 31.

That is, the lower bracket front face 351 may support the front plate 31, and at the same time, prevent exposure of the lighting spot that may be caused by the lighting device 36 or the lighting device 36.

The lower bracket front face 351 may cover the gap G between the light incident face and the light source 362.

A portion (for example, the second lower bracket front face 351b) of the lower bracket front face 351 may protrude upwardly of the upper end of the light source 362 of the lighting device 36, and may protrude by a set height to prevent the lighting device 36 from being exposed forward.

Further, the second lower bracket front face 351b may become able to cover an area that may be generated by intensive light irradiation at the lower end of the light guide plate 33 and the lower end of the front plate 31, which are very adjacent to the lighting device 36, thereby preventing the formation of the lighting spot on the front plate 31.

The second lower bracket front face 351b may be formed to be opaque or translucent, and may be formed to have a specific color as needed. Accordingly, the second lower bracket front face 351b may be referred to as a shielding portion.

In the case of the present embodiment, the generation of the lighting spot on the front plate 31 may be prevented by the arrangement of the light source 362, the light guide plate 33, and the front plate 31, so that even when a length of the second lower bracket front face 351b in the lower bracket 35 is shortened, the generation of the lighting spot on the front plate 31 may be prevented.

The top face 353a of the second lower bracket front face 351b may be at least positioned higher than the bottom face 333 of the light guide plate 33.

Because the top face 353a of the second lower bracket front face 351b is positioned higher than the bottom face 312 of the front plate 31, a transmitted length of the light from the front plate 31 is reduced by the length of the second lower bracket front face 351b. However, when the length of the second lower bracket front face 351b is reduced as in the present embodiment, a light transmitted area in the front plate 31 may be increased.

In the above embodiment, it is possible that the first stepped portion 351a does not exist and the first stepped portion 351a and the second lower bracket front face 351b are formed to have the same continuous face.

Hereinafter, the shielding portion according to one embodiment of the present disclosure will be described in detail.

Figure 23:
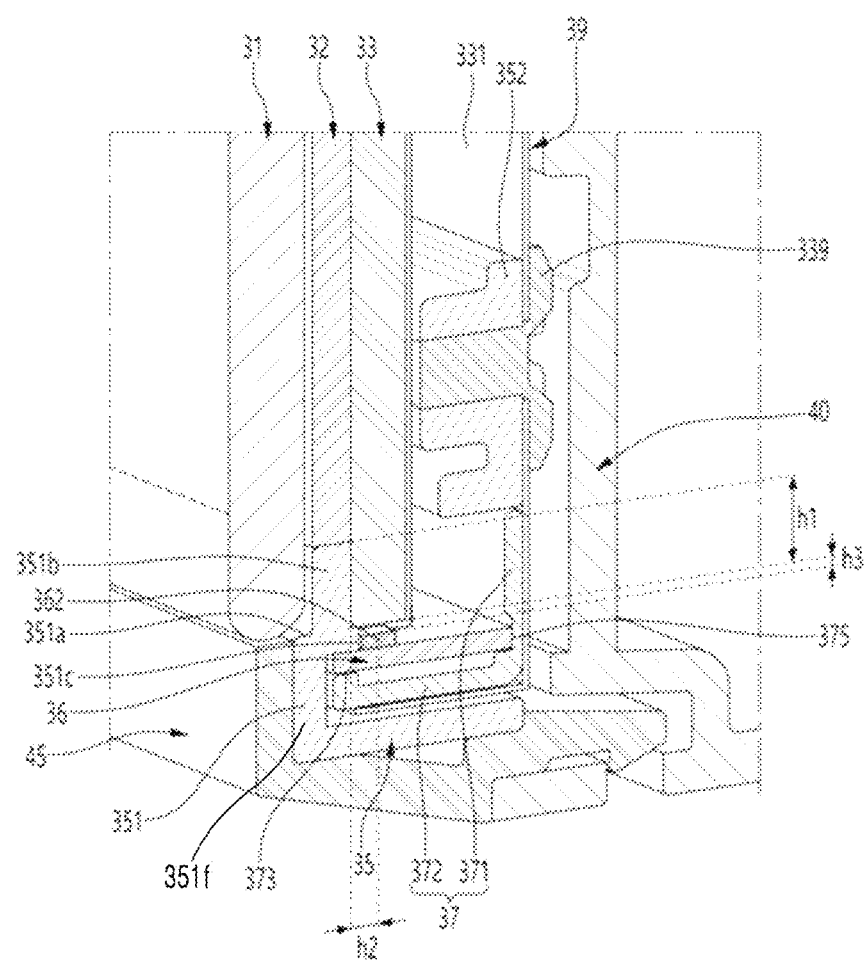
FIG. 23 is a perspective view of FIG. 2 cut along a line XIII-XIII'.
Figure 24:
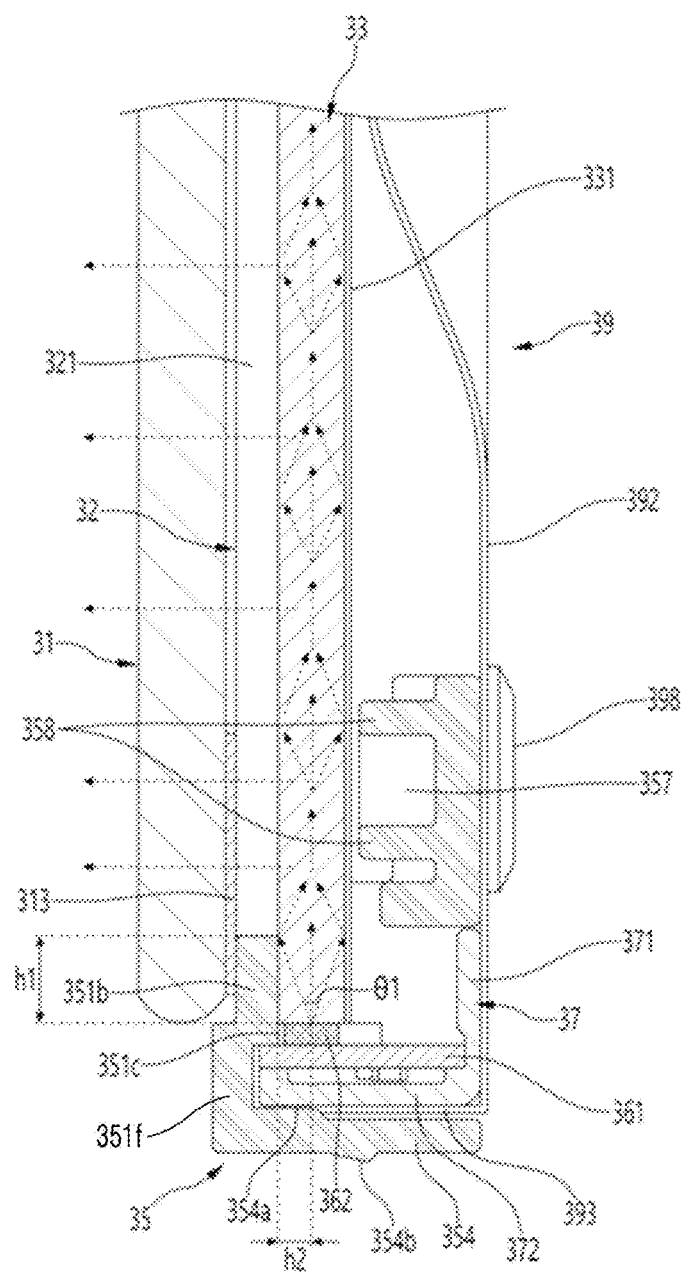
FIG. 24 is a view showing a cross-section of a lower end of the panel assembly.
Figure 26:
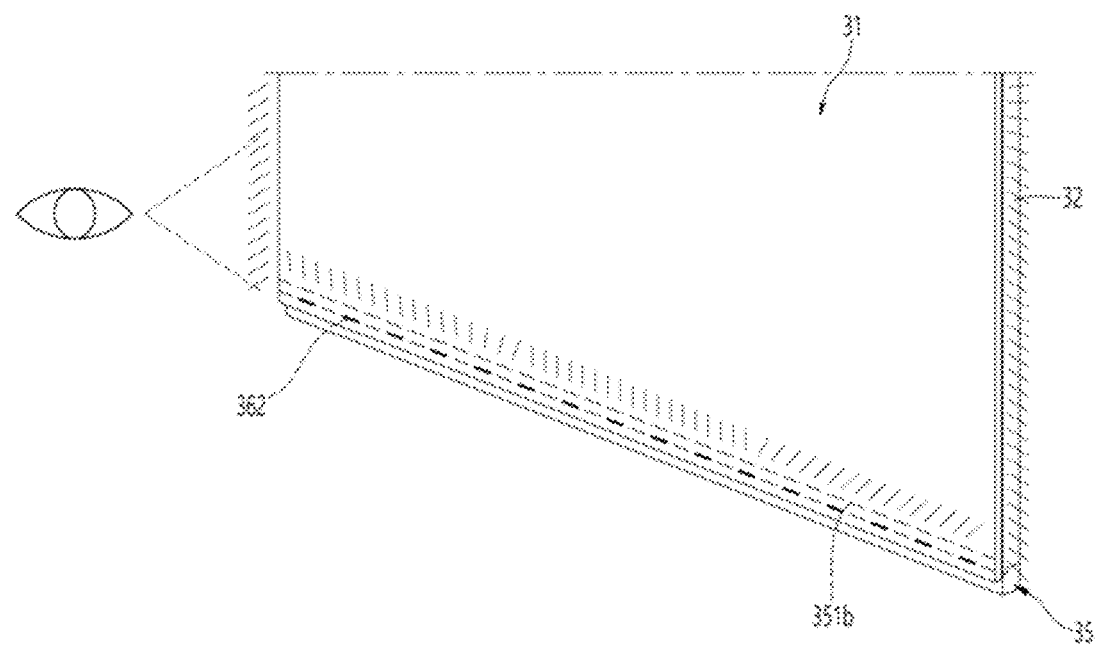
FIG. 26 is a view showing a state in which a lighting device emits light when viewing a door panel from the front.

FIG. 23 is a perspective view of FIG. 2 cut along a line XIII-XIII'. In addition, FIG. 24 is a view showing a cross-section of a lower end of the panel assembly. In addition, FIG. 25 is a view showing a light emitting state based on a vertical level of a shielding portion when viewing a door panel from the front. In addition, FIG. 26 is a view showing a state in which a lighting device emits light when viewing a door panel from the front.

According to one embodiment of the present disclosure, the shielding portion 351b may be disposed between the front plate 31 and the lighting device 36. In detail, the light source 362 installed in the lighting device 36 may be disposed below the lower end of the light guide plate 33. The light source 362 irradiates the light from below the light guide plate 33 toward the light guide plate 33, and the light reflected through the light guide plate 33 passes through the front plate 31, so that the panel assembly 30 emits light brightly.

The shielding portion 351b may be disposed at the lower end of the panel assembly 30 having the lighting device 36. In addition, the shielding portion 351b may be made of a material through which the light irradiated from the light source 362 does not transmit. That is, the shielding portion 351b may not be limited, but at least may be made of an opaque plastic material rather than a light-transmitting material.

The shielding portion 351b may be disposed forwardly of the position where the light source 362 is disposed, so that the occurrence of the hot-spot phenomenon in which the light of the light source 362 is transmitted directly and appears to be brighter than the surrounding in a form of a spot when viewing the front plate 31 at the front may be prevented.

The shielding portion 351b may be located between the front plate 31 and the light source 362. The shielding portion 351b is disposed at the rear of the front plate 31, so that when the panel assembly 30 is viewed from the front, the shielding portion 351b does not shield the front face of the front plate 31. The shielding portion 351b may not be exposed when the panel assembly 30 is viewed from the front. That is, the front face of the front plate 31 may form an entirety of the front face of the panel assembly 30, thereby providing an improved outer appearance.

In one example, the shielding portion 351b may be integrally formed with the lower bracket 35. As an example, the lower bracket 35 may include the shielding portion 351b formed by extending upwardly from the front end of the bottom face of the lower bracket 35. In addition, the shielding portion 351b may be formed to be stepped rearward from the lower bracket front face 351. In this case, there is an advantage in that assembling is simplified and workability increases compared to separately having the shielding portion 351b.

In detail, the lower bracket 35 includes a first stepped portion 351a formed to support the lower end of the front plate 31. The first stepped portion 351a is formed so as to support a portion of a load of the front plate 31 in contact with the lower end of the front plate 31.

The lower end of the front plate 31 may be supported by the lower cap decoration 45 and the lower bracket 35. The lower cap decoration 45 may be made of an opaque material.

In this regard, the lower end of the front plate 31 may be located above an upper end of the light source 362. That is, the light source 362 may be located below the lower end of the front plate 31. Therefore, the light irradiated from the light source 362 may be prevented from being transmitted directly to the front plate 31. In detail, the light emitted from the light source 362 is reflected through the light guide plate 33, so that an entirety of the front plate 31 may emit light uniformly. Further, the occurrence of the hot-spot caused by the light source 362 below the front plate 31 may be prevented.

In addition, the lower bracket 35 includes a second lower bracket front face 351b formed to be in contact with a portion of the rear face of the front plate 31 so as to support the front plate 31. The second lower bracket front face 351b may be formed to shield a portion of the light irradiated from the light source 362 to serve as the shielding portion 351b.

An upper end of the second lower bracket front face 351b may be located above the upper end of the light source 362. In addition, the upper end of the second lower bracket front face 351b may be located lower than the upper end of the lower bracket side face 353.

The second lower bracket front face 351b, in other words, the shielding portion 351b may be formed to extend upwardly from the front end of the lower bracket bottom face 354.

The support member 32 may be seated on the upper end of the shielding portion 351b. A top face of the shielding portion 351b may be formed to have a size corresponding to that of the bottom face of the support member 32. A length in the front and rear direction of the shielding portion 351b may correspond to the length in the front and rear direction of the support member 32, so that the support member 32 may be more stably mounted on the top face of the shielding portion 351b.

In addition, the lower end of the shielding portion 351b may be disposed at a position corresponding to a portion of the light source 362 of the lighting device 36. In addition, the upper end of the shielding portion 351b may be disposed at a position corresponding to the lower end of the light guide plate 33.

A spacing portion 351c for the shielding portion 351b and the light source 362 to be spaced apart from each other by a set spacing may be formed at the rear of the shielding portion 351b. The spacing portion 351c may be formed integrally with the lower bracket 35 and protrude in a direction in which the light source 362 is disposed.

The spacing portion 351c may be formed to be in contact with one face of the light source 362 in a state of being disposed between the shielding portion 351b and the light source 362.

In detail, the spacing portion 351c may be formed to be in contact with the front face of the light source 362, thereby allowing the shielding portion 351b and the light source 362 to be spaced apart from each other in the front and rear direction in front of the light source 362 while maintaining the mounted state of the light source 362.

In addition, the spacing portion 351c may be formed to be in contact with a portion of the substrate 361. The substrate 361 may be disposed between the light supporter 37 and the spacing portion 351c. In addition, the substrate 361 may have a bottom face fixed by the substrate support 373, and atop face fixed by the spacing portion 351c. With such structure, in the state in which the lighting device 36 is mounted on the lower bracket 35, the substrate 361 may maintain the state in which the top face and the bottom face thereof are fixed to the substrate support 373 and the spacing portion 351c. Accordingly, the lighting device 36 may be prevented from moving in the vertical direction.

The spacing portion 351c is formed to protrude rearward from the lower bracket front face 351 and comes into contact with the light source 362. Therefore, the light source 362 may be prevented from moving in the front and rear direction while the lighting device 36 is mounted on the lower bracket 35.

Therefore, the light source 362 may maintain the spacing between the shielding portion 351b and the light guide plate 33 even with the repeated opening and closing operation of the door 20.

In detail, the lighting device 36 is inserted through the bracket opening 352a of the lower bracket 35 and is mounted on the lower bracket 35 while being mounted on the light supporter 37. When the lighting device 36 is inserted into the lower bracket 35, one face of the light source 362 is inserted until it comes into contact with one face of the spacing portion 351c, so that the spacing portion 351c may guide a position where the light source 362 is disposed.

In addition, the substrate 361 may be placed between the spacing portion 351c and the light supporter 37, thereby confining the movement of the substrate 361.

That is, in the state in which the lighting device 36 is mounted on the lower bracket 35, the substrate 361 is supported by the light supporter 37, and one face of the light source 362 is disposed to be in surface contact with the spacing portion 351c.

With such structure, the movement of the light source 362 may be restricted and the exposure of the hot-spot caused by the movement of the light source 362 may be prevented.

In one example, in order to prevent the hot-spot from appearing, it is necessary to set a length h1 of the shielding portion 351b such that the light does not flow from the light source 362 to the light guide plate 33 and is not directly irradiated to the front plate 31.

When the length of the shielding portion 351b extending upward relative to the upper end of the light source 362 is too small, the hot-spot may be exposed depending on an angle for viewing the front plate 31 from the front.

In addition, when the length of the shielding portion 351b extending upward relative to the upper end of the light source 362 is too great, the light reflected from the light guide plate 33 is shielded, so that, when the lighting device 36 is turned on, the lower end of the front plate 31 may emit light with relatively low brightness compared to other portions.

The length h1 of the shielding portion 351b extending upward from the light source 362 may be determined in consideration of an irradiation angle θ1 of the light source 362, and a distance h2 at which the shielding portion 351b and the light source 362 are spaced apart from each other.

In detail, the length h1 of the shielding portion 351b extending upward from the light source 362 may be determined by Equation 1 below.

$$h1 > h2 * \tan(90 - \theta 1/2) \quad \text{(Equation 1)}$$

In this regard, the irradiation angle θ1 for irradiating light of the light source 362 may be in a range from about 90 to 150°, preferably be 120°.

When the shielding portion 351b is set to satisfy the Equation 1, the light directly irradiated from the light source 362 to the front plate may be effectively blocked.

Further, the spacing between the shielding portion 351b and the light source 362 may be constantly maintained by the spacing portion 351c.

In one example, the upper end of the shielding portion 351b may be located lower than the upper end of the lower bracket rear face 352. In detail, the shielding portion 351b may be located lower than the position where the lower bracket boss 357 is formed.

Alternatively, the shielding portion 351b may extend upwardly to a position corresponding to the upper end of the second supporting portion 371 of the light supporter 37. The upper end of the shielding portion 351b may correspond to the upper end of the second supporting portion 371, or may be located lower than the upper end of the second supporting portion 371.

For example, it is preferable that the shielding portion 351b has an upwardly extended length relative to the upper end of the light source 362 greater than 5 mm. More specifically, when the upwardly extended length of the shielding portion 351b relative to the upper end of the light source 362 is within a range from 7 to 15 mm, more preferably within a range from 8 to 11 mm, the hot-spot may be effectively prevented from being exposed at all angles for viewing the front plate 31 at the front.

Further, a shaded section based on a spacing between the light sources may occur, so that the hot-spot may appear. A dark section may be generated between the light sources by the irradiation angle (a divergence angle) of the light sources. As the spacing between the light sources is narrower, a vertical dimension of the dark section may be reduced, so that the vertical dimension of the shielding portion may be reduced.

As an example, as shown in FIG. 25, a degree of appearance of the hot-spot was observed when changing a vertical dimension of a shielding film while the light sources are arranged to have the spacing therebetween of 8.0 mm.

In this regard, in the case in which the shielding portion 351b is not disposed between the front plate 31 and the light guide plate 33, when the lower end of the front plate 31 is viewed from the front at angles of 0 degrees, 40 degrees, 65 degrees, and 80 degrees, the hot-spot that emits light brighter than the periphery in the form of spot was observed at the lower end of the front plate 31.

Further, when the shielding portion 351b is formed to have the vertical dimension of 5 mm, and the lower end of the front plate 31 is viewed from the front at the angles of 0 degrees, 40 degrees, 65 degrees, and 80 degrees, the hot-spot was observed finely at 40 and 80 degrees.

In one example, when the shielding portion 351b is formed to have the vertical dimension of 8 mm, and the lower end of the front plate 31 is viewed from the front at the angles of 0 degrees, 40 degrees, 65 degrees, and 80 degrees, the hot-spots was not observed.

That is, when the shielding portion 351b is formed to have the vertical dimension exceeding at least 5 mm, in an entire range of viewing angles viewed for viewing the front plate 31 from the front, the hot-spot may be prevented from occurring.

In one example, when the vertical dimension h1 of the shielding portion 351b increases, an area of the light reflected from the light guide plate 33 is reduced, so that there is a problem in that the lower end of the front plate 31 becomes relatively dark in the state in which the lighting device 36 is turned on.

In addition, the light guide plate 33 may be spaced apart from the light source 362 by a certain distance h3. For example, the light guide plate 33 may be disposed to be spaced apart from the upper end of the light source 362 by a distance in a range from about 0.1 to 1 mm, preferably in a range from 0.1 to 0.5 mm, more preferably in a range from 0.3 to 0.4 mm.

More specifically, the distance h3 from the upper end of the light source 362 to the lower end of the light guide plate 33 may be within the range from 0.1 to 1 mm, preferably within the range from 0.1 to 0.5 mm, more preferably within the range from 0.3 to 0.4 mm.

In addition, multiple light sources 362 may be arranged at a regular spacing on the substrate 361. The spacing between the neighboring light sources 362 may be set in consideration of the vertical dimension h1 of the shielding portion 351b.

As an example, it is preferable to set the height h1 of the shielding portion 351b to be 1 to 2.5 times, preferably about 2 times, the spacing between the neighboring light sources 362.

In other words, it is preferable in terms of the hot-spot exposure prevention to set the spacing between the neighboring light sources 362 to be 0.3 to 0.7 times, approximately 0.5 times the vertical dimension h1 of the shielding portion 351b.

This is because the hot-spot may be exposed forward through the door as the light irradiated from the neighboring light sources is merged in the middle.

As a specific example, it is preferable to arrange the light sources 362 such that the spacing between the neighboring light sources 362 is in a range from about 2 to 10 mm, more preferably in a range from 3 to 10 mm.

Within such range, while minimizing the vertical dimension of the shielding portion 351b, the creation of the hot-spot may be effectively prevented.

In such structure, as shown in FIG. 26, the shielding portion 351b shields the light directly irradiated to the front plate 31 from the lighting device 36 mounted on the lower end of the panel assembly 30. In addition, the light irradiated from the light source 362 and reflected through the light guide plate 33 passes through the front plate 31 and is emitted.

The hot-spot may be prevented from occurring at the entire angles for the user to view the panel assembly 30 by the shielding portion 351b when the user views the panel assembly 30 at a position in front of the door 20.

Figure 27:
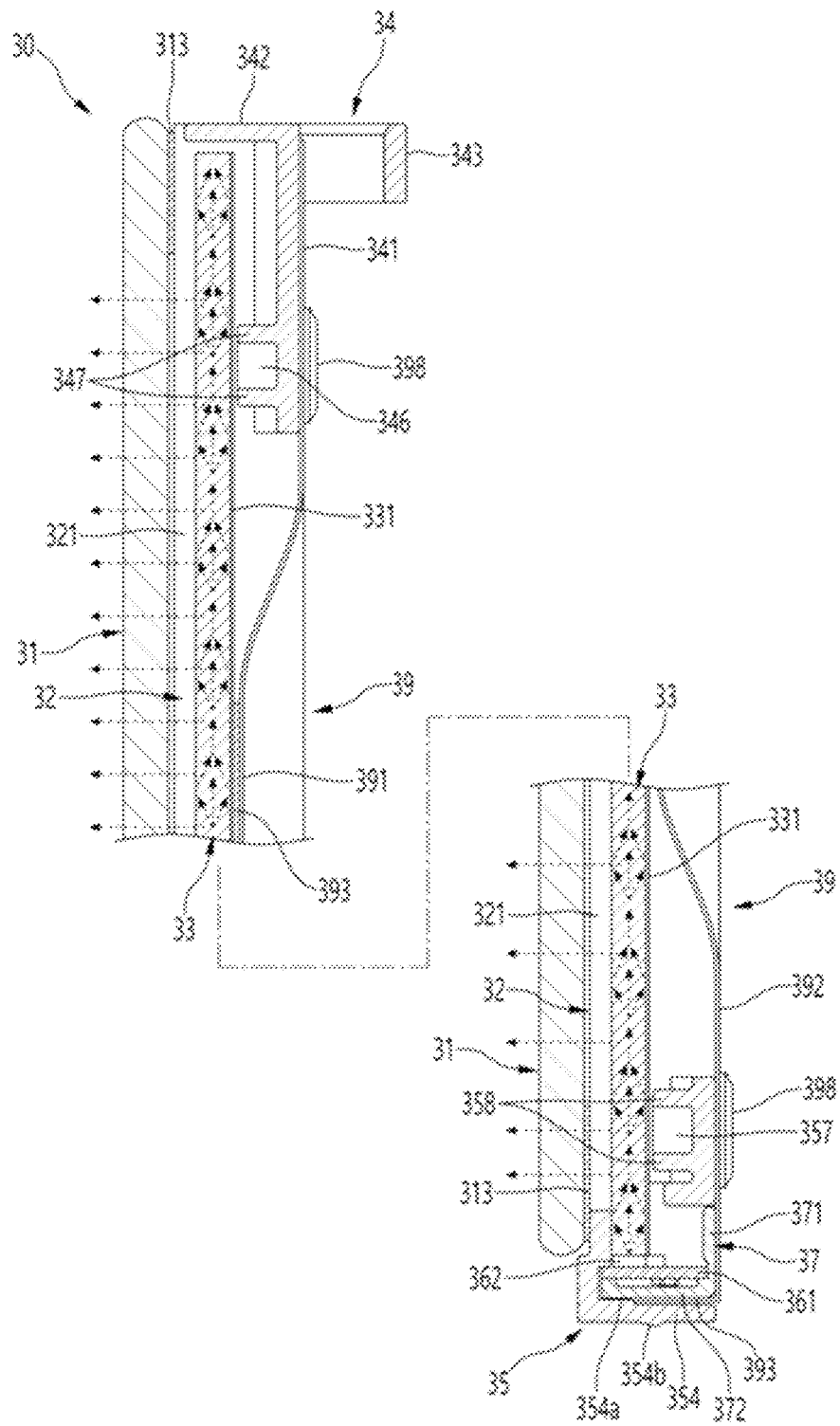
FIG. 27 is a cross-sectional view showing a light emitting state of a panel assembly.

FIG. 27 is a cross-sectional view showing a light emitting state of the panel assembly.

Hereinafter, operations of the refrigerator 1 and the panel assembly 30 having the above structures will be described in more detail with reference to the drawings.

When the lighting device 36 is turned on, the light irradiated from the light source 362 may be irradiated to the lower end of the light guide plate 33 and may be diffused and reflected along the light guide plate 33.

In this regard, the light guided by the light guide plate 33 may be reflected forward by the reflective layer 331 and transmitted through the front plate 31 to the outside. In addition, the light may be reflected from a peripheral face of the light guide plate 33 by the reflective member 332 disposed around the light guide plate 33, so that a reflection efficiency inside the light guide plate 33 may be maximized.

An entirety of the light guided via the light guide plate 33 by the reflection of the reflective layer 331 and the reflective member 332 may be irradiated forward, so that an entirety of the front plate 31 may emit light brightly and the front face of the door 20 may emit light with set brightness or color.

In one example, the lighting device 36 may be disposed at the lower end of the panel assembly 30, and the light source 362 may irradiate the light upwards. In addition, the lighting device 36 may be fixed so as not to be moved inside the lower bracket 35. Therefore, even with the repeated opening and closing of the door 20, the lighting device 36 may maintain the correct position, and the light irradiated from the light source 362 may be directed toward the lower end of the light guide plate 33, so that the front plate 31 may be guaranteed to emit light with set luminance.

In particular, the light guide plate 33 may have a structure supported from below by the weight thereof, and thus the set gap G may be maintained between the lower end of the light guide plate 33 and the upper end of the light source 362. Therefore, the light irradiated from the light source 362 may be effectively incident on the lower end of the light guide plate 33, the luminance of the front plate 31 may be ensured, and the front plate 31 may emit light with uniform brightness.

The lighting device 36 may be positioned lower than the upper end of the lower bracket 35. In addition, the shielding portion 351b may be disposed between the front plate 31 and the lighting device 36. The shielding portion 351b may extend further upwards than the upper end of the light source 362 so as to shield a portion of the lighting device 36 from the front. Accordingly, the shielding portion 351b may prevent the lighting device 36 from being exposed when viewed from the front of the door 20. Further, the shielding portion 351b may prevent the lighting spot (the hot-spot) from appearing at a position adjacent to the light source 362, thereby improving the quality of the outer appearance of the front face of the door 20 and preventing the glare for the user.

In detail, the shielding portion 351b may be installed at the position adjacent to the position where the light source 362 is disposed so as to prevent the light at a position closest to the light source 362 from being transmitted directly to the front plate 31, thereby preventing the hot-spot from appearing at the position adjacent to the light source 362.

In addition, as the lighting device 36 is turned on, the front face of the door 20 may brightly emit light, and the front face of the door 20 may emit light with a set color by the light irradiated from the plurality of the light sources 362. In this regard, the color of the front face of the door 20 may be a color or brightness different from a color in the state in which the lighting device 36 is turned off.

Figure 28:
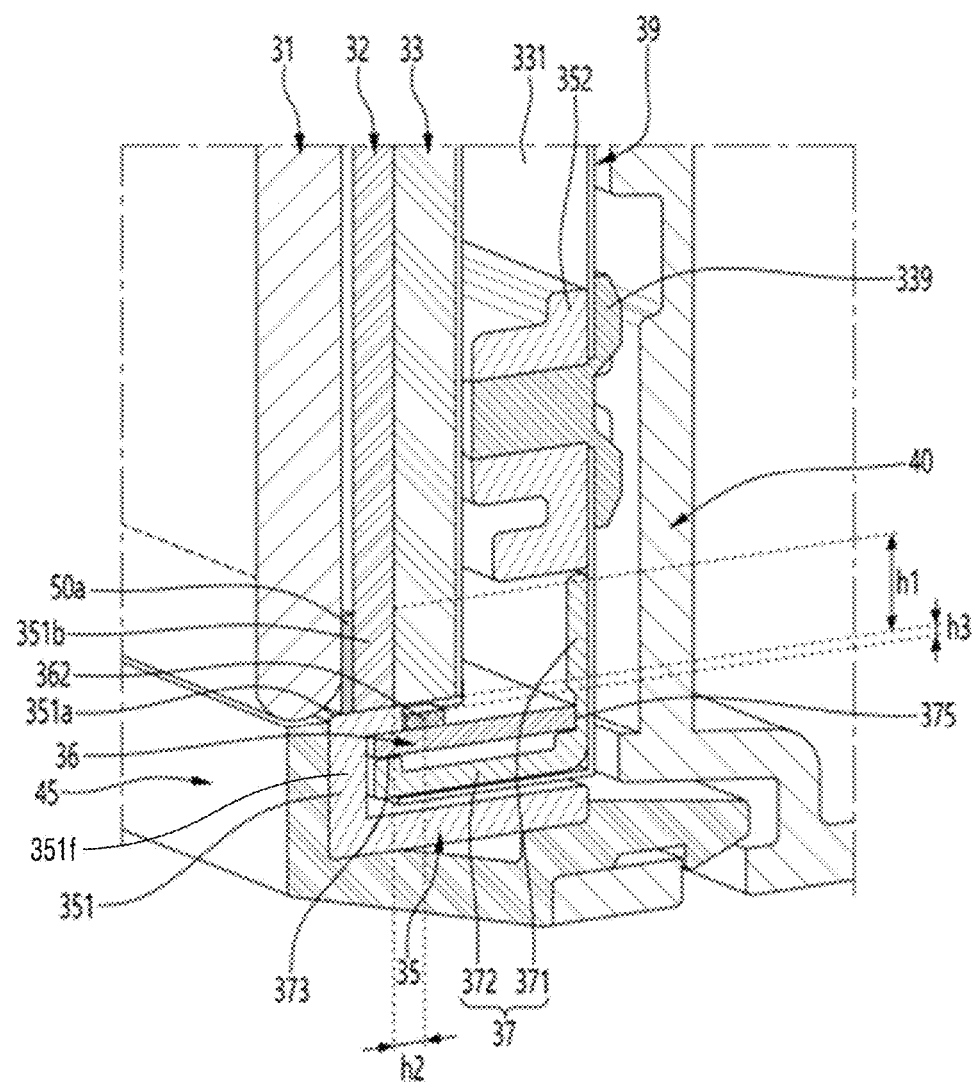
FIG. 28 is a cross-sectional view showing a cross-section of a door according to another embodiment of the present disclosure.

FIG. 28 is a cross-sectional view showing a cross-section of a door according to another embodiment of the present disclosure.

Hereinabove, the description has made with an example in which the shielding portion 50a according to one embodiment of the present disclosure is integrally formed with the lower bracket 35, but the present disclosure is not limited thereto.

The shielding portion 50a may be formed as an independent component separated from the lower bracket 35.

As an example, as shown in FIG. 28, the shielding portion 50a may be disposed between the front plate 31 and the light guide plate 33. The shielding portion 50a may be formed in contact with the rear face of the front plate 31 separately from the lower bracket 35.

The shielding portion 50a may be mounted on the upper end of the lower bracket 35.

The shielding portion 50a may be disposed in front of the support member 32. The shielding portion 50a may be formed such that a thickness thereof in the front and rear direction corresponds to the thickness in the front and rear direction of the support member 32 or is shorter than the thickness in the front and rear direction of the support member 32, but the present disclosure is not limited thereto. In this regard, the shielding portion 50a may be made of an opaque plastic material.

Alternatively, the shielding portion 50a may be formed as an adhesive tape and adhered to the rear face of the front plate 31.

When a length of the shielding portion 50a extending upward from the lower end of the front plate 31 is too great, an area through which the light is transmitted from the light source 362 becomes small, so that, in the state in which the lighting device 36 is turned on, the lower end of the front plate 31 may become relatively dark. In addition, when the length of the shielding portion 50a extending upward from the lower end of the front plate 31 is too small, the hot-spot may be recognized from the front of the front plate 31 by the light irradiated from the light source 362.

Accordingly, the upwardly extended length h1 of the shielding portion 50a from the upper end of the light source 362 is preferably a length greater than approximately 5 mm, and is preferably a length greater than 5 mm and equal to or smaller than 10 mm.

The distance h2 at which the light source is spaced apart from the shielding portion may be a length satisfying the Equation 1.

In this regard, the light guide plate is preferably disposed upwardly spaced apart from the light source 362 at the distance h3 in a range from approximately 0.1 to 0.5 mm.

Figure 29:
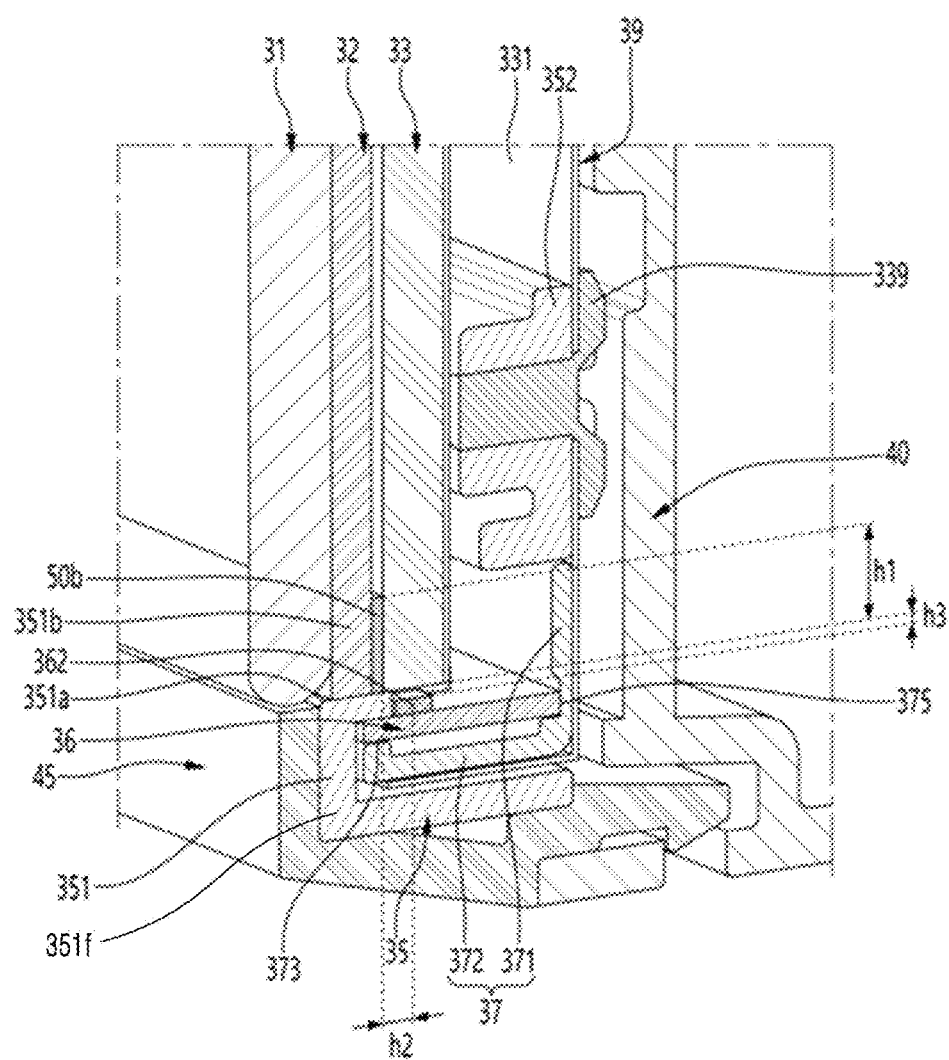
FIG. 29 is a cross-sectional view showing a cross-section of a door according to another embodiment of the present disclosure.

FIG. 29 is a cross-sectional view showing a cross-section of a door according to another embodiment of the present disclosure.

Further, the shielding portion 50b according to another embodiment of the present disclosure may be disposed separately on the lower bracket 35 as shown in FIG. 29.

The shielding portion 50b may be disposed between the front plate 31 and the light guide plate 33. In detail, the shielding portion 50b may be spaced rearwardly apart from the front plate 31 and may be disposed close to the light guide plate 33. In this case, the shielding portion 50b may be disposed on the rear face of the support member 32.

In this regard, the support member 32 may be further extended downwardly to the upper end of the lower bracket 35. In addition, the shielding portion 50b may be fixedly attached to the rear face of the support member 32.

When the length of the shielding portion 50b extending upward from the lower end of the support member 32 is too great, an area through which the light is transmitted from the light source 362 becomes small, so that, in the state in which the lighting device 36 is turned on, the lower end of the front plate 31 may become relatively dark. In addition, when the length of the shielding portion 50b extending upward from the lower end of the front plate 31 is too small, the hot-spot may be recognized from the front of the front plate 31 by the light irradiated from the light source 362.

Accordingly, the upwardly extended length h1 of the shielding portion 50b from the upper end of the light source 362 is preferably a length greater than approximately 5 mm, and is preferably a length greater than 5 mm and equal to or smaller than 10 mm.

The distance h2 at which the light source is spaced apart from the shielding portion may be a length satisfying the Equation 1.

In this regard, the light guide plate is preferably disposed upwardly spaced apart from the light source 362 at the distance h3 in a range from approximately 0.1 to 0.5 mm.

As such, when the shielding portion 50*b* is formed separately from the lower bracket 35, there is an advantage in that separation and replacement of the shielding portion 50*b* are easy.

Hereinafter, operations of the refrigerator 1 and the panel assembly 30 having the above structures will be described in more detail with reference to the drawings.

Figure 30:
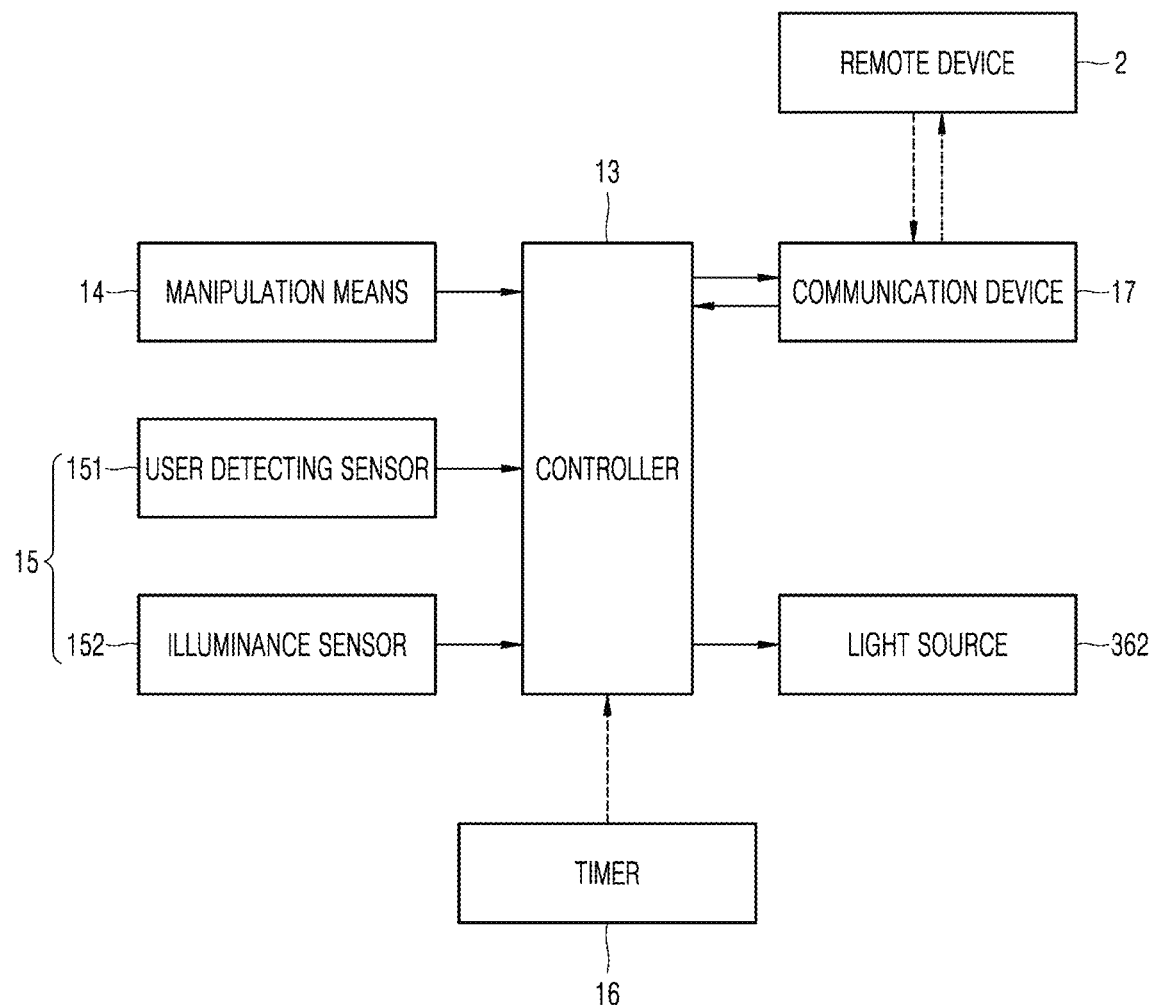
FIG. 30 is a block diagram showing a flow of a control signal of a refrigerator.
Figure 31:
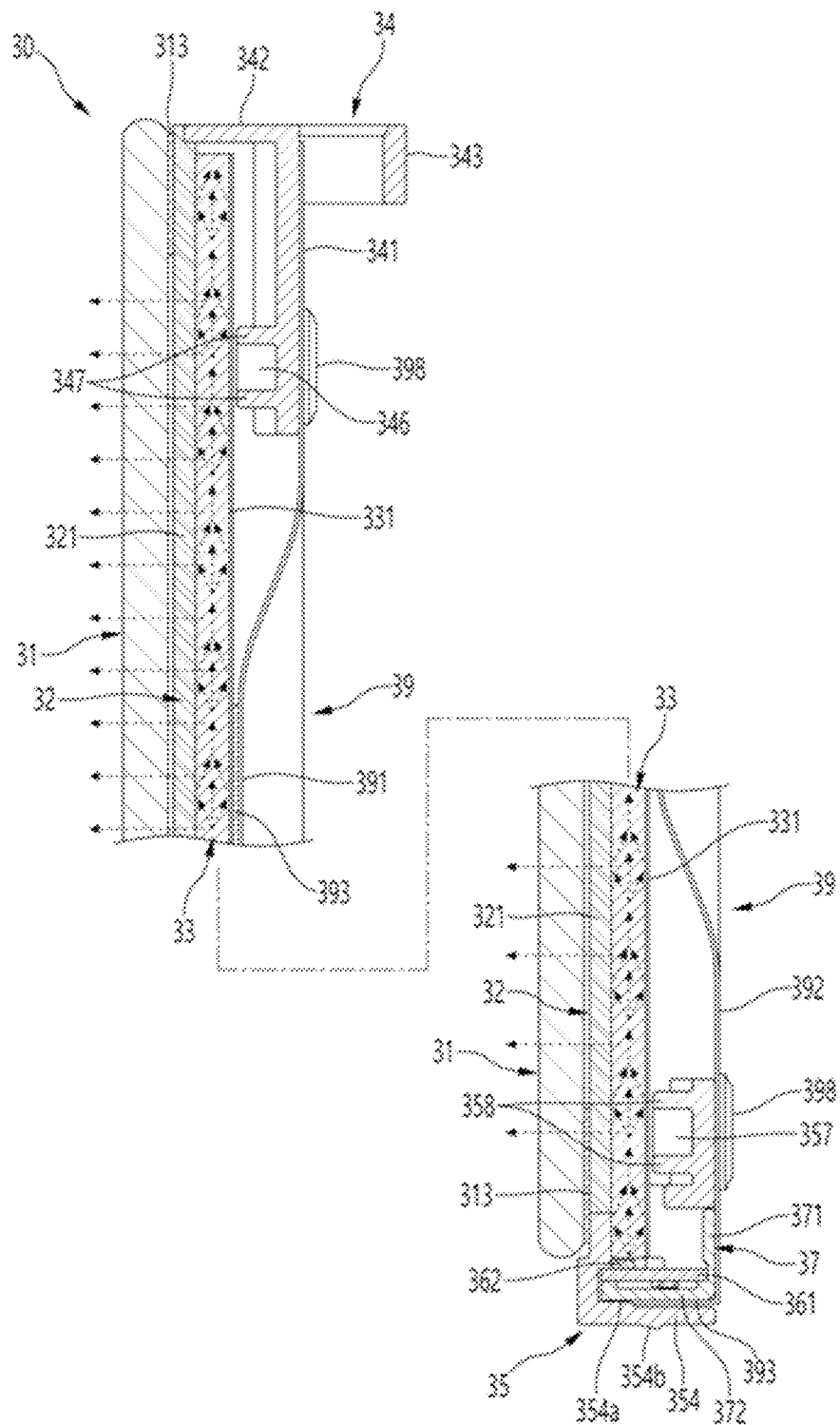
FIG. 31 is a vertical cross-sectional view showing a light emitting state of a panel assembly.
Figure 32:
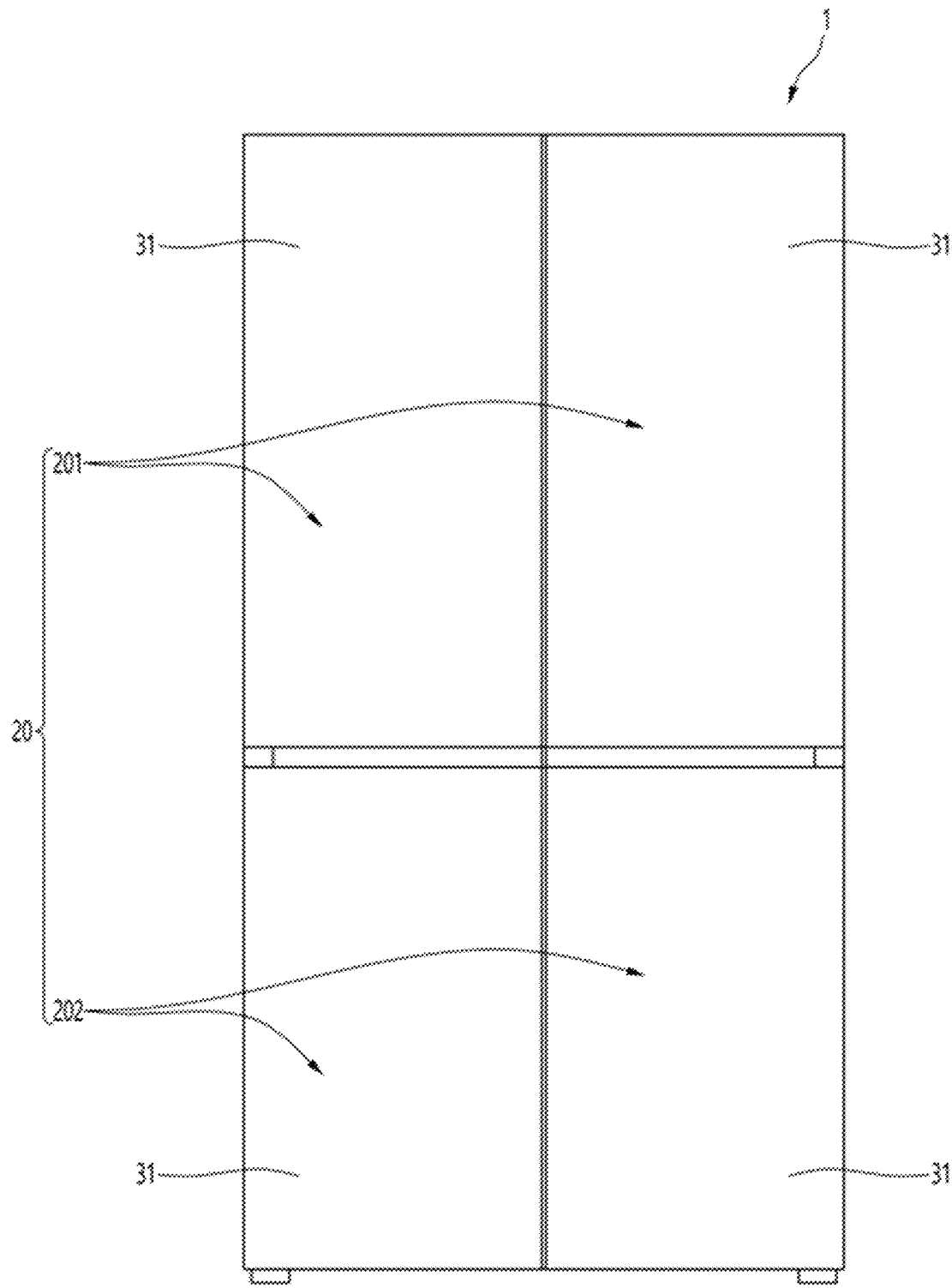
FIG. 32 is a front view showing a front outer appearance of a refrigerator with a lighting device turned off.
Figure 33:
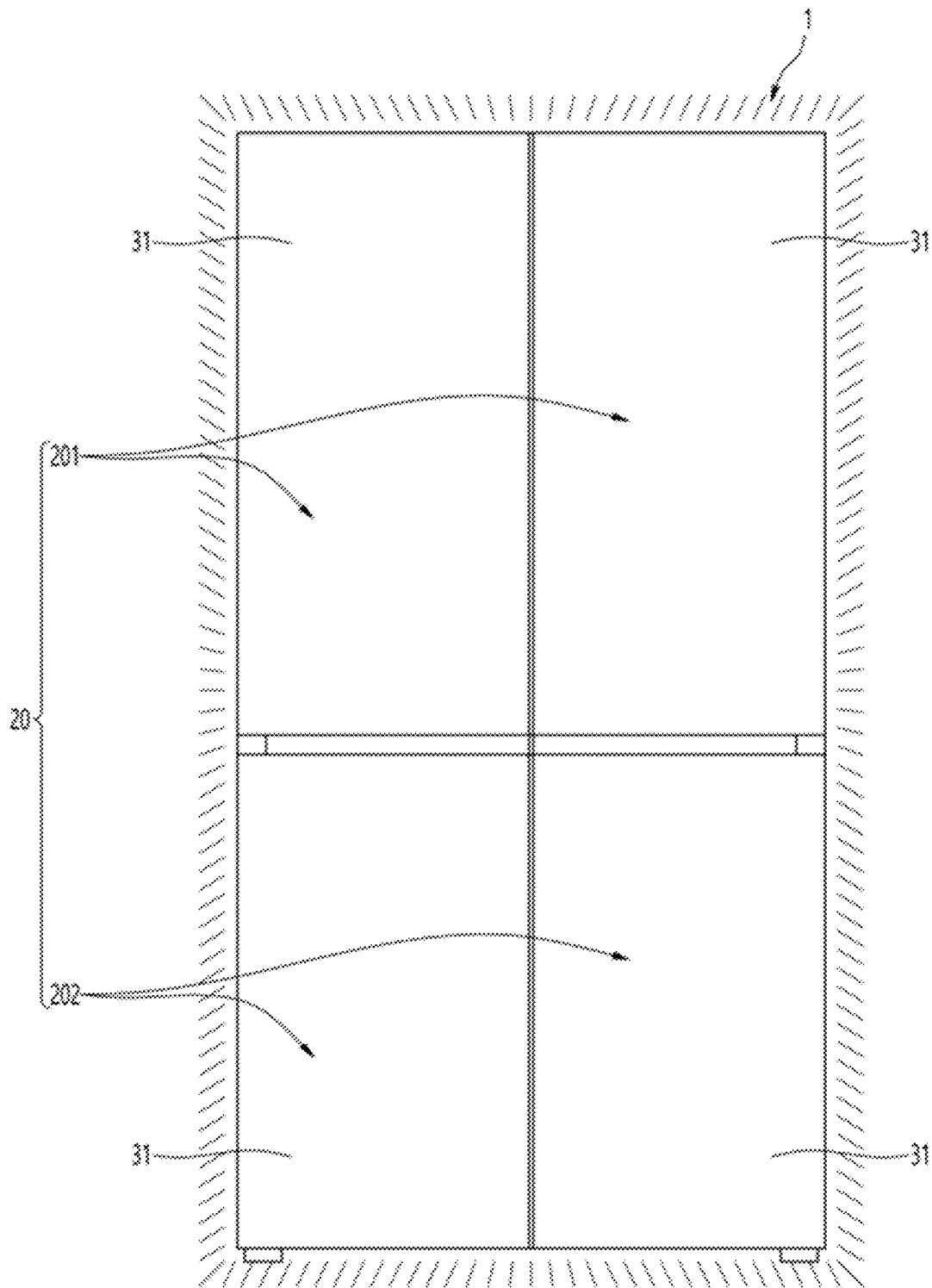

FIG. 30 is a block diagram showing a flow of a control signal of a refrigerator. FIG. 31 is a vertical cross-sectional view showing a light emitting state of a panel assembly. FIG. 32 is a front view showing a front outer appearance of a refrigerator with a lighting device turned off. FIG. 33 is a front view showing a front outer appearance of a refrigerator with a lighting device turned on.

As shown in the drawing, in the refrigerator 1 according to the embodiment of the present disclosure, the front face of the door 20 may emit light by the operation of the lighting device 36.

The front face of the door 20 may be turned on and off under control of a controller 13 and may emit light with a color set among a number of colors.

The operation of the lighting device 36 may be achieved via user's manipulation on manipulation means 14. The manipulation means 14 may be disposed at one side of the refrigerator 1, and as one example, may be disposed at one side of the cabinet 10. In one example, the manipulation means 14 may be disposed on the door 20 as needed, and may receive a command by a touch manipulation of the front plate 31. That is, the user may set the operation of the lighting device 36 by directly manipulating the manipulation means 14, and may turn the lighting device 36 on or off.

The user may be able to set overall operation states of the lighting device 36, such as an operation time and an operation condition of the lighting device 36, a color of emitted light of the light source 362, and the like via the manipulation on the manipulation means 14. When necessary, the manipulation means 14 may be formed as a display that may display information and may be manipulated.

The lighting device 36 may be manipulated and set via a remote device 2 away from the refrigerator. The refrigerator 1 may communicate with the remote device 2 via the communication device 17 connected to the controller 13, and the user may manipulate the operation of the lighting device 36 via the remote device 2. The refrigerator 1 may communicate with the remote device 2 via a communication device 17 connected to the controller 13, and the user may manipulate an operation of the lighting device 36 via the remote device 2.

The communication device 17 may communicate with the remote device 2 using various schemes. For example, the communicator 17 may have a communicable structure using at least one scheme such as wired, wireless, or short range communication (Bluetooth, Wi-Fi, Zigbee, and NFC). The remote device 2 may be various devices that are capable of being in communication with devices, such as a dedicated terminal, a mobile phone, a tablet PC, a portable PC, a desktop PC, a remote control, or a Bluetooth speaker.

The user may manipulate and set the overall operation states of the lighting device 36, such as the operation time and the operation condition of the lighting device 36, the color of emitted light of the light source 362, and the like via the manipulation of the remote device 2. For example, the lighting device 36 may be simply manipulated and set via an application or a dedicated program installed in the portable phone of the user.

In one example, the lighting device 36 may also be operated by a sensor. The sensor may be, for example, a user detecting sensor 151 for detecting approach of the user. For example, the user detecting sensor 151 may use various devices capable of detecting that the user has approached the refrigerator, such as an infrared sensor, an ultrasonic sensor, or a laser sensor.

The user detecting sensor 151 may be disposed at one side of the cabinet or the door 20, and may be disposed at various positions for detecting the approach of the user. A plurality of sensors may be disposed at different positions.

Thus, when the user approaches the refrigerator 1 by a set distance for use of the refrigerator 1, the user detecting sensor 151 may detect this and may transfer a signal to the controller 13 to turn on the lighting device 36. When the user moves away from the refrigerator 1, the user detecting sensor 151 may detect this and may transfer a signal to the controller 13 to turn off the lighting device 35.

In detail, when the user detecting sensor 151 detects that the user is very close to the refrigerator 1, the lighting device 36 may be turned off or the brightness thereof may be gradually dimmed to prevent the glare of the user. When the user moves away from the refrigerator 1 again, the lighting device 35 may be turned on again or an original brightness thereof may be restored.

The sensor may be an illuminance sensor 152. The illuminance sensor 152, which detects illuminance of an indoor space, may be disposed at the same position as a position at which the user detecting sensor 151 is disposed.

The lighting device 36 may be operated based on the detected illuminance of the illuminance sensor 152. For example, when the detected illuminance of the illuminance sensor 152 is equal to or less than a set illuminance and the lighting device 36 is dimmed, the controller 13 may turn on the lighting device 36, and when the detected illuminance of the illuminance sensor 152 is equal to or greater than the set illuminance and the lighting device 36 becomes brighter, the controller 13 may turn off the lighting device 36.

The sensor may include both the illuminance sensor 152 and the user detecting sensor 151, and the illuminance sensor 152 and the user detecting sensor 151 may be operated in a complex way to cause the controller 13 to turn on and off the lighting device 36.

For example, in the state in which the illuminance sensor 152 has detected that the illuminance is equal to or greater than the set illuminance, the lighting device 36 may be maintained in the OFF state irrespective of whether the user detecting sensor 151 has detected the approach of the user. In the state in which the illuminance sensor 152 has detected that the illuminance is equal to or less than the set illuminance, when the user detecting sensor 151 detects the approach of the user, the lighting device 36 may be turned on.

The sensor may be an in-refrigerator temperature sensor 153. The controller 13 may be connected to the in-refrigerator temperature sensor 153. The in-refrigerator temperature sensor 153 may detect a temperature inside the refrigerator and may transfer the detected temperature to the controller 13, and the controller 13 may cause the light source 362 to emit light with set color based on the temperature inside the refrigerator and may intuitively display the temperature and a state inside the refrigerator via the color of the front face of the door 20.

The lighting device 36 may include the state in which the brightness thereof is adjusted in addition to the ON state and the OFF state. That is, depending on the operation state of the refrigerator 1, the controller 13 may adjust the operation state of the refrigerator 1 by changing the brightness of the lighting device 36.

The controller 13 may be connected to a microphone 18. Thus, the light source 362 may emit light with set color based on a voice signal received from the microphone 18, and an input state of the voice signal or a setting state of a function may also be displayed via the color of the front face of the door 20.

For example, when receiving a temperature adjusting signal of the user via the microphone 18, the controller 13 may adjust the temperature inside the refrigerator to the set temperature, and may operate the lighting device 36 to change the color of the front face of the door 20 to a color corresponding to the corresponding temperature. In another example, when music is input via the microphone 18, the lighting device 36 may also be controlled to change the color of the front face of the door 20 in response to play of the music, and the front face of the refrigerator door 20 may be continuously changed in color like an equalizer while interacting with the played music.

In one example, the lighting device 36 may be turned on and off at a time set by a timer 16. That is, the lighting device 36 may be turned on based on a time when the user is mainly active and may be maintained off outside the set time range. In addition, the lighting device 36 may be turned off during the day and on during night irrespective of actual illuminance.

Irrespective of the operation state of the refrigerator 1, the brightness and the color of the front face of the door 20 may be adjusted only based on user settings.

In one example, the operation state of the lighting device operated by the controller is now described. As shown in FIG. 31, when the lighting device 36 is turned on in response to an instruction of the controller 13, the light emitted from the light source 362 may be irradiated toward the bottom face 333 of the light guide plate 33 and may be diffused and reflected along the light guide plate 33.

In this regard, the light guided by the light guide plate 33 may be reflected forward by the reflective layer 331 and transmitted through the front plate 31 to the outside. Light may also be reflected at a peripheral face the light guide plate 33 by the reflective member 332 disposed around the light guide plate 33 to maximize a reflection efficiency of the inside of the light guide plate 33.

Via the reflection of the reflective layer 331 and the reflective member 332, the light guided via the light guide plate 33 may be entirely emitted forward to cause the entirety of the front plate 31 to brightly emit light, and the front face of the door 20 may emit light with the set brightness or color.

In one example, the lighting device 36 may be disposed on the lower end of the panel assembly 30, and the light source 362 may emit light upward. The lighting device 36 may be fixed to be prevented from being moved inside the lower bracket 35. Thus, even when the door 20 is repeatedly opened and closed, the lighting device 36 may be maintained at the exact position, and the front plate 31 may be ensured to emit light with set luminance by directing light emitted from the light source 362 toward the lower end of the light guide plate 33.

The light guide plate 33 has a structure supported from below by the weight thereof, and thus, the set gap G may be maintained between the lower end of the light guide plate 33 and the upper end of the light source 362. Therefore, the light irradiated from the light source 362 may be effectively incident on the bottom face 333 of the light guide plate 33, and the front plate 31 may emit light with uniform brightness while the luminance thereof is ensured.

The lighting device 36 may be positioned lower than the bottom face 312 of the front plate 31. Thus, viewed from the front, the lighting device 36 may be prevented from being exposed, and the lighting spot (the hot-spot) may be prevented from appearing at the position adjacent to the light source 362.

Further, the lighting device 36 may be located lower than the upper end of the lower bracket 35. Therefore, the lighting device 36 may be prevented from being exposed when viewed from the front, and the lighting spot (the hot-spot) may be prevented from appearing at the position adjacent to the light source 362, thereby improving the quality of the outer appearance of the front face of the door 20 and reducing the glare of the user.

The lighting device 36 may be turned on and the front face of the door 20 may emit light brightly, and the front face of the door 20 may emit light with the set color by the light irradiated from the plurality of the light sources 362. In this regard, the color of the front face of the door 20 may be a different color or brightness from the color in the state in which the lighting device 36 is turned off.

That is, the color of the front face of the door 20 may be seen as the color of the front plate 31, and a texture and a pattern formed on the front plate 31 may be seen. In this regard, the color of the front plate 31 may be a color with a brightness greater than 0 and may be a color other than black. The color of the front face of the door 20 in the state in which the lighting device 36 is turned off may be referred to as a first color.

Thus, the front face of the door 20 may be seen with color of the front plate 31, and in this case, components inside the panel assembly 30 may not be seen to the outside through the front plate 31 by the color of the front plate 31.

In this state, the lighting device 36 may be turned on, and when the lighting device 36 is turned on, the front face of the door 20 may emit light with the color set by the controller 13.

The controller 13 may instruct the front face of the door 20 to emit light with a second color different from the first color, and the lighting device 36 may cause the light source 362 to emit light with the second color in response to the instruction of the controller 13.

When the light source 362 emits light with the second color, light of the second color may be transmitted through the front face of the front plate 31 by light reflected by the light guide plate 33, and the front face of the door 20, that is, the outer appearance of the front face of the refrigerator 1 may have the second color.

In one example, in the state in which the front face of the refrigerator 1 emits light with the second color, when the controller 13 instructs change in color of the front face of the refrigerator 1, and the front face of the door 20 may emit light with color that is reset by the controller 13.

For example, the controller 13 may instruct the front face of the door 20 to emit light with a third color different from the first color and the second color, and the lighting device 36 may cause the light source 362 to emit light with the third color in response to the instruction of the controller 13.

When the light source 362 emits light with the third color, light with the third color may be transmitted through the front face of the front plate 31 by light reflected by the light guide plate 33, and the outer appearance of the front face of the front face of the door 20, that is, the outer appearance of the front face of the refrigerator 1 may have the third color.

In one example, some of multiple doors 20 forming the outer appearance of the front face of the refrigerator 1 may emit light, or the multiple doors 20 may independently emit light to form the outer appearance of the front face of the refrigerator 1 with set color.

The refrigerator 1 may be operated to cause some of the multiple doors 20 to emit light or emit light with specific color. That is, only some of the doors 20 may emit light rather than all of the lighting devices 36 included in the doors 20 are operated. For example, one of the refrigerating chamber doors 201 may emit light.

As necessary, the left refrigerating chamber door and the right refrigerating chamber door may emit light with different colors. At least two of the doors 20 may be sequentially changed in color and at least two of the doors 20 may be sequentially turned on or off.

In this regard, the lighting device 36 included in the panel assembly 30 may be controlled by the controller 13 under the aforementioned various conditions.

In one example, the refrigerating chamber door or the freezing chamber door among the doors may be controlled to emit light with different colors.

The controller 13 may control the lighting device 36 to cause one pair of refrigerating chamber doors 201 to be seen with the first color. The controller 13 may control the lighting device 36 to cause one pair of refrigerating chamber doors 201 to be seen with the second color.

That is, the refrigerating chamber door 201 and the freezing chamber door 202 may be distinguished from each other with colors, and the colors of the refrigerating chamber door 201 and the freezing chamber door 202 may also be changed based on a temperature change inside the refrigerator.

Thus, via the color of the front face of the door 20, the user may intuitively recognize an operation state of each storage space as well as may distinguish the refrigerating chamber and the freezing chamber from each other.

In one example, in addition to the above-described embodiment, various other embodiments may be available. Another embodiment of the present disclosure is characterized in that the panel assembly has a structure that shields the opened front face of the door body. Another embodiment of the present disclosure has the same structure as the above-described embodiment except for some components of the door body and uses the same reference numerals for the same components, and the detailed description thereof will be omitted.

Figure 34:
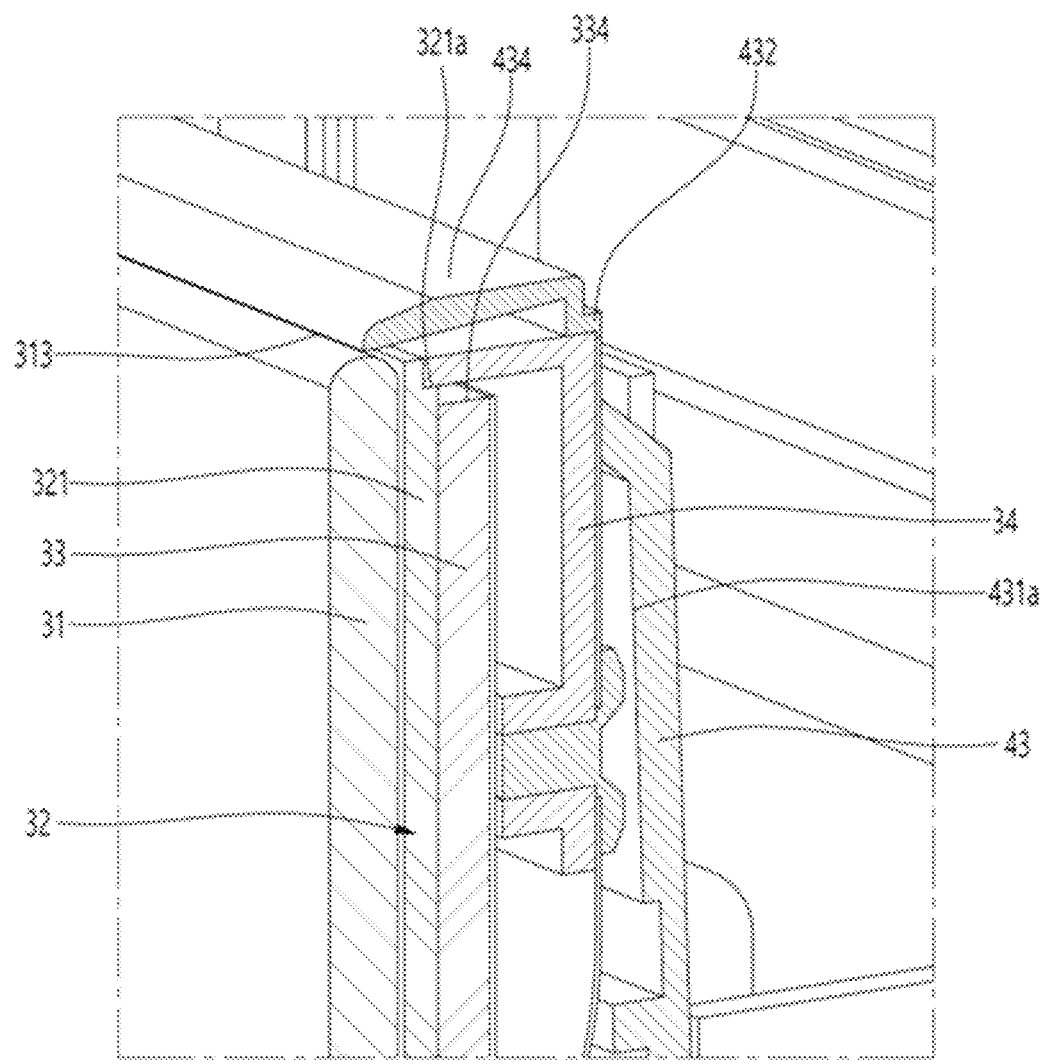
FIGS. 34 and 35 are vertical cross-sectional views of a refrigerator door according to another embodiment of the present disclosure.
Figure 35:
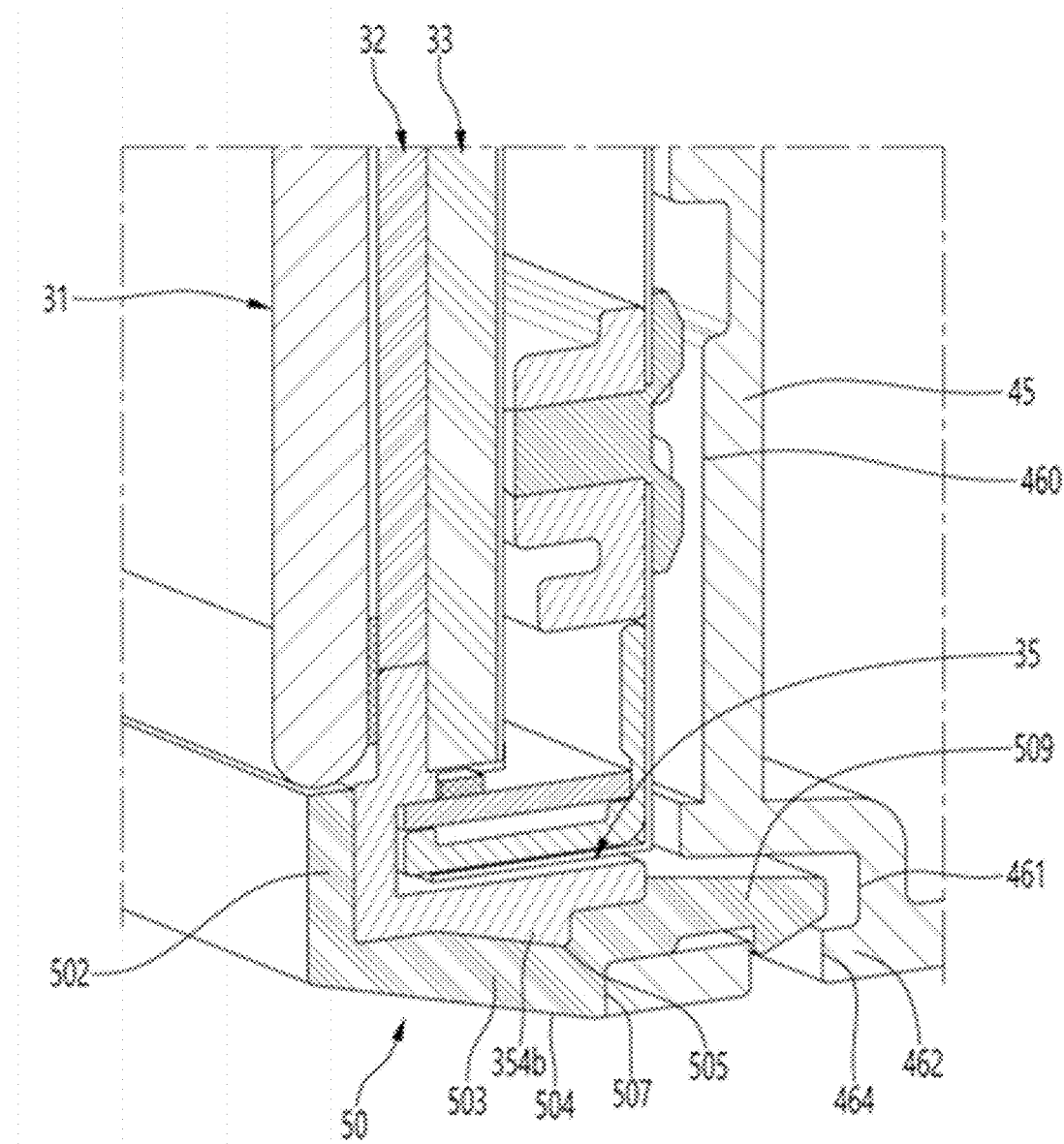

FIGS. 34 and 35 are vertical cross-sectional views of a refrigerator door according to another embodiment of the present disclosure. FIG. 34 is a cross-sectional view of an upper cap decoration in a refrigerator door, and FIG. 35 is a cross-sectional view of a lower cap decoration in a refrigerator door.

The basic structure of the panel assembly of the present embodiment is the same as that in the previous embodiment, but, the panel assembly additionally includes a lower trim.

Therefore, in the following, only characteristic portions of the present embodiment will be described.

Referring to FIGS. 13, 34, and 35, the panel assembly 30 of the present embodiment may further include a lower trim 50 coupled to the lower bracket 35. The lower trim 50 may be coupled to surround a portion of the lower bracket 35.

The lower trim 50 may include a first portion 502 extending in the vertical direction, and a second portion 503 extending in the horizontal direction from a lower end of the first portion 502. The first portion 502 may be in contact with the front face of the lower bracket front face 351. The first portion 502 may be positioned below the front plate 31 while in contact with the lower bracket front face 351.

The lower bracket bottom face 354 may be seated on the second portion 503. A protrusion 354b may be formed on the lower bracket bottom face 354, and a groove 505 into which the protrusion 354b is inserted may be defined in the second portion 503. In one example, a plurality of protrusions 354b may be disposed to be spaced apart from each other on the lower bracket bottom face 354, and a plurality of grooves 505 may be defined to be spaced apart from each other in the second portion 503.

The second portion 503 may include an inclined face 504. The inclined face 504 may be inclined downward in a direction away from the first portion 502.

The lower trim 50 may further include a coupling hook 509 extending from the second portion 503. The coupling hook 509 may extend from the second portion 503 in a direction away from the first portion 502.

The second portion 503 may include a contact face 507 extending upward from an end of the inclined face 504. The contact face 507 comes into contact with the front face of the lower cap decoration 45 with the coupling hook 509 coupled to the lower cap decoration 45.

The coupling hook 509 may be coupled to the lower cap decoration 45. As an example, a plurality of coupling hooks 509 may be horizontally spaced apart from each other. A portion of the coupling hook 509 may be positioned higher than the bottom face of the lower bracket bottom face 354 seated on the second portion 503, and may come into contact with the lower bracket bottom face 354. Accordingly, the lower bracket bottom face 354 may be positioned between the first portion 502 and the coupling hook 509 to limit the movement of the lower bracket bottom face 354 in the front and rear direction.

An upper portion of the panel assembly 30 may be accommodated in the receiving space 431a of the upper cap decoration 43, and the mounting protrusion 343 described in the previous embodiment may be mounted on a protrusion mounting portion 431 of the upper cap decoration 43.

The upper cap decoration 45 may include a stopper 432 that is seated on the panel assembly 30 while the panel assembly 30 is accommodated in the receiving space 431a of the upper cap decoration 45. The stopper 432 may be mounted on the upper bracket 34 as one example. Therefore, the upward movement of the panel assembly 30 may be restricted by the stopper 432.

The upper cap decoration 45 may further include an upper extension 434 that covers the upper side of the panel assembly 30 while the panel assembly 30 is accommodated in the receiving space 431a of the upper cap decoration 45.

In one example, a portion of the upper bracket 34 may be seated on the front portion 321. As an example, a seating groove 321a recessed downward may be defined in the top face of the front portion 321, and the upper bracket 34 may be seated in the seating groove 321a. When the upper bracket 34 is seated in the seating groove 321a, the top face 334 of the light guide plate 33 may be spaced apart from the upper bracket 34. Therefore, even when the light guide plate 33 is expanded by heat, an expansion space of the light guide plate 33 may be secured.

The top face of the front portion 321 and the top face 313 of the front plate 31 may be positioned higher than the top face of the light guide plate 33.

The upper extension 434 may be extended to cover at least a portion of the top face 313 of the front plate 33 while covering the entirety of the upper bracket 34 and the front portion 321. That is, the end of the upper extension 434 may be disposed to overlap the front plate 33 in the vertical direction. In this regard, an end of the upper extension 434 may be positioned at the rear of the front face of the front plate 33.

The lower portion of the panel assembly 30 may be accommodated in the receiving space 460 of the lower cap decoration 45. The lower cap decoration 45 may further include a hook groove 461 in which a portion of the coupling hook 509 is positioned, and a lower extension 462 for the second portion 503 of the lower trim 50 to be seated. The lower extension 463 may have a hook slot 464 into which the coupling hook 509 is inserted.

Hereinafter, another embodiment of the present disclosure will be described with reference to the drawings.

Figure 36:
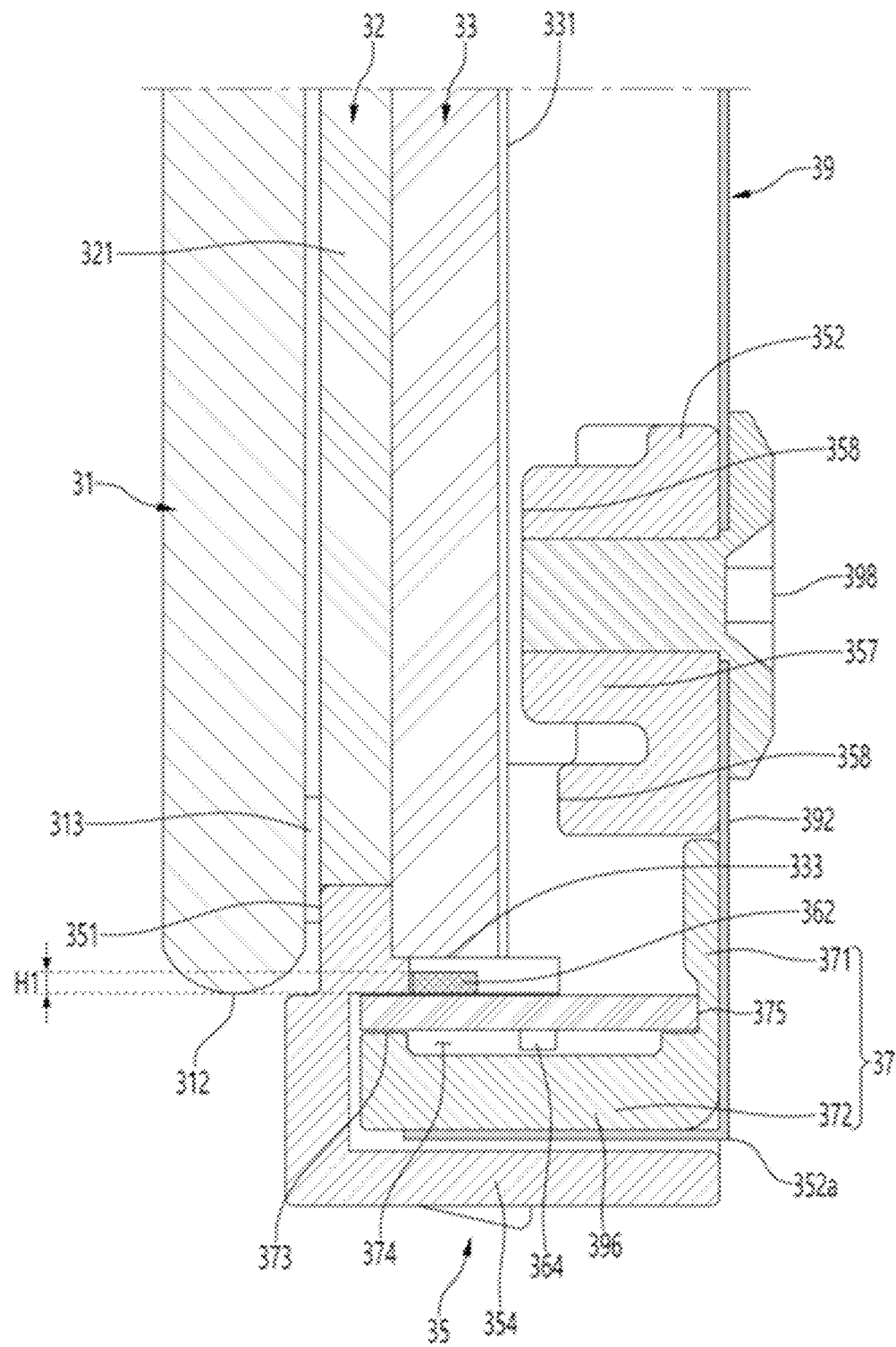
FIG. 36 is across-sectional view showing a variant of FIG. 21.

FIG. 36 is a cross-sectional view showing a variant of FIG. 21.

The present embodiment is the same as that described in FIG. 21 except that there is a difference in the positions of the bottom face of the light guide plate, the bottom face of the front plate, and the light source. Therefore, characteristic portions of the present embodiment will be described below.

Referring to FIG. 36, in the present embodiment, the top face of the light source 362 may be positioned at a vertical level equal to or higher than that of the bottom face 313 of the front plate 31 (a vertical level difference H1). The bottom face 333 of the light guide plate 33 may also be positioned higher than the bottom face 313 of the front plate 31. In this case, the gap between the light guide plate 33 and the light source 362 may be horizontally aligned with the front plate 31. In this case, the light that has passed through the gap between the light guide plate 33 and the light source 362 is directly irradiated to the front plate 31, which may cause the lighting spot.

As described above, when the light source, the front plate, and the light guide plate are arranged, the lower bracket 35 includes the lower bracket front face 351 for preventing the light that has passed through the gap between the light guide plate 33 and the light source 362 from being directly irradiated to the front plate 31.

At least a portion of the lower bracket front face 351 may be located in front of the gap between the light guide plate 33 and the light source 362 to cover the gap. Further, at least a portion of the lower bracket front face 351 may be positioned between the front plate 313 and the light guide plate 33. That is, the top face of the lower bracket front face 351 may be positioned higher than the bottom face 333 of the light guide plate 33.

Therefore, in the present embodiment, the lighting spot may be prevented from being generated on the front plate 31.

Figure 37:
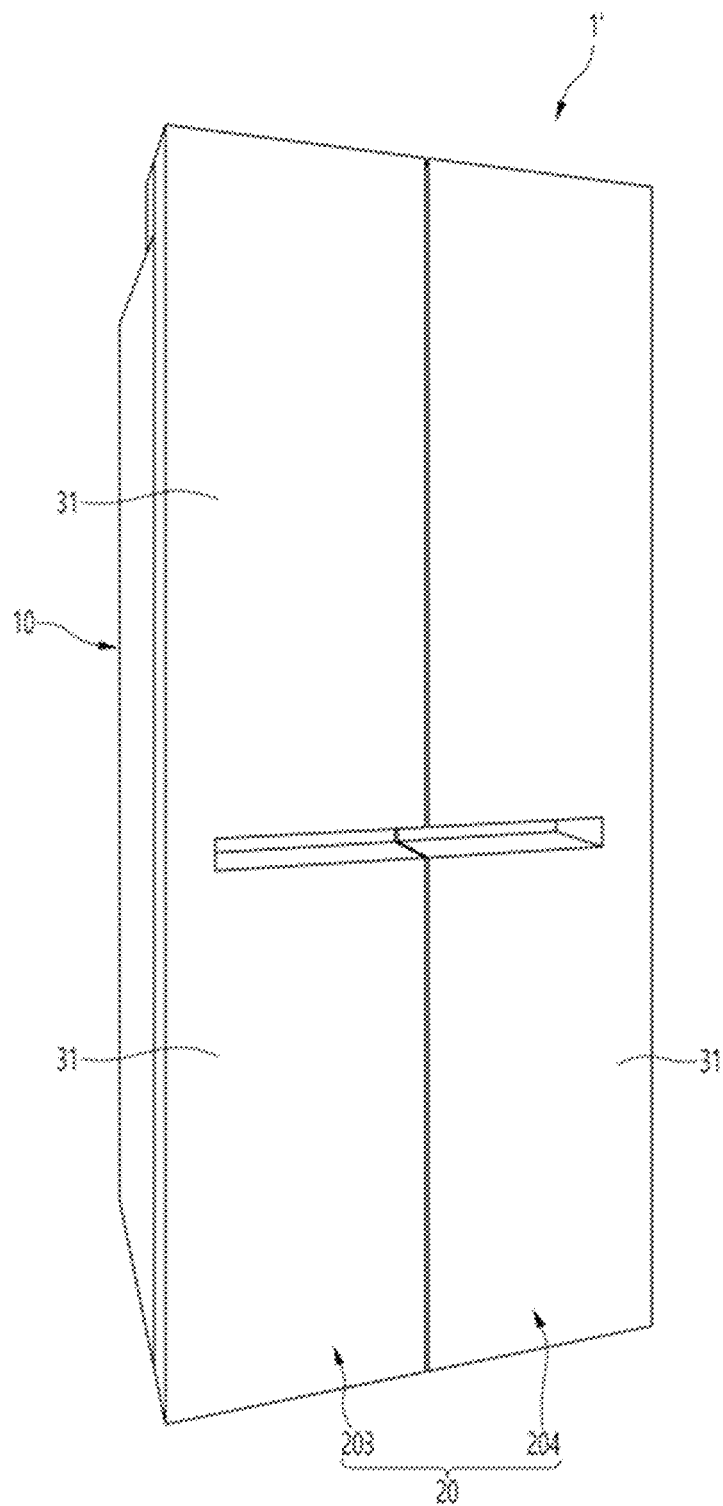
FIG. 37 is a perspective view of a refrigerator according to another embodiment of the present disclosure.
Figure 38:
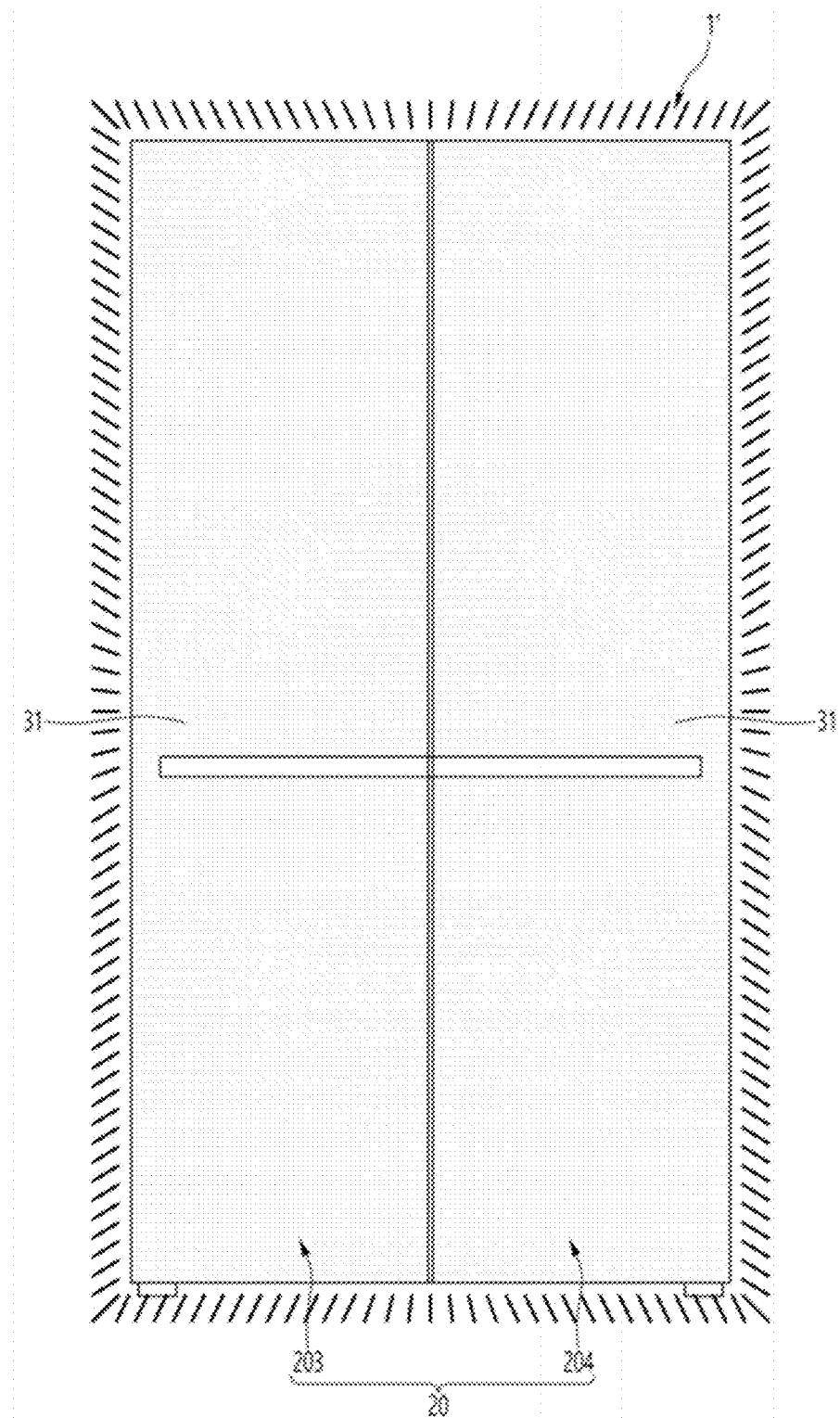

FIG. 37 is a perspective view of a refrigerator according to another embodiment of the present disclosure. FIG. 38 is a front view showing a front outer appearance of a refrigerator with a lighting device of the refrigerator turned on.

As shown in the drawings, an outer appearance of a refrigerator 1' according to another embodiment of the present disclosure may be formed by the cabinet 10 in which the storage space is defined, and the door 20 for opening and closing the open front face of the cabinet 10.

The cabinet 10 may be divided into right and left sides. Although not shown, a left space of the cabinet 10 may be constructed as the freezing chamber, and a right space of the cabinet 10 may be constructed as the refrigerating chamber.

The door 20 may include a freezing chamber door 203 for opening and closing the freezing chamber and a refrigerating chamber door 204 for opening and closing the refrigerating chamber. The freezing chamber door 203 and the refrigerating chamber door 204 may be arranged in parallel to each other at right and left sides, and the refrigerating chamber and the freezing chamber may be constructed to be opened and closed by the pivoting of the doors.

In the state in which the door 20 is closed, the outer appearance of the front face of the refrigerator 1' may be formed by the door 20. The door 20 may include the door body 40 and the panel assembly 30. A detailed structure of the door 20 may be the same as that in the aforementioned embodiment and may be different therefrom only in the size and the placement position, and thus a detailed description or illustration thereof may be omitted and unillustrated reference numerals in the drawings may refer to the aforementioned embodiment.

Color of the panel assembly 30 may be determined by the front plate 31 constituting the front face of the panel assembly 30. Thus, in the state in which the lighting 30 device is turned off, the outer appearance of the front face of the refrigerator 1' may be formed with color of the front plate itself.

When the lighting device 36 is turned on under control of the controller 13, light irradiated by the lighting device 36 may transmit the front plate 31 to change the front plate 31 in color or brightness. In this regard, under control of the controller 13, the lighting device 36 may emit light with various colors, and the front plate 31 may emit light as the color thereof is changed to various colors. That is, in the state in which the door 20 is maintained to be assembled and mounted, the color or the brightness of the outer appearance of the front face of the refrigerator 1' may be changed, resulting in change in the outer appearance.

As necessary, the refrigerating chamber door 204 and the freezing chamber door 203 may emit light with different colors, and the refrigerating chamber door 204 and the freezing chamber door 203 may emit light with color selected to harmonize with surrounding furniture or an installation environment, thereby harmonizing with a surrounding environment. When an installation or usage environment or a usage condition is change, the outer appearance of the front face of the refrigerator 1' may be freely changed based on the change.

There may be various other embodiments other than the aforementioned embodiments. According to another embodiment of the present disclosure, a panel assembly forming the exterior may be applied to other home appliances other than a refrigerator to change color of an outer appearance of the home appliance. Another embodiment of the present disclosure may have the same structure of the panel as that in the aforementioned embodiment except for the size and shape of a panel and an application target, and thus the same components as in the aforementioned embodiment use the same reference numeral, and a detailed description thereof may be omitted.

The following embodiments are the same as the aforementioned embodiments in terms of components of a panel assembly, and thus for detailed components, reference may be made to the description and drawings of the aforementioned embodiment, and a detailed description thereof is omitted to avoid repetition.

Hereinafter, with reference to the drawings, other embodiments of the present disclosure will be described.

Figure 39:
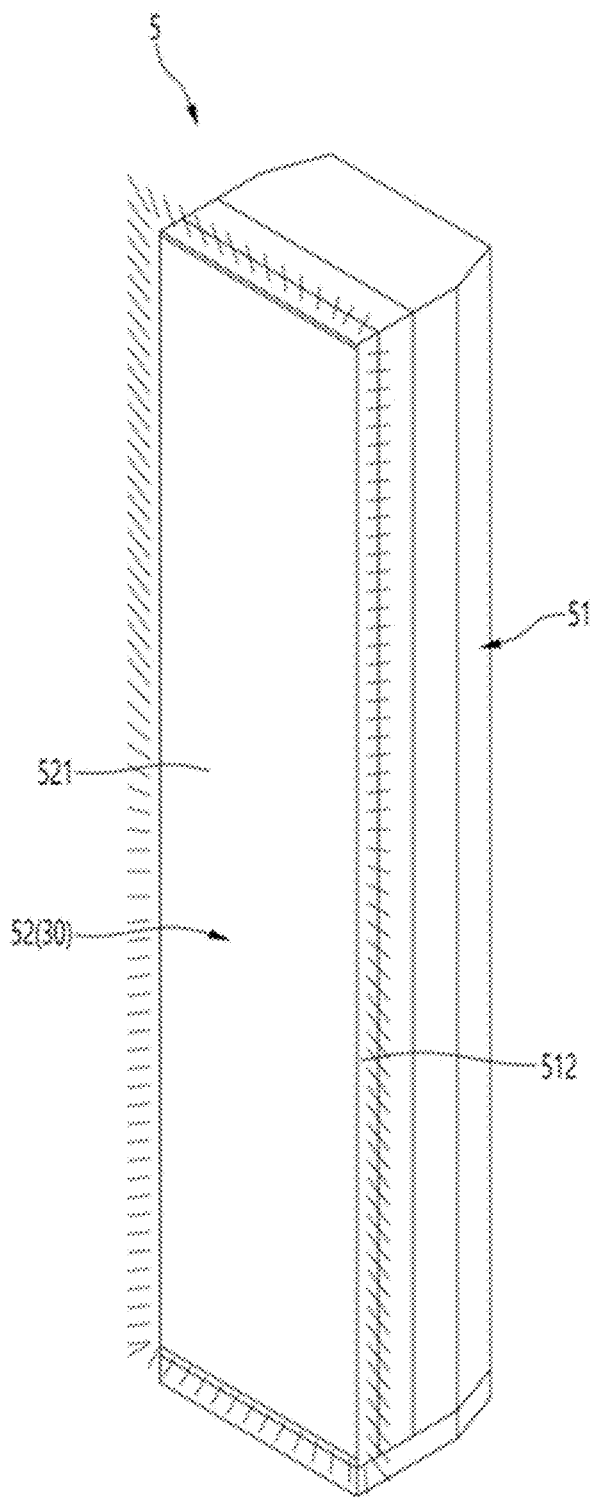
FIG. 39 is a perspective view of an indoor unit of an air conditioner according to another embodiment of the present disclosure.
Figure 40:
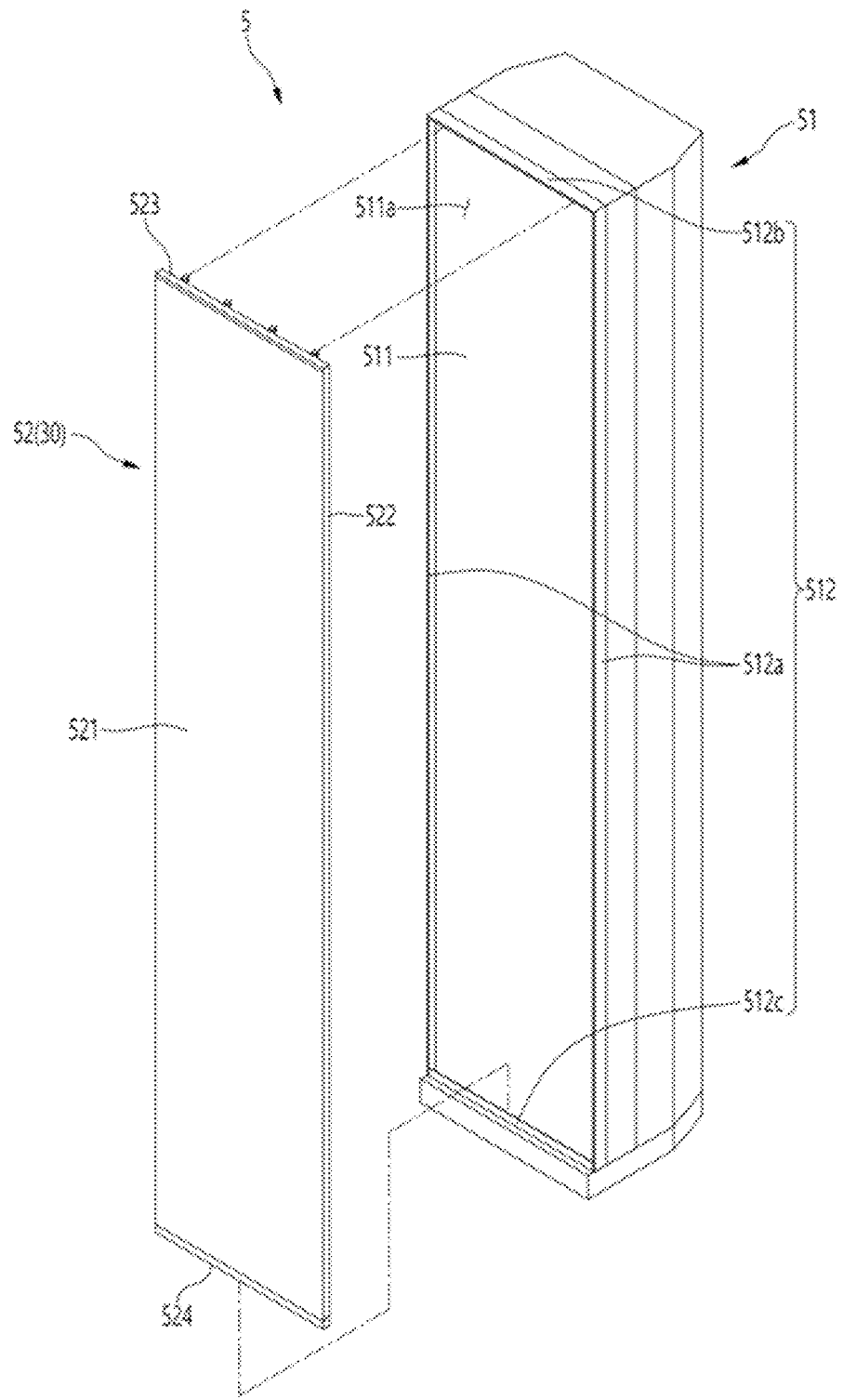
FIG. 40 is an exploded perspective view with a panel assembly of the indoor unit separated.

FIG. 39 is a perspective view of an indoor unit of an air conditioner according to another embodiment of the present disclosure. FIG. 40 is an exploded perspective view with a panel assembly of the indoor unit separated.

As shown in the drawings, an indoor unit 5 of an air conditioner according to another embodiment of the present disclosure may include a casing 51 forming an outer shape, and a panel assembly 52 mounted on a front face of the casing 51 to form an outer appearance of a front face of the indoor unit 5.

Although not shown in detail, in general, the casing 51 may accommodate therein components making up a refrigeration cycle as well as a heat exchanger and a blower fan, and an absorption port for absorbing indoor air and a discharge port for discharging heat-exchanged air into a room may be formed at one side of the casing 51.

A casing border 512 may be formed at a perimeter of a casing front face 511. The casing border 512 may be formed to correspond to a shape of the panel assembly 52 and may protrude forward from the casing front face 511 to form a panel receiving space 511*a* for accommodating the panel assembly 52 therein.

The casing border 512 may include one pair of side borders 512*a* forming both side faces, an upper border 512*b* for connecting upper ends of the pair of side borders 512*a* to each other, and a lower border 512*c* for connecting lower ends of the pair of side borders 512*a* to each other.

The panel assembly 52 may form an appearance of the front face of the indoor unit 5 and may be accommodated on an internal face of the panel receiving space 410. A peripheral face of the panel assembly 52 may be supported by the casing border 512. In particular, a lower end of the panel assembly 52 may be caught and restrained by the lower border 512*c*, and an upper end of the panel assembly 52 may be coupled to the upper border 512*b* to fixedly mount the panel assembly 52 on the front face of the casing 51.

The panel assembly 52 may have the same structure as the panel assembly 30 according to the aforementioned embodiment, and thus the front face of the panel assembly 52 may emit light with various colors under control of the controller 13.

The panel assembly 52 may include a front plate 521 forming a front face, a support member 522 on which the front plate 521 is mounted, an upper bracket 523 mounted on an upper end of the support member 522 to form a top face of the panel assembly 52, and a lower bracket 524 mounted on a lower end of the support member 522 to form a bottom face of the panel assembly 52.

Although not shown, the light guide plate 33 may be mounted on the support member 522, and the lighting device 36 for emitting light to the light guide plate 33 may be disposed on the lower bracket 524. The back cover 39 may be disposed on a rear face of the panel assembly 52.

As shown in FIG. 39, in the indoor unit 5 as configured above, when the lighting device 36 is turned on, the entirety of the front plate 521 may emit light by the light irradiated from the lighting device 36, and the appearance of the front face of the indoor unit 5 may be formed by color corresponding to the color of the light irradiated from the lighting device 36.

An operation of the lighting device 36 may be controlled under control of the controller 13. Thus, the front plate 521 may emit light with various colors, and thus the appearance of the front face of the indoor unit 5 may also have various colors.

That is, the color of the outer appearance of the front face of the indoor unit 5 may be freely changed under control of the lighting device 36 in the state in which the panel assembly 52 is maintained to be assembled and mounted without replacement of the panel assembly 52. Thus, the outer appearance of the indoor unit 5 may be changed based on surrounding furniture or environments, and the outer appearance of the indoor unit 5 may be changed based on an operation state of the indoor unit 5, so that the operation state may be intuitively represented.

Figure 41:
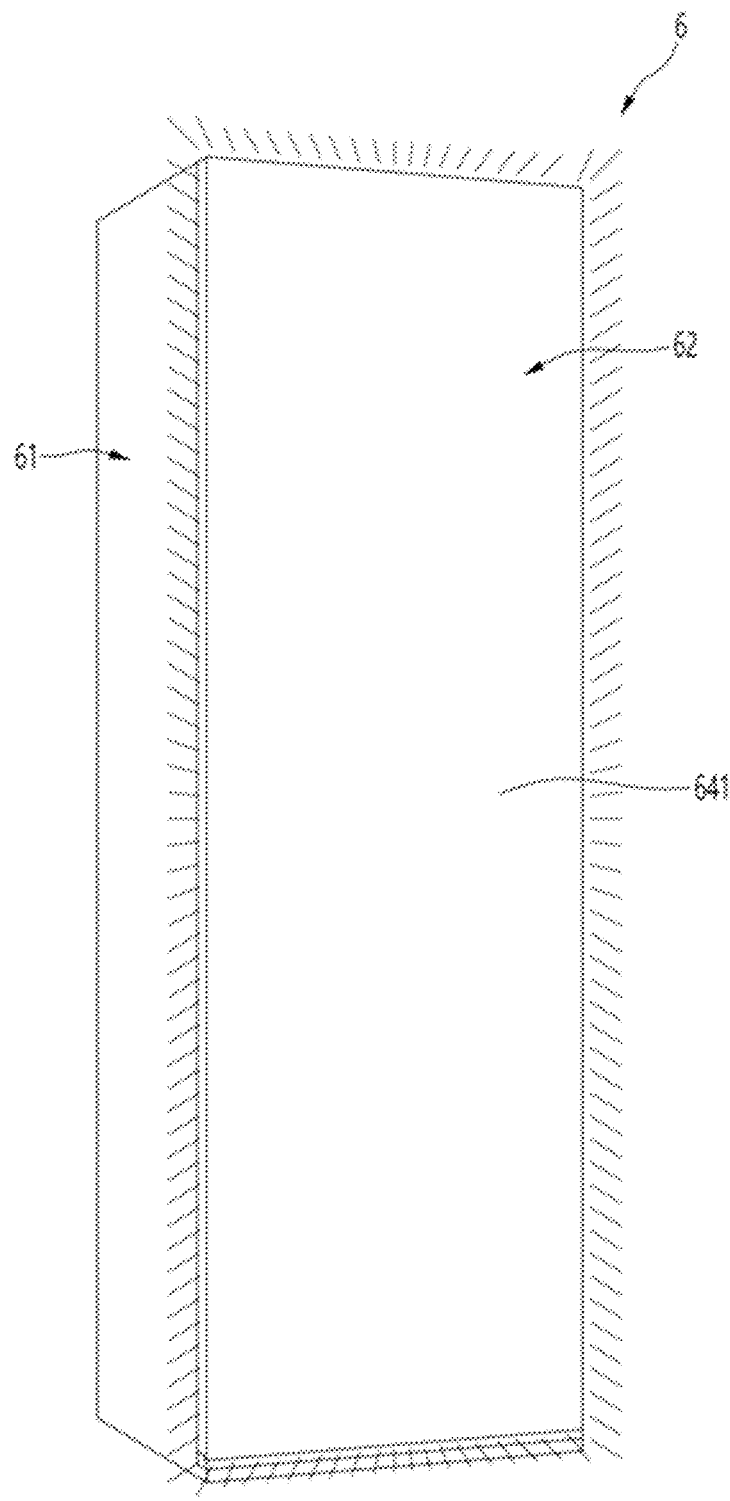
FIG. 41 is a perspective view of a laundry treating apparatus according to another embodiment of the present disclosure.
Figure 42:
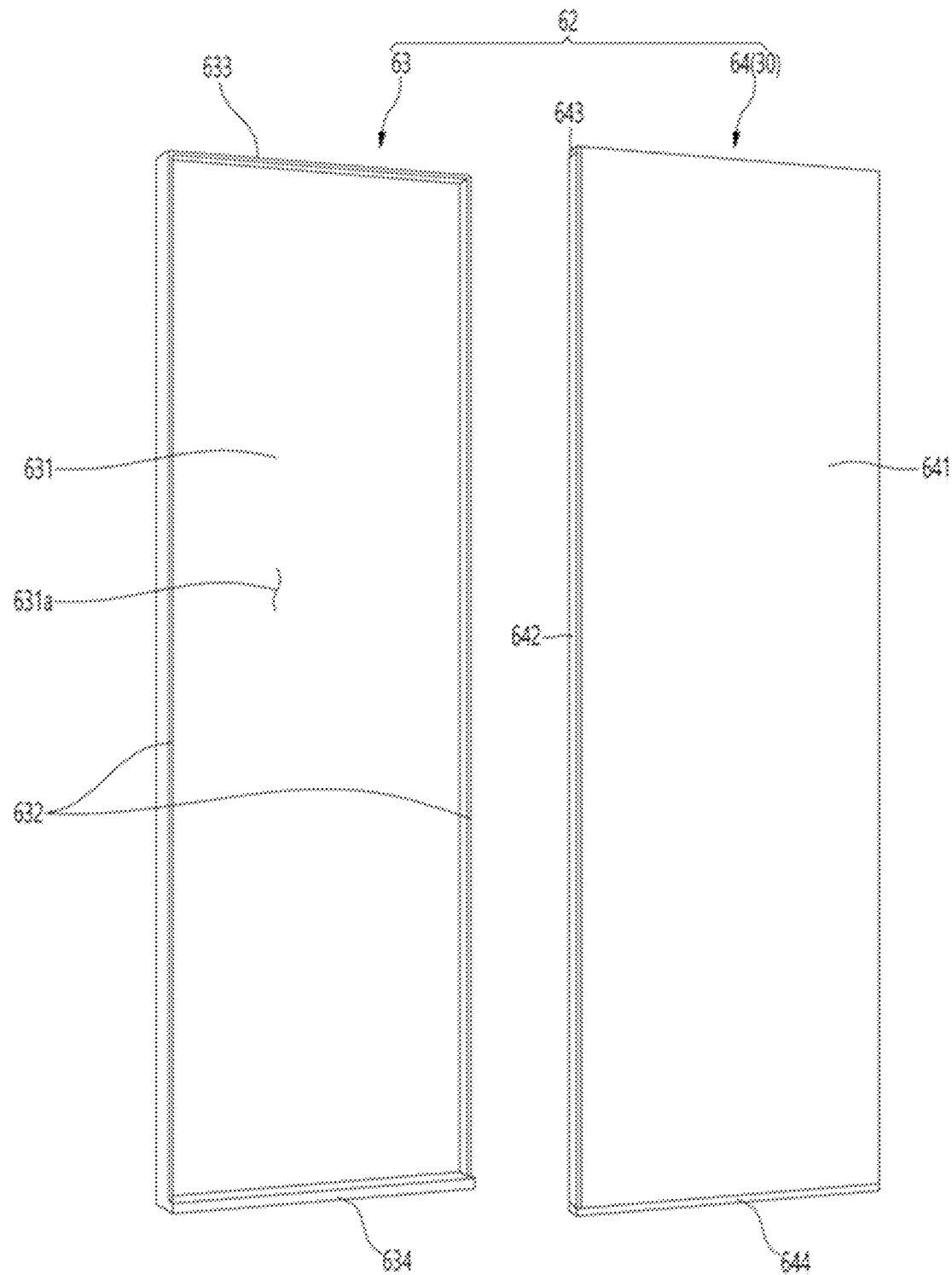
FIG. 42 is an exploded perspective view of a door of a laundry treating apparatus.

FIG. 41 is a perspective view of a laundry treating apparatus according to another embodiment of the present disclosure. FIG. 42 is an exploded perspective view of a door of a laundry treating apparatus.

As shown in the drawings, an outer appearance of a laundry treating apparatus 6 according to another embodiment of the present disclosure may be formed by a casing 61 forming a laundry receiving space (or a storage section), and a door 62 for opening and closing an open front face of the casing 61.

Although not shown in detail, in general, the casing 61 may have the laundry receiving space for accommodating the laundry therein, and may have a heat pump, a water tank, a steam generator, an air circulation fan, and the like within a machine room separately formed from the laundry receiving space.

A discharge port for discharging steam generated from the steam generator and dried air heated by the heat pump, and an absorption port for absorbing air from the laundry receiving space may be formed inside the laundry receiving space.

The door 62 may be pivotably mounted on the casing 61, and in the state in which the door 62 is closed, the door 62 may form an appearance of a front face of the laundry treating apparatus 6. The door 62 may include a door body 63 for opening and closing the laundry receiving space, and a panel assembly 64 mounted on the door body 63 to form a front face of the door 62.

A body plate 631 may be disposed on the front face of the door body 63 to form the front face of the door body 63. Side decorations 632 extending in the vertical direction are arranged along left and right side ends of the door body 63, and both left and right side faces of the door body 63 may be formed by the side decorations 632. The top face of the door body 63 may be formed by an upper cap decoration 633 for connecting upper ends of the side decorations 632 on the left and right sides to each other, and a bottom face of the door body 63 may be formed by a lower cap decoration 634 for connecting lower ends of the side decorations 632 on the left and right sides to each other.

The side decorations 632, the upper cap decoration 633, and the lower cap decoration 634 may protrude more than the front face of the body plate 631, and the panel receiving space 631*a* in which the panel assembly 64 is accommodated may be defined in front of the body plate 631.

In the panel assembly 64, the lower end may be inserted into the lower cap decoration 634, and the upper end may be coupled to the upper cap decoration 633 and may be fixedly mounted inside the panel receiving space 631*a*. A perimeter of the panel assembly 64 may be supported by the side decorations 632, the upper cap decoration 633, and the lower cap decoration 634.

In one example, the panel assembly 64 may have the same structure as the panel assembly 30 of the above-described embodiment, and thus the front face of the panel assembly 64 may emit light with various colors under the control of the controller 13.

The panel assembly 64 may include a front plate 541 for forming a front face thereof, a support member 642 to which the front plate 541 is mounted, an upper bracket 643 mounted on an upper end of the support member 642 and forming a top face of the panel assembly 64, and a lower bracket 644 mounted on the lower end of the support member 642 and forming a bottom face of the panel assembly 64.

Although not shown, the light guide plate 33 may be mounted on the support member 642, and the lower bracket 644 may have the lighting device 36 for irradiating light to the light guide plate 33. The back cover 39 may be disposed on the rear face of the panel assembly 64.

In the laundry treating apparatus having such a structure, as shown in FIG. 41, when the lighting device 36 is turned on, the entirety of the front plate 541 emits light by the light irradiated from the lighting device 36, and the outer appearance of the front face of the laundry treating apparatus 6 may be formed with a color corresponding to the color of the light irradiated from the lighting device 36.

The operation of the lighting device 36 may be controlled under the control of the controller 13. Accordingly, the front plate 541 may emit light with various colors, and accordingly, the outer appearance of the front face of the laundry treating apparatus 6 may also have various colors.

That is, the laundry treating apparatus 6 may freely change the color of the outer appearance of the front face thereof via the control of the lighting device 36 while the panel assembly 64 maintains the assembled and mounted state without replacement of the panel assembly 64. Accordingly, the outer appearance of the laundry treating apparatus 6 may be changed based on surrounding furniture or environment, and the outer appearance of the laundry treating apparatus 6 may be changed based on the operation state of the laundry treating apparatus 6 to intuitively express the operation state.

Figure 43:
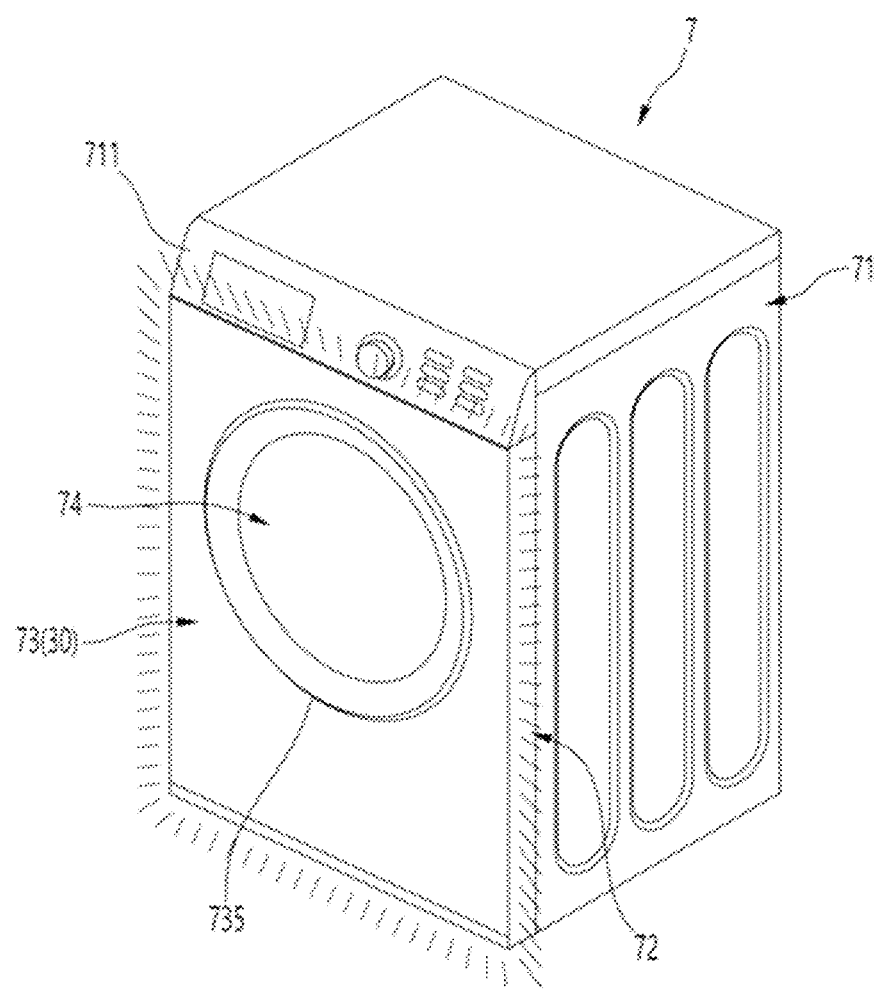
FIG. 43 is a perspective view of a washing machine according to another embodiment of the present disclosure.
Figure 44:
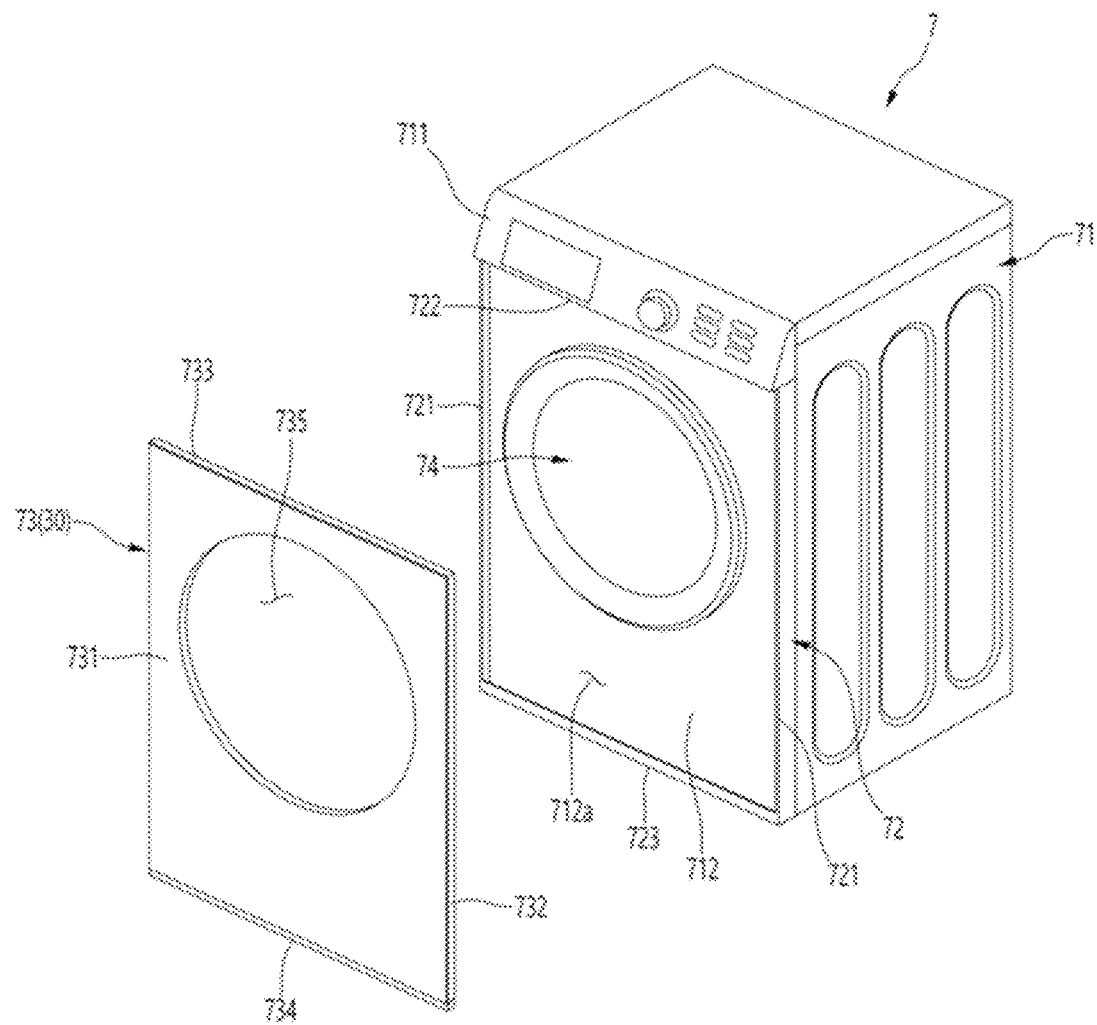
FIG. 44 is an exploded perspective view with a panel assembly of the washing machine separated.

FIG. 43 is a perspective view of a washing machine according to another embodiment of the present disclosure. FIG. 44 is an exploded perspective view with a panel assembly of the washing machine separated.

As shown in the drawings, a washing machine 7 according to another embodiment of the present disclosure may include a casing 71 for forming an outer shape, and a panel assembly 73 mounted on a front face of the case 71 to form an outer appearance of a front face of the washing machine 7.

Although not shown in detail, in general, the casing 71 may accommodate therein a drum and a tub that accommodate laundry therein, and a motor for rotation of the drum, and an opening in communication with the drum may be defined in the front face of the casing 71.

Manipulation means 711 for manipulating an operation of the washing machine 7 may be formed at an upper end of the front face of the casing 71. The manipulation means 711 may include multiple buttons or a knob and may include a display.

A door 74 for opening and closing the opening may be mounted on the front face of the casing 71. The door 74 may be pivotably mounted, and in the state in which the door 74 is closed, an interior of the drum may be seen from the outside.

In one example, a casing border 72 may be formed on a perimeter of a casing front face 712. The casing border 72 may be formed to correspond to a shape of the panel assembly 73 and may protrude forward from the casing front face 712 to define a panel receiving space 712a in which the panel assembly 73 is accommodated.

The casing border 72 may include one pair of side borders 721 forming both side faces, an upper border 722 for connecting upper ends of the pair of side borders 721 to each other, and a lower border 723 for connecting lower ends of the pair of side borders 721 to each other.

The panel assembly 73 may form an outer appearance of the front face of the washing machine 7 and may be mounted inside the panel receiving space 712a. A peripheral face of the panel assembly 73 may be supported by the casing border 72. In particular, a lower end of the panel assembly 73 may be caught and restrained by the lower border 723, and an upper end of the panel assembly 73 may be coupled to the upper border 722 to fixedly mount the panel assembly 73 on the front face of the casing 71.

In one example, a panel opening 735 may be defined in the panel assembly 73. The panel opening 735 may be defined with a size corresponding the door 74, and the door 74 may pass through the panel opening 735 when the panel assembly 73 is mounted. Thus, a front face of the door 74 may be exposed through the panel assembly 73 when the panel assembly 73 is mounted.

The panel assembly 73 may have the same structure as the panel assembly 30 according to the aforementioned embodiment except for the panel opening 735, and thus the front face of the panel assembly 73 may emit light with various colors under control of the controller 13.

The panel assembly 73 may include a front plate 731 forming a front face, a support member 732 on which the front plate 731 is mounted, an upper bracket 733 mounted on an upper end of the support member 732 to form a top face of the panel assembly 73, and a lower bracket 734 mounted on a lower end of the support member 732 to form a bottom face of the panel assembly 73.

Although not shown, the light guide plate 33 may be mounted on the support member 732, and the lighting device 36 for irradiating light to the light guide plate 33 may be disposed on the lower bracket 734. The back cover 39 may be disposed on a rear face of the panel assembly 73.

As shown in FIG. 43, in the washing machine 7 having such structure, when the lighting device 36 is turned on, the entirety of the front plate 731 may emit light by the light irradiated from the lighting device 36, and the outer appearance of the front face of the washing machine 7 may be formed with color corresponding to the color of the light irradiated from the lighting device 36.

An operation of the lighting device 36 may be controlled under control of the controller 13. Thus, the panel 731 may emit light with various colors, and thus the outer appearance of the front face of the washing machine 7 may also have various colors.

That is, color of the outer appearance of the front face of the washing machine 7 may be freely changed via control of the lighting device 36 in the state in which the panel assembly 73 is maintained to be assembled and mounted without replacement of the panel assembly 73. Thus, the outer appearance of the washing machine 7 may be changed based on surrounding furniture or environment, and the outer appearance of the washing machine 7 may be changed based on an operation state of the washing machine 7 to intuitively express the operation state.

In one example, although not shown, a drier having an outer appearance structure the same as that of the outer appearance of the washing machine 7 may also have the same structure of the panel assembly. A structure in which the drier and the washing machine are vertically stacked and a structure in which the drier and the washing machine are vertically arranged in one casing may also have the same panel assembly structure.

Figure 45:
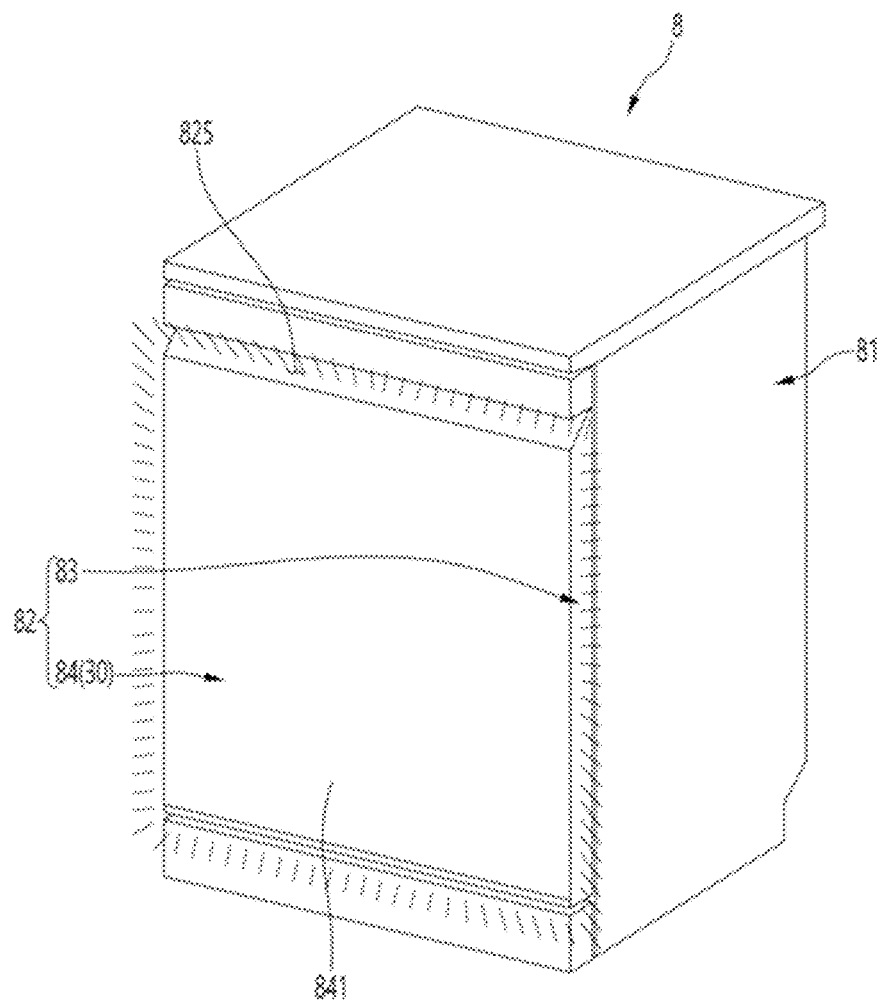
FIG. 45 is a perspective view of a dish washer according to another embodiment of the present disclosure.
Figure 46:
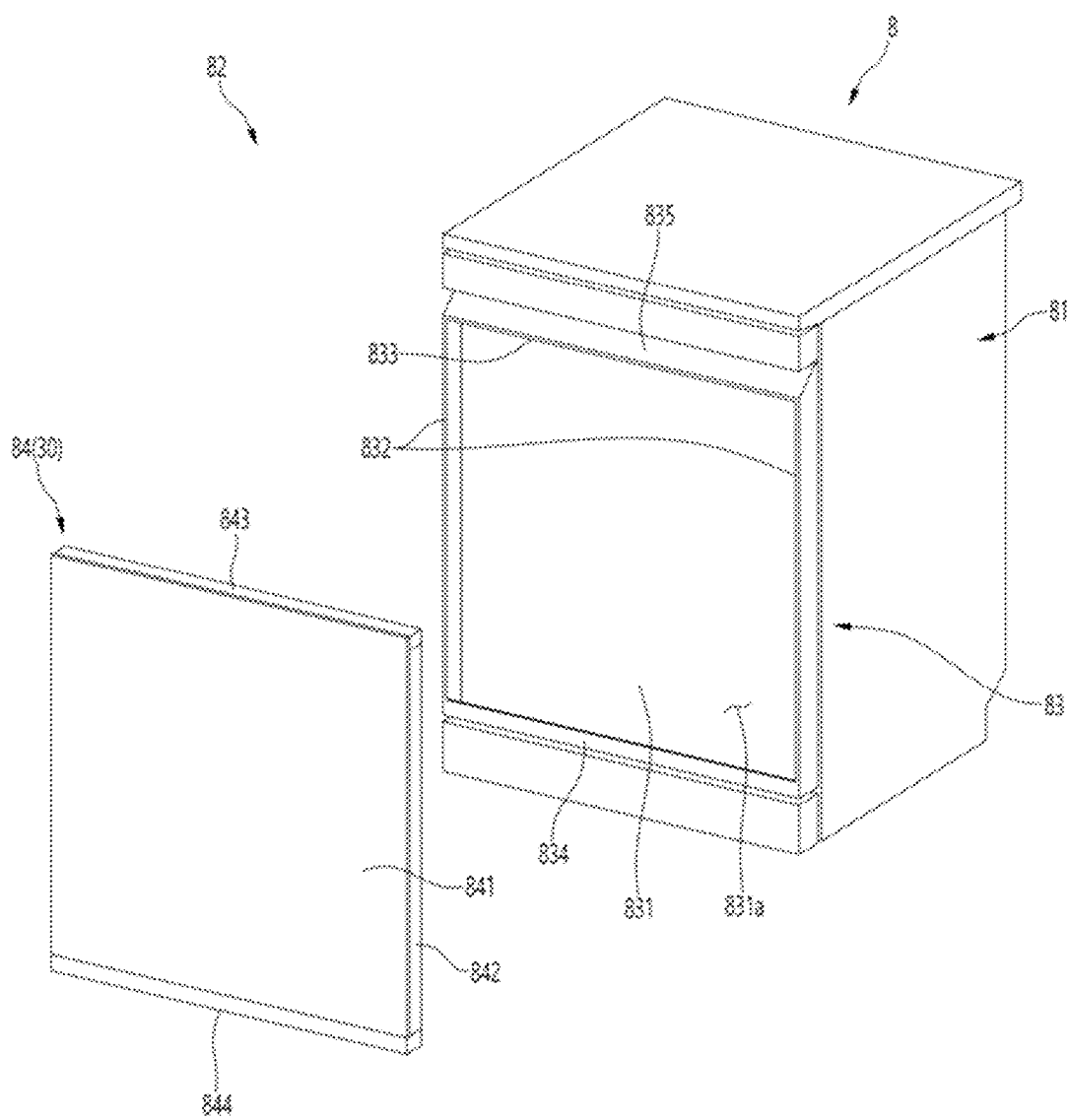
FIG. 46 is an exploded perspective view of a door of the dish washer.

FIG. 45 is a perspective view of a dish washer according to another embodiment of the present disclosure. FIG. 46 is an exploded perspective view of a door of the dish washer.

As shown in the drawings, an outer appearance of a dish washer 8 according to another embodiment of the present disclosure may be formed by a casing 81 for defining a space for accommodating and washing dishes, and a door 82 for opening and closing an open front face of the casing 81.

Although not shown in detail, in general, a washing space may be defined inside the casing 81, and a rack having a structure of being able to be retracted and extended and on which the dishes are seated, a nozzle for spraying water for washing the dishes, and a pump and a water tank for supplying washing water may be arranged within the washing space.

A lower end of the door 82 may be pivotably mounted on the casing 81, and in the state in which the door 82 is closed, the door 82 may form an outer appearance of a front face of the dish washer 8. The door 82 may include a door body 83 for opening and closing the washing space, and a panel assembly 84 mounted on the door body 83 to form a front face of the door 82.

A body plate 831 may be disposed on a front face of the door body 83 to form a front face of the door body 83. Side decorations 832 extending in the vertical direction may be arranged along right and left side ends of the door body 83, and right and left side faces of the door body 83 may be formed by the side decorations 832. An upper cap decoration 833 for connecting upper ends of the side decorations 832 at right and left sides to each other, and a lower cap decoration 834 for connecting lower ends of the side decorations 832 at the right and left sides to each other may be included.

A handle 835 for opening and closing the door 82 may be recessed at an upper portion of the door body 83. Manipulation means for manipulating an operation of the dish washer 8 may also be formed at the upper end of the door body 83.

In one example, the side decorations 832, the upper cap decoration 833, and the lower cap decoration 834 may further protrude than a front face of the body plate 831, and a panel receiving space 831*a* in which the panel assembly 84 is accommodated may be defined in front of the body plate 831.

A lower end of the panel assembly 84 may be inserted into the lower cap decoration 834, and an upper end of the panel assembly 84 may be coupled to the upper cap decoration 833 to be fixedly mounted inside the panel receiving space 831*a*. A perimeter of the panel assembly 84 may be supported by the side decoration 832, the upper cap decoration 833, and the lower cap decoration 834.

In one example, the panel assembly 84 may have the same structure as the panel assembly 30 according to the aforementioned embodiment, and thus the front face of the panel assembly 84 may emit light with various colors under control of the controller 13.

The panel assembly 84 may include a front plate 841 for forming a front face thereof, a support member 842 on which the front plate 841 is mounted, an upper bracket 843 mounted on an upper end of the support member 842 to form a top face of the panel assembly 84, and a lower bracket 844 mounted on a lower end of the support member 842 to form a bottom face of the panel assembly 84.

Although not shown, the light guide plate 33 may be mounted on the support member 842, and the lighting device 36 for irradiating light to the light guide plate 33 may be disposed on the lower bracket 844. The back cover 39 may be disposed on a rear face of the panel assembly 84.

As shown in FIG. 45, in the dish washer 8 having such structure, when the lighting device 36 is turned on, the entirety of the front plate 841 may emit light by light irradiated from the lighting device 36, and the outer appearance of the front face of the dish washer 8 may be formed with color corresponding to the color of the light irradiated from the lighting device 36.

An operation of the lighting device 36 may be controlled under control of the controller 13. Thus, the panel 841 may emit light with various colors, and thus the outer appearance of the front face of the dish washer 8 may also have various colors.

That is, the color of the outer appearance of the front face of the dish washer 8 may be freely changed via control of the lighting device 36 in the state in which the panel assembly 84 is maintained to be assembled and mounted without replacement of the panel assembly 84. Thus, the outer appearance of the dish washer 8 may be changed based on surrounding furniture or environments, and the outer appearance of the dish washer 8 may be changed based on an operation state of the dish washer 8 to intuitively express the operation state.

Figure 47:
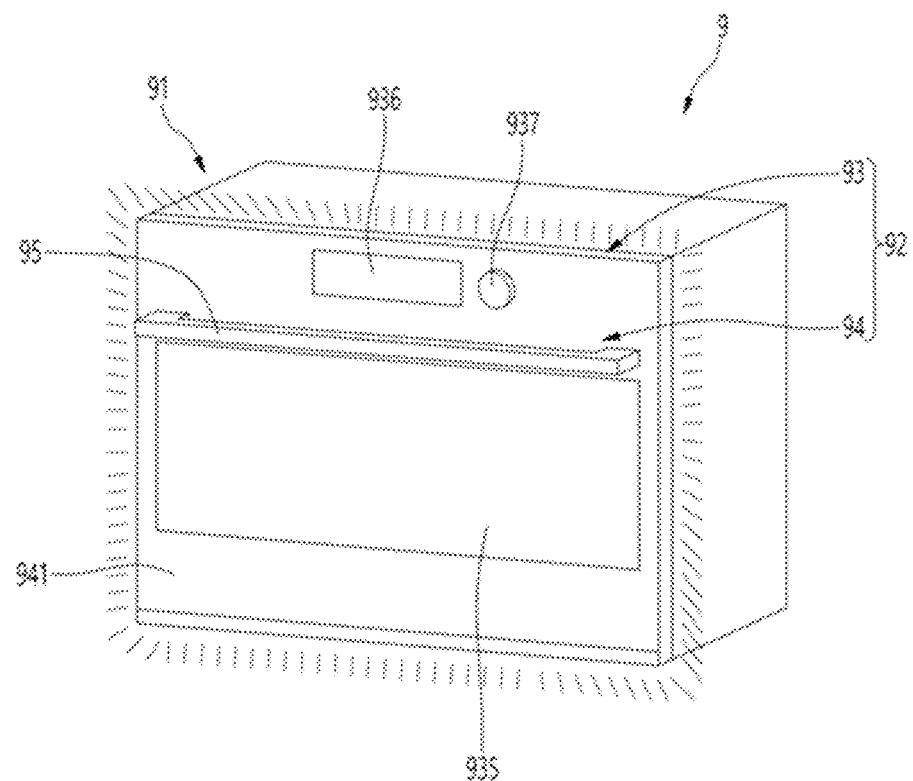
FIG. 47 is a perspective view of a cooking appliance according to another embodiment of the present disclosure.
Figure 48:
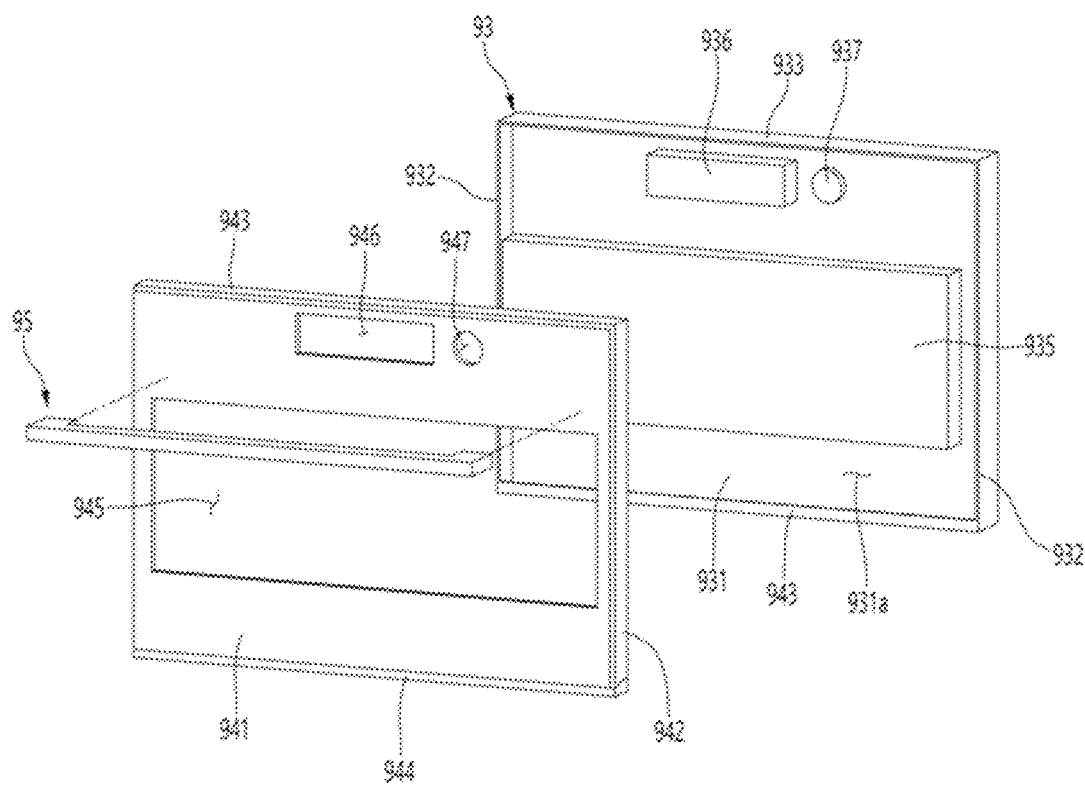
FIG. 48 is an exploded perspective view of a door of the cooking appliance.

FIG. 47 is a perspective view of a cooking appliance according to another embodiment of the present disclosure. FIG. 48 is an exploded perspective view of a door of the cooking appliance.

As shown in the drawings, an outer appearance of a cooking device 9 according to another embodiment of the present disclosure may be formed by a casing 91 for defining a space in which food is accommodated and cooking is performed, and a door 92 for opening and closing an open front face of the casing 91.

Although not shown in detail, in general, a cooking space may be defined inside the casing 91, and a heater or a magnetron for cooking the food, a fan for air circulation inside the cooking device, or a turntable on which the food is seated and rotating may be arranged inside the cooking space.

The door 92 may be pivotably mounted on the casing 91, and in the state in which the door 92 is closed, the door 92 may form an outer appearance of a front face of the cooking device 9. The door 92 may include a door body 93 for opening and closing the cooking space, and a panel assembly 94 mounted on the door body 93 to form a front face of the door 92.

A body plate 931 may be disposed on a front face of the door body 93 to form a front face of the door body 93. Side decorations 932 extending in the vertical direction may be arranged along right and left side ends of the door body 93, and right and left side faces of the door body 93 may be formed by the side decorations 932. An upper cap decoration 933 for connecting upper ends of the side decorations 932 at right and left sides to each other to form a top face of the door body 93, and a lower cap decoration 934 for connecting lower ends of the side decorations 932 at the right and left sides to each other to form a bottom face of the door body 93 may be included.

Manipulation means for manipulating an operation of the cooking device 9 may be formed at an upper portion of the door body 93. The manipulation means may include a display 936, and a knob 936 or a button for manipulation. A viewing window 935 for viewing the cooking space therethrough may be formed almost at a center of the door body 93.

In one example, the side decorations 932, the upper cap decoration 933, and the lower cap decoration 934 may further protrude than a front face of the body plate 931, and a panel receiving space 931*a* in which the panel assembly 94 is accommodated may be defined in front of the body plate 931.

A lower end of the panel assembly 94 may be inserted into the lower cap decoration 934, and an upper end of the panel assembly 94 may be coupled to the upper cap decoration 933 to be fixedly mounted inside the panel receiving space 931a. A perimeter of the panel assembly 94 may be supported by the side decorations 932, the upper cap decoration 933, and the lower cap decoration 934.

In one example, multiple panel openings 945, 946, and 947 may be defined in the panel assembly 94. The panel openings 945, 946, and 947 may include a display opening 946 defined at a position corresponding that of the display 936 and with a size corresponding to that of the display 936, a knob opening 947 defined at a position corresponding that of the knob 936 and with a size corresponding to that of the knob 936, and a viewing window opening 945 defined at a position corresponding that of the viewing window 935 and with a size corresponding to that of the viewing window 935.

Thus, when the panel assembly 94 is mounted, the display 936, the knob 936, and the viewing window 935 may be exposed forward through the panel assembly 94.

In one example, remaining components of the panel assembly 94 except for the panel openings 945, 946, and 947 may have the same structure as the panel assembly 30 according to the aforementioned embodiment, and thus the front face of the panel assembly 94 may emit light with various colors under control of the controller 13.

The panel assembly 94 may include a front plate 941 for forming a front face thereof, a support member 942 on which the front plate 941 is mounted, an upper bracket 943 mounted on an upper end of the support member 942 to form a top face of the panel assembly 94, and a lower bracket 944 mounted on a lower end of the support member 942 to form a bottom face of the panel assembly 94.

Although not shown, the light guide plate 33 may be mounted on the support member 942, and the lighting device 36 for irradiating light to the light guide plate 33 may be disposed on the lower bracket 944. The back cover 39 may be disposed on a rear face of the panel assembly 94.

A handle 95 for opening and closing the door 92 may be further disposed on a front face of the panel assembly 94.

As shown in FIG. 47, in the cooking device 9 having such structure, when the lighting device 36 is turned on, the entirety of the front plate 941 may emit light by the light irradiated from the lighting device 36, and the outer appearance of the front face of the cooking device 9 may be formed with color corresponding to the color of the light irradiated from the lighting device 36.

An operation of the lighting device 36 may be controlled under control of the controller 13. Thus, the front plate 941 may emit light with various colors, and thus the outer appearance of the front face of the cooking device 9 may also have various colors.

That is, the color of the outer appearance of the front face of the cooking device 9 may be freely changed via control of the lighting device 36 in the state in which the panel assembly 94 is maintained to be assembled and mounted without replacement of the panel assembly 94. Thus, the outer appearance of the cooking device 9 may be changed based on surrounding furniture or environments, and the outer appearance of the cooking device 9 may be changed based on an operation state of the cooking device 9 to intuitively express the operation state.

What is claimed is:

1. A home appliance comprising:
a cabinet having a storage space therein; and
a door configured to open and close at least a portion of the storage space of the cabinet,
wherein the door includes a door body and a panel assembly coupled to a front surface of the door body,
wherein the panel assembly includes:
a front plate that defines a front surface of the door, the front plate being made of glass,
a light guide plate disposed rearward of the front plate and spaced apart from a rear surface of the front plate,
a lighting device disposed below the light guide plate and spaced apart from the light guide plate, the lighting device including (i) a substrate and (ii) a light source that is disposed on the substrate and that is configured to irradiate light to the light guide plate, the light source being disposed below a lower end of the front plate, and
a bracket that defines a receiving space accommodating the lighting device therein,
wherein the bracket includes:
a support that supports the light guide plate and that is in contact with the light guide plate and the lighting device, wherein at least a portion of the support is disposed below the lower end of the front plate, and
a shielding portion that protrudes upward from a front portion of the support to a position above the lower end of the front plate and that is disposed between the front plate and the light guide plate, and
wherein an upper end of the light source is positioned downward relative to the lower end of the front plate.

2. The home appliance of claim 1, wherein the bracket includes a front part, and
wherein the support extends from the front part towards the door body.

3. The home appliance of claim 1, wherein the support includes a first support in contact with a front surface of the light source and a bottom surface of the light guide plate.

4. The home appliance of claim 1, wherein the support includes a plurality of second supports spaced apart from each other,
wherein the light source is disposed between two of the plurality of second supports that are disposed adjacent to each other, and
wherein the plurality of second supports are in contact with a side surface of the light source or a bottom surface of the light guide plate.

5. The home appliance of claim 2, wherein the front part includes a receiving groove in which a front end of the substrate is accommodated.

6. The home appliance of claim 5, wherein the receiving groove is arranged between the support and a bottom part of the bracket, the bottom part extending from the front part toward the door body.

7. The home appliance of claim 1, wherein an upper surface of the light source is located lower than an upper surface of the support, and a lower surface of the support is in contact with the substrate.

8. The home appliance of claim 1, further comprising a light supporter that supports a lower surface of the substrate,
wherein a lower surface of the light supporter is supported by the bracket.

9. The home appliance of claim 8, further comprising:
a back cover covering a rear surface of the panel assembly and being coupled to the bracket, wherein the back cover includes a cover bent portion disposed between the light supporter and the bracket, and wherein the back cover supports a rear surface of the light supporter.

10. The home appliance of claim 1, wherein the bracket is a lower bracket that defines a lower surface of the panel assembly.

11. The home appliance of claim 1, wherein the bracket includes a first front part and a second front part, and
wherein the support is disposed between the first and second front part and protrudes towards the door body.

12. The home appliance of claim 11, wherein the second front part is in contact with a front surface of the light guide plate and a rear surface of the front plate, and the second front part is disposed between the front plate and the light guide plate.

13. The home appliance of claim 11, wherein an upper end of the second front part is located higher than a lower end of the light guide plate.

14. The home appliance of claim 1, further comprising:
a support member that is disposed between the front plate and the light guide plate and that supports the front plate and the light guide plate.

15. The home appliance of claim 1, wherein the home appliance comprises a refrigerator, a dish washer, a laundry machine, a clothing manager, a washing machine, a drying machine, a cooking device, or an oven.

16. The home appliance of claim 1, wherein the support includes a first support in contact with a bottom surface of the light guide plate.

17. The home appliance of claim 1, wherein the support includes a plurality of second supports that are spaced apart from each other, and
wherein the plurality of second supports are in contact with a side surface of the light source or a bottom surface of the light guide plate.

18. The home appliance of claim 1, wherein a lower surface of the support is in contact with the substrate.

19. The home appliance of claim 8, further comprising:
a back cover that covers a rear surface of the panel assembly, that is coupled to the bracket, and that supports a rear surface of the light supporter.

20. The home appliance of claim 11, wherein the second front part is disposed between the front plate and the light guide plate.

* * * * *